US012727017B2

(12) United States Patent
He et al.

(10) Patent No.: US 12,727,017 B2
(45) Date of Patent: Sep. 1, 2026

(54) SCHEDULING UPLINK TRANSMISSION OF A RELAY

(71) Applicant: QUALCOMM Incorporated, San Diego, CA (US)

(72) Inventors: Linhai He, San Diego, CA (US); Seyedkianoush Hosseini, San Diego, CA (US); Sudhir Kumar Baghel, Hillsborough, NJ (US); Karthika Paladugu, San Diego, CA (US); Gokul Sridharan, Sunnyvale, CA (US); Gabi Sarkis, San Diego, CA (US); Gavin Bernard Horn, La Jolla, CA (US); Hwan-Joon Kwon, San Diego, CA (US); Wanshi Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/203,523

(22) Filed: Mar. 16, 2021

(65) Prior Publication Data

US 2021/0298043 A1 Sep. 23, 2021

Related U.S. Application Data

(60) Provisional application No. 62/992,705, filed on Mar. 20, 2020.

(51) Int. Cl.
*H04W 72/00* (2023.01)
*H04W 28/02* (2009.01)
(Continued)

(52) U.S. Cl.
CPC ..... *H04W 72/535* (2023.01); *H04W 28/0278* (2013.01); *H04W 72/0446* (2013.01);
(Continued)

(58) Field of Classification Search
CPC ......... H04W 72/1257; H04W 28/0278; H04W 72/0446; H04W 72/0453; H04W 72/1268;
(Continued)

(56) References Cited

U.S. PATENT DOCUMENTS 10,244,490 B2 3/2019 Islam et al.
2014/0241262 A1 8/2014 Novak et al.
(Continued)

FOREIGN PATENT DOCUMENTS

CN 109565494 A 4/2019
CN 110832926 A 2/2020
(Continued)

OTHER PUBLICATIONS

Coolpad: "Further Discussion on Resource Allocation Issues and Way Forward for Release 13", 3GPP Draft, 3GPP TSG RAN WG2 #91bis, R2-154269, 3rd Generation Partnership Project (3GPP), Mobile Competence Centre, 650, Route Des Lucioles, F-06921 Sophia-Antipolis Cedex, France, vol. RAN WG2, No. Malmo, Sweden, Oct. 5, 2015-Oct. 10, 2015 Oct. 4, 2015 (Oct. 4, 2015), XP051004828, pp. 1-4, Retrieved from the Internet: URL:http://www.3gpp.org/ftp/Meetings_3GPP_SYNC/RAN2/Docs/ [retrieved on Oct. 4, 2015], paragraph [03.3].
(Continued)

*Primary Examiner* — Lakeram Jangbahadur
(74) *Attorney, Agent, or Firm* — Holland & Hart LLP/QUALCOMM Incorporated

(57) ABSTRACT

Methods, systems, and devices for wireless communications are described. A first device (e.g., a relay user equipment (UE)) may establish a communication link, where the communication includes establishing a communication link between a second device (e.g., a remote UE) and a base station, the communication link including a first communication link between the second device and the first device
(Continued)

and a second communication link between the first device and the base station. The first device may receive, over the first communication link, a transmission corresponding to data stored at the second device. The first device may receive, over the second communication link, an indication of one or more resources for a relay transmission corresponding to the data stored at the second device. The first device may transmit, over the second communication link, the relay transmission over the one or more resources based on receiving the sidelink transmission.

58 Claims, 23 Drawing Sheets

(51) Int. Cl.

| | |
|---|---|
| ***H04W 72/0446*** | (2023.01) |
| ***H04W 72/0453*** | (2023.01) |
| ***H04W 72/1268*** | (2023.01) |
| ***H04W 72/50*** | (2023.01) |
| ***H04W 76/11*** | (2018.01) |
| ***H04W 80/02*** | (2009.01) |

(52) U.S. Cl.
CPC ... *H04W 72/0453* (2013.01); *H04W 72/1268* (2013.01); *H04W 76/11* (2018.02); *H04W 80/02* (2013.01)

(58) Field of Classification Search
CPC ..... H04W 76/11; H04W 80/02; H04W 76/14; H04W 88/04; H04W 72/1278; H04B 7/15542
See application file for complete search history.

(56) References Cited

U.S. PATENT DOCUMENTS

| | | | | |
|---|---|---|---|---|
| 2017/0245245 | A1 | 8/2017 | Kim et al. | |
| 2017/0353819 | A1 | 12/2017 | Yin et al. | |
| 2018/0069618 | A1 | 3/2018 | Loehr et al. | |
| 2018/0206176 | A1 | 7/2018 | Panteleev et al. | |
| 2018/0219654 | A1 * | 8/2018 | Chen | H04L 5/0012 |
| 2018/0324842 | A1 | 11/2018 | Gulati et al. | |
| 2018/0359765 | A1 | 12/2018 | Jung et al. | |
| 2019/0335356 | A1 * | 10/2019 | Lee | H04W 28/0278 |
| 2019/0394796 | A1 | 12/2019 | Wei | |
| 2020/0029353 | A1 * | 1/2020 | Xu | H04W 72/21 |
| 2020/0092685 | A1 | 3/2020 | Fehrenbach et al. | |
| 2020/0178221 | A1 | 6/2020 | Byun et al. | |
| 2020/0196387 | A1 * | 6/2020 | Roy | H04W 72/1278 |
| 2020/0344771 | A1 | 10/2020 | Kang et al. | |
| 2021/0168826 | A1 | 6/2021 | Zhao | |
| 2021/0297992 | A1 | 9/2021 | He et al. | |
| 2021/0298034 | A1 | 9/2021 | He et al. | |
| 2022/0015070 | A1 | 1/2022 | Chen et al. | |
| 2022/0022244 | A1 | 1/2022 | Zhao | |
| 2022/0124772 | A1 | 4/2022 | Xu et al. | |
| 2022/0225341 | A1 | 7/2022 | Li et al. | |
| 2022/0338211 | A1 | 10/2022 | Alabbasi et al. | |
| 2022/0346112 | A1 | 10/2022 | Lin et al. | |
| 2022/0400490 | A1 | 12/2022 | Ji et al. | |
| 2023/0422218 | A1 | 12/2023 | He et al. | |

FOREIGN PATENT DOCUMENTS

| | | | | |
|---|---|---|---|---|
| WO | WO-2017134578 A1 | | 8/2017 | |
| WO | WO-2017176805 | | 10/2017 | |
| WO | WO-2018016157 A1 | | 1/2018 | |
| WO | WO-2018061521 A1 | * | 4/2018 | H04B 17/24 |
| WO | WO-2020006366 A1 | | 1/2020 | |
| WO | WO-2020006388 A1 | | 1/2020 | |
| WO | WO-2020034610 A1 | | 2/2020 | |
| WO | WO-2021083880 A1 | | 5/2021 | |

OTHER PUBLICATIONS

International Search Report and Written Opinion—PCT/US2021/022722—ISA/EPO—dated Jul. 7, 2021.

Vivo: "Triggering Condition of Pre-BSR", 3GPP Draft, 3GPP TSG-RAN WG2 Meeting #106, R2-1905829 (Resubmission of R2-19003343)_Triggering Condition of PRE-BSR, 3rd Generation Partnership Project (3GPP), Mobile Competence Centre, 650, Route Des Lucioles, F-06921 Sophia-Antipolis Cedex, France, vol. RAN WG2, No. Reno, USA, May 13, 2019-May 17, 2019 May 3, 2019 (May 3, 2019), XP051710182, pp. 1-3, Retrieved from the Internet: URL:http://www.3gpp.org/ftp/tsg%5Fran/WG2%5FRL2/TSGR2%5F106/Docs/R2%2D1905829%2Ezip [retrieved on May 3, 2019].

Interdigital Inc: "Remaining Aspects of UL/SL Prioritization", 3GPP Draft, 3GPP RAN WG2 Meeting #107bis, R2-1914868, 3rd Generation Partnership Project (3GPP), Mobile Competence Centre, 650, Route Des Lucioles, F-06921 Sophia-Antipolis Cedex, France, vol. RAN WG2, No. Chongqing, China, Oct. 14, 2019-Oct. 18, 2019, Nov. 8, 2019 (Nov. 8, 2019), XP051816812, 4 Pages, section 2.3.

Nokia, et al., "Sidelink Resource Allocation with Relay UE", 3GPP Daft, 3GPP TSG RAN WG1 Meeting #89, R1-1708564, 3GPP, Mobile Competence Centre, 650, Route Des Lucioles, F- 06921 Sophia-Antipolis Cedex, F, vol. RAN WG1, No. Hangzhou, China, May 15, 2017-May 19, 2017, May 14, 2017, XP051273756, pp. 1-7, section 2, figure 2, p. 2-p. 3, p. 3, figure 2, Section 4, seventh paragraph.

NTT Docomo, Inc: "Sidelink Physical Layer Structure for NR V2X", 3GPP Draft, 3GPP TSG RAN WG1 Meeting #AH1901, R1-1900962, SL PHY Structure, 3rd Generation Partnership Project (3GPP), Mobile Competence Centre, 650, Route Des Lucioles, F-06921 Sophia-Antipolis Cedex, France, vol. RAN WG1, No. Taipei, Jan. 21, 2019-Jan. 25, 2019, Jan. 20, 2019 (Jan. 20, 2019), XP051593807, 7 Pages, p. 2.

3GPP TS 23.304: "3rd Generation Partnership Project, Technical Specification Group Services and System Aspects, Proximity based Services (ProSe) in the 5G System (5GS) (Release 17)", 3GPP TS 23.304 V0.1.0 (Mar. 2021), Technical Specification, Sections 5.4 and 6.1, Mar. 2021, Valbonne, France, 7 pages.

3rd Generation Partnership Project (3GPP), Technical Specification Group Services and System Aspects; "Study on system enhancement for Proximity based Services (ProSe) in the 5G System (5GS)" (Release 17), 3GPP TR 23.752 V0.3.0, Jan. 2020, pp. 1-73.

* cited by examiner

Figure 4:
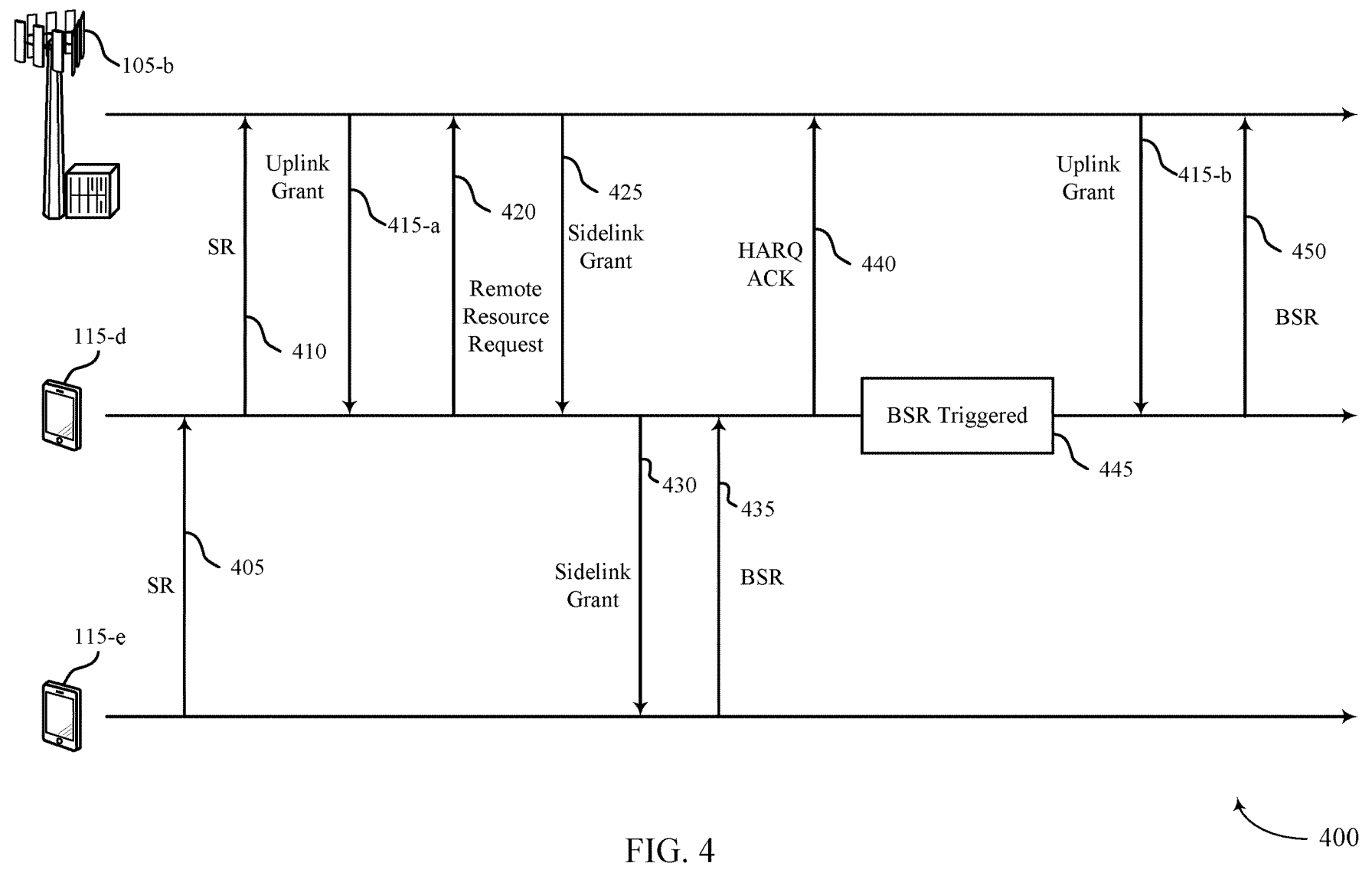

400

105-b 115-d 115-e

405 SR

410 SR 415-a Uplink Grant

420 Remote Resource Request

425 Sidelink Grant

430 Sidelink Grant

435 BSR

440 HARQ ACK

445 BSR Triggered 415-b Uplink Grant

450 BSR

Figure 23:
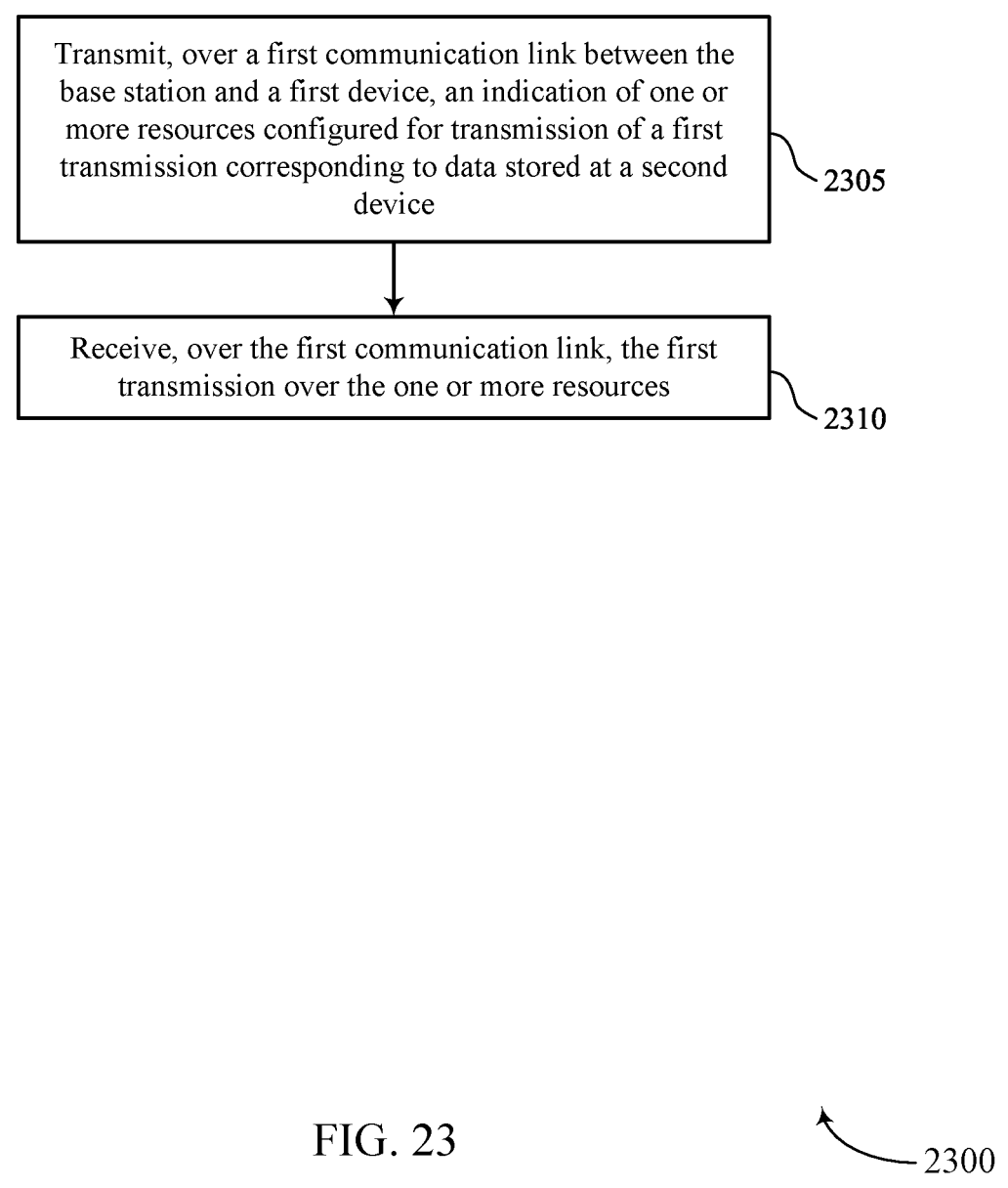

Transmit, over a first communication link between the base station and a first device, an indication of one or more resources configured for transmission of a first transmission corresponding to data stored at a second device

2305

Receive, over the first communication link, the first transmission over the one or more resources

SCHEDULING UPLINK TRANSMISSION OF A RELAY

CROSS REFERENCE

The present application for Patent claims the benefit of U.S. Provisional Patent Application No. 62/992,705 by H E et al., entitled "SCHEDULING UPLINK TRANSMISSION OF A RELAY," filed Mar. 20, 2020, assigned to the assignee hereof, and expressly incorporated by reference herein.

INTRODUCTION

The following relates to wireless communications and more specifically to scheduling uplink transmissions.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Aspects of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

A method for wireless communication at a relay UE is described. The method may include establishing a communication link between a remote UE and a base station, the communication link including a sidelink communication link between the remote UE and the relay UE and a relay communication link between the relay UE and the base station. The method may include receiving, over the sidelink communication link, a sidelink transmission corresponding to data stored at the remote UE. The method may include receiving, over the relay communication link, an indication of one or more resources configured for transmission of a relay transmission corresponding to the data stored at the remote UE. The method may include transmitting, over the relay communication link, the relay transmission over the one or more resources based on the receiving the sidelink transmission.

A method for wireless communication at a first device is described. The method may include receiving, over a first communication link between the first device and a second device, a first transmission corresponding to data stored at the second device. The method may include receiving, over a second communication link between the first device and a base station, an indication of one or more resources configured for transmission of a second transmission corresponding to the data stored at the second device. The method may include transmitting, over the second communication link, the second transmission over the one or more resources based on the receiving the first transmission.

An apparatus for wireless communication at a first device is described. The apparatus may include a processor and memory coupled to the processor, the processor and the memory configured to receive, over a first communication link between the first device and a second device, a first transmission corresponding to data stored at the second device, receive, over a second communication link between the first device and a base station, an indication of one or more resources configured for transmission of a second transmission corresponding to the data stored at the second device, and transmit, over the second communication link, the second transmission over the one or more resources based on the receiving the first transmission.

Another apparatus for wireless communication at a first device is described. The apparatus may include means for receiving, over a first communication link between the first device and a second device, a first transmission corresponding to data stored at the second device, means for receiving, over a second communication link between the first device and a base station, an indication of one or more resources configured for transmission of a second transmission corresponding to the data stored at the second device, and means for transmitting, over the second communication link, the second transmission over the one or more resources based on the receiving the first transmission.

A non-transitory computer-readable medium storing code for wireless communication at a first device is described. The code may include instructions executable by a processor to receive, over a first communication link between the first device and a second device, a first transmission corresponding to data stored at the second device, receive, over a second communication link between the first device and a base station, an indication of one or more resources configured for transmission of a second transmission corresponding to the data stored at the second device, and transmit, over the second communication link, the second transmission over the one or more resources based on the receiving the first transmission.

Some examples of the method, apparatuses, and non-transitory computer-readable medium described herein may further include operations, features, means, or instructions for receiving or a processor and memory configured to receive, over the first communication link, a first scheduling request, operations, features, means, or instructions for transmitting or the processor and the memory configured to transmit, over the second communication link, a second scheduling request based on receiving the first scheduling request, operations, features, means, or instructions for receiving or the processor and the memory configured to receive, over the second communication link, a first indication of second one or more resources configured by the base station for transmission of the first transmission, and operations, features, means, or instructions for transmitting or the processor and the memory configured to transmit, over the first communication link, a second indication of the second one or more resources, where the first transmission may be received over the second one or more resources.

Some examples of the method, apparatuses, and non-transitory computer-readable medium described herein may further include operations, features, means, or instructions for receiving or a processor and memory configured to receive, over the second communication link, an indication of third one or more resources configured by the base station for transmission of control signaling including a request for resources on the first communication link and operations, features, means, or instructions for transmitting or a processor and memory configured to transmit, over the second communication link, the control signaling including the request for resources on the first communication link, where receiving the first indication of the second one or more resources may be based on transmitting the control signaling including the request for resources on the first communication link.

In some examples of the method, apparatuses, and non-transitory computer-readable medium described herein, the control signaling includes a medium access control (MAC) control element including the request for resources on the first communication link.

In some examples of the method, apparatuses, and non-transitory computer-readable medium described herein, the second scheduling request may be transmitted over a time location on the first communication link, a frequency location on the first communication link, or both that indicates that the second scheduling request may be associated with the second device.

Some examples of the method, apparatuses, and non-transitory computer-readable medium described herein may further include operations, features, means, or instructions for transmitting or a processor and memory configured to transmit, over the second communication link, an indication that the first transmission was successfully received and decoded by the first device.

In some examples of the method, apparatuses, and non-transitory computer-readable medium described herein, the indication includes an identifier of the second device.

In some examples of the method, apparatuses, and non-transitory computer-readable medium described herein, the second scheduling request indicates an identifier of the second device, and and the first indication of the second one or more resources may be received based on the second scheduling request indicating the identifier of the second device.

In some examples of the method, apparatuses, and non-transitory computer-readable medium described herein, the first indication of the second one or more resources includes at least one radio link control protocol data unit including an identifier of the second device.

In some examples of the method, apparatuses, and non-transitory computer-readable medium described herein, the first indication of the second one or more resources may be encoded according to a radio network temporary identifier of the second device, and and the second indication of the second one or more resources may be transmitted over the first communication link based on the first indication of the second one or more resources being encoded according to the radio network temporary identifier of the second device.

In some examples of the method, apparatuses, and non-transitory computer-readable medium described herein, the indication of the one or more resources may be encoded according to a radio network temporary identifier of the first device.

In some examples of the method, apparatuses, and non-transitory computer-readable medium described herein, the radio network temporary identifier by which the first indication of the second one or more resources may be encoded may be the same as the radio network temporary identifier by which the indication of the one or more resources may be encoded.

In some examples of the method, apparatuses, and non-transitory computer-readable medium described herein, the radio network temporary identifier by which the first indication of the second one or more resources may be encoded may be distinct from the radio network temporary identifier by which the indication of the one or more resources may be encoded.

Some examples of the method, apparatuses, and non-transitory computer-readable medium described herein may further include operations, features, means, or instructions for receiving or a processor and memory configured to receive, over the second communication link, an indication of third one or more resources configured by the base station for transmission of a third transmission from a third device distinct from the second device, where the indication of the third one or more resources may be encoded according to a radio network temporary identifier of the third device distinct from the second device.

In some examples of the method, apparatuses, and non-transitory computer-readable medium described herein, the radio network temporary identifier by which the indication of the third one or more resources may be encoded may be the same as the radio network temporary identifier by which the indication of the one or more resources may be encoded.

In some examples of the method, apparatuses, and non-transitory computer-readable medium described herein, the radio network temporary identifier by which the indication of the third one or more resources may be encoded may be distinct from the radio network temporary identifier of the second device by which the indication of the one or more resources may be encoded.

In some examples of the method, apparatuses, and non-transitory computer-readable medium described herein, the first transmission includes a first buffer status report and the second transmission includes a second buffer status report.

Some examples of the method, apparatuses, and non-transitory computer-readable medium described herein may further include operations, features, means, or instructions for receiving or a processor and memory configured to receive, from a third device distinct from the second device, a third buffer status report corresponding to data stored at the third device distinct from the second device, where the second buffer status report includes an aggregated buffer status of the second device and of the third device distinct from the second device.

Some examples of the method, apparatuses, and non-transitory computer-readable medium described herein may further include operations, features, means, or instructions for initiating or a processor and memory configured to initiate a prohibit timer for the third device distinct from the second device, where the second buffer status report excludes an identifier of the third device distinct from the second device based on the prohibit timer running when the first buffer status report may be received.

Some examples of the method, apparatuses, and non-transitory computer-readable medium described herein may further include operations, features, means, or instructions for receiving or a processor and memory configured to receive, from a third device distinct from the second device, a third buffer status report corresponding to data stored at the third device distinct from the second device, where the second buffer status report includes one or more first buffer statuses indicated by the first buffer status report and one or more second buffer statuses indicated by the third buffer status report.

Some examples of the method, apparatuses, and non-transitory computer-readable medium described herein may further include operations, features, means, or instructions for transmitting or a processor and memory configured to transmit the second buffer status report may be based on the first buffer status report including a non-empty logical channel group whose priority may be higher than each logical channel group associated with additional data stored at the first device.

Some examples of the method, apparatuses, and non-transitory computer-readable medium described herein may further include operations, features, means, or instructions for transmitting or a processor and memory configured to transmit the second buffer status report may be based on expiry of a periodic buffer status report timer configured at the first device.

Some examples of the method, apparatuses, and non-transitory computer-readable medium described herein may further include operations, features, means, or instructions for transmitting or a processor and memory configured to transmit, over the second communication link, a scheduling request based on receiving the first transmission, where receiving the indication of the one or more resources may be based on transmitting the scheduling request.

In some examples of the method, apparatuses, and non-transitory computer-readable medium described herein, the first transmission includes a transmission of data and the second transmission includes a buffer status report, and transmitting the buffer status report may be based on the first device having an empty buffer when receiving the first transmission of the data, the data having a higher priority than additional data stored at the first device, or both.

A method for wireless communications at a base station is described. The method may include transmitting, over a first communication link between the base station and a first device, an indication of one or more resources configured for transmission of a first transmission corresponding to data stored at a second device. The method may include receiving, over the first communication link, the first transmission over the one or more resources.

An apparatus for wireless communications at a base station is described. The apparatus may include a processor and memory coupled to the processor, the processor and the memory configured to transmit, over a first communication link between the base station and a first device, an indication of one or more resources configured for transmission of a first transmission corresponding to data stored at a second device and receive, over the first communication link, the first transmission over the one or more resources.

Another apparatus for wireless communications at a base station is described. The apparatus may include means for transmitting, over a first communication link between the base station and a first device, an indication of one or more resources configured for transmission of a first transmission corresponding to data stored at a second device and means for receiving, over the first communication link, the first transmission over the one or more resources.

A non-transitory computer-readable medium storing code for wireless communications at a base station is described. The code may include instructions executable by a processor to transmit, over a first communication link between the base station and a first device, an indication of one or more resources configured for transmission of a first transmission corresponding to data stored at a second device and receive, over the first communication link, the first transmission over the one or more resources.

Some examples of the method, apparatuses, and non-transitory computer-readable medium described herein may further include operations, features, means, or instructions for receiving or a processor and memory configured to receive, over the first communication link, a scheduling request and operations, features, means, or instructions for transmitting or the processor and the memory configured to transmit, over the first communication link, an indication of second one or more resources configured by the base station for transmission of a second transmission corresponding to the data stored at the second device from the second device to the first device, where the first transmission may be received based on transmitting the indication of the second one or more resources.

Some examples of the method, apparatuses, and non-transitory computer-readable medium described herein may further include operations, features, means, or instructions for transmitting or a processor and memory configured to transmit, over the first communication link, an indication of third one or more resources configured by the base station for transmission of control signaling including a request for resources on a second communication link between the first device and the second device and operations, features, means, or instructions for receiving or a processor and memory configured to receive, over the first communication link, the control signaling including the request for resources on the second communication link, where transmitting the indication of the second one or more resources may be based on receiving the request for resources on the second communication link.

In some examples of the method, apparatuses, and non-transitory computer-readable medium described herein, the control signaling includes a medium access control (MAC) control element including the request for resources on the second communication link.

An apparatus for wireless communication at a relay UE is described. The apparatus may include a processor and memory coupled to the processor, the processor and the memory configured to establish a communication link between a remote UE and a base station, the communication link including a sidelink communication link between the remote UE and the relay UE and a relay communication link between the relay UE and the base station, receive, over the sidelink communication link, a sidelink transmission corresponding to data stored at the remote UE, receive, over the relay communication link, an indication of one or more resources configured for transmission of a relay transmission corresponding to the data stored at the remote UE, and transmit, over the relay communication link, the relay transmission over the one or more resources based on the receiving the sidelink transmission.

Another apparatus for wireless communication at a relay UE is described. The apparatus may include means for establishing a communication link between a remote UE and a base station, the communication link including a sidelink communication link between the remote UE and the relay UE and a relay communication link between the relay UE and the base station, means for receiving, over the sidelink communication link, a sidelink transmission corresponding to data stored at the remote UE, means for receiving, over the relay communication link, an indication of one or more resources configured for transmission of a relay transmission corresponding to the data stored at the remote UE, and means for transmitting, over the relay communication link, the relay transmission over the one or more resources based on the receiving the sidelink transmission.

A non-transitory computer-readable medium storing code for wireless communication at a relay UE is described. The code may include instructions executable by a processor to establish a communication link between a remote UE and a base station, the communication link including a sidelink communication link between the remote UE and the relay UE and a relay communication link between the relay UE and the base station, receive, over the sidelink communication link, a sidelink transmission corresponding to data stored at the remote UE, receive, over the relay communication link, an indication of one or more resources configured for transmission of a relay transmission corresponding to the data stored at the remote UE, and transmit, over the relay communication link, the relay transmission over the one or more resources based on the receiving the sidelink transmission.

Some examples of the method, apparatuses, and non-transitory computer-readable medium described herein may further include operations, features, means, or instructions for or a processor and memory configured to receive, over the sidelink communication link, a first scheduling request, operations, features, means, or instructions for transmitting or the processor and the memory configured to transmit, over the relay communication link, a second scheduling request based on receiving the first scheduling request, operations, features, means, or instructions for receiving or the processor and the memory configured to transmit, over the relay communication link, a first indication of second one or more resources configured by the base station for transmission of the sidelink transmission, and operations, features, means, or instructions for transmitting or the processor or the memory configured to transmit, over the sidelink communication link, a second indication of the second one or more resources, where the sidelink transmission may be received over the second one or more resources.

Some examples of the method, apparatuses, and non-transitory computer-readable medium described herein may further include operations, features, means, or instructions for receiving or a processor and memory configured to receive, over the relay communication link, an indication of third one or more resources configured by the base station for transmission of control signaling including a request for resources on the sidelink communication link, and operations, features, means, or instructions for transmitting or the processor and the memory configured to transmit, over the relay communication link, the control signaling including the request for resources on the sidelink communication link, where receiving the first indication of the second one or more resources may be based on transmitting the control signaling including the request for resources on the sidelink communication link.

In some examples of the method, apparatuses, and non-transitory computer-readable medium described herein, the control signaling includes a medium access control (MAC) control element including the request for resources on the sidelink communication link.

In some examples of the method, apparatuses, and non-transitory computer-readable medium described herein, the second scheduling request may be transmitted over a time location on the sidelink communication link, a frequency location on the sidelink communication link, or both that indicates that the second scheduling request may be associated with the remote UE Some examples of the method, apparatuses, and non-transitory computer-readable medium described herein may further include operations, features, means, or instructions for transmitting or a processor and memory configured to transmit, over the relay communication link, an indication that the sidelink transmission was successfully received and decoded by the relay UE.

In some examples of the method, apparatuses, and non-transitory computer-readable medium described herein, the indication includes an identifier of the remote UE.

In some examples of the method, apparatuses, and non-transitory computer-readable medium described herein, the second scheduling request indicates an identifier of the remote UE, and where the first indication of the second one or more resources may be received based on the second scheduling request indicating the identifier of the remote UE.

In some examples of the method, apparatuses, and non-transitory computer-readable medium described herein, the first indication of the second one or more resources includes at least one radio link control protocol data unit including an identifier of the remote UE.

In some examples of the method, apparatuses, and non-transitory computer-readable medium described herein, the first indication of the second one or more resources may be encoded according to a radio network temporary identifier of the remote UE, and where the second indication of the second one or more resources may be transmitted over the sidelink communication link based on the first indication of the second one or more resources being encoded according to the radio network temporary identifier of the remote UE.

In some examples of the method, apparatuses, and non-transitory computer-readable medium described herein, the indication of the one or more resources may be encoded according to a radio network temporary identifier of the relay UE.

In some examples of the method, apparatuses, and non-transitory computer-readable medium described herein, the radio network temporary identifier by which the first indication of the second one or more resources may be encoded may be the same as the radio network temporary identifier by which the indication of the one or more resources may be encoded.

In some examples of the method, apparatuses, and non-transitory computer-readable medium described herein, the radio network temporary identifier by which the first indication of the second one or more resources may be encoded may be distinct from the radio network temporary identifier by which the indication of the one or more resources may be encoded.

Some examples of the method, apparatuses, and non-transitory computer-readable medium described herein may further include operations, features, means, or instructions for receiving or a processor and memory configured to receive, over the relay communication link, an indication of third one or more resources configured by the base station for transmission of a second sidelink transmission from a UE distinct from the remote UE, where the indication of the third one or more resources may be encoded according to a radio network temporary identifier of the UE distinct from the remote UE.

In some examples of the method, apparatuses, and non-transitory computer-readable medium described herein, the radio network temporary identifier by which the indication of the third one or more resources may be encoded may be the same as the radio network temporary identifier by which the indication of the one or more resources may be encoded.

In some examples of the method, apparatuses, and non-transitory computer-readable medium described herein, the radio network temporary identifier by which the indication of the third one or more resources may be encoded may be distinct from the radio network temporary identifier of the UE by which the indication of the one or more resources may be encoded.

Some examples of the method, apparatuses, and non-transitory computer-readable medium described herein may further include operations, features, means, or instructions for transmitting or a processor and memory configured to transmit, over the relay communication link, a scheduling request based on receiving the sidelink transmission, where receiving the indication of the one or more resources may be based on transmitting the scheduling request.

Some examples of the method, apparatuses, and non-transitory computer-readable medium described herein may further include operations, features, means, or instructions for receiving or a processor and memory configured to receive, over the sidelink communication link, an indication of a mapping between a logical channel of the remote UE and a priority of the logical channel.

In some examples of the method, apparatuses, and non-transitory computer-readable medium described herein, the indication may be provided by the sidelink transmission, a received medium access control service data unit header, or both.

In some examples of the method, apparatuses, and non-transitory computer-readable medium described herein, the sidelink transmission includes a first buffer status report and the relay transmission includes a second buffer status report.

Some examples of the method, apparatuses, and non-transitory computer-readable medium described herein may further include operations, features, means, or instructions for receiving or a processor and memory configured to receive, from a UE distinct from the remote UE, a third buffer status report corresponding to data stored at the UE distinct from the remote UE, where the second buffer status report includes an aggregated buffer status of the remote UE and of the UE distinct from the remote UE.

Some examples of the method, apparatuses, and non-transitory computer-readable medium described herein may further include operations, features, means, or instructions for initiating or a processor and memory configured to initiate a prohibit timer for the UE distinct from the remote UE, where the second buffer status report excludes an identifier of the UE distinct from the remote UE based on the prohibit timer running when the first buffer status report may be received.

Some examples of the method, apparatuses, and non-transitory computer-readable medium described herein may further include operations, features, means, or instructions for receiving or a processor and memory configured to receive, from a UE distinct from the remote UE, a third buffer status report corresponding to data stored at the UE distinct from the remote UE, where the second buffer status report includes one or more buffer statuses indicated by the first buffer status report and one or more buffer statuses indicated by the third buffer status report.

Some examples of the method, apparatuses, and non-transitory computer-readable medium described herein may further include operations, features, means, or instructions for transmitting or a processor and memory configured to transmit the second buffer status report may be based on the first buffer status report including a non-empty logical channel group whose priority may be higher than each logical channel group associated with additional data stored at the relay UE.

Some examples of the method, apparatuses, and non-transitory computer-readable medium described herein may further include operations, features, means, or instructions for transmitting or a processor and memory configured to transmit the second buffer status report may be based on expiry of a periodic buffer status report timer configured at the relay UE.

In some examples of the method, apparatuses, and non-transitory computer-readable medium described herein, the sidelink transmission includes a transmission of data and the relay transmission includes a buffer status report, and where transmitting the buffer status report may be based on the relay UE having an empty buffer when receiving the transmission of the data, the data having a higher priority than additional data stored at the relay UE, or both.

A method for wireless communications at a base station is described. The method may include establishing a communication link with a remote UE, the communication link including a sidelink communication link between the remote UE and a relay UE and a relay communication link between the relay UE and the base station. The method may include transmitting, over the relay communication link, an indication of one or more resources configured for transmission of a relay transmission corresponding to data stored at the remote UE. The method may include receiving, over the relay communication link, the relay transmission over the one or more resources.

An apparatus for wireless communications at a base station is described. The apparatus may include a processor and memory coupled to the processor, the processor and the memory configured to establish a communication link with a remote UE, the communication link including a sidelink communication link between the remote UE and a relay UE and a relay communication link between the relay UE and the base station, transmit, over the relay communication link, an indication of one or more resources configured for transmission of a relay transmission corresponding to data stored at the remote UE, and receive, over the relay communication link, the relay transmission over the one or more resources.

Another apparatus for wireless communications at a base station is described. The apparatus may include means for establishing a communication link with a remote UE, the communication link including a sidelink communication link between the remote UE and a relay UE and a relay communication link between the relay UE and the base station, means for transmitting, over the relay communication link, an indication of one or more resources configured for transmission of a relay transmission corresponding to data stored at the remote UE, and means for receiving, over the relay communication link, the relay transmission over the one or more resources.

A non-transitory computer-readable medium storing code for wireless communications at a base station is described. The code may include instructions executable by a processor to establish a communication link with a remote UE, the communication link including a sidelink communication link between the remote UE and a relay UE and a relay communication link between the relay UE and the base station, transmit, over the relay communication link, an indication of one or more resources configured for transmission of a relay transmission corresponding to data stored at the remote UE, and receive, over the relay communication link, the relay transmission over the one or more resources.

Some examples of the method, apparatuses, and non-transitory computer-readable medium described herein may further include operations, features, means, or instructions for receiving or a processor and memory configured to receive, over the relay communication link, a scheduling request, and operations, features, means, or instructions for transmitting or a processor and memory are configured to transmit, over the relay communication link, an indication of second one or more resources configured by the base station for transmission of a sidelink transmission corresponding to the data stored at the remote UE from the remote UE to the relay UE, where the relay transmission may be received based on transmitting the indication of the second one or more resources.

Some examples of the method, apparatuses, and non-transitory computer-readable medium described herein may further include operations, features, means, or instructions for transmitting or a processor and memory configured to transmit, over the relay communication link, an indication of third one or more resources configured by the base station for transmission of control signaling including a request for resources on the sidelink communication link, and receiving or a processor and memory configured to receive, over the relay communication link, the control signaling including the request for resources on the sidelink communication link, where transmitting the indication of the second one or more resources may be based on receiving the request for resources on the sidelink communication link.

In some examples of the method, apparatuses, and non-transitory computer-readable medium described herein, the control signaling includes a medium access control (MAC) control element including the request for resources on the sidelink communication link.

Some examples of the method, apparatuses, and non-transitory computer-readable medium described herein may further include operations, features, means, or instructions for receiving or a processor and memory configured to receive, over the relay communication link, an indication that the sidelink transmission was successfully received and decoded by the relay UE.

In some examples of the method, apparatuses, and non-transitory computer-readable medium described herein, the indication includes an identifier of the remote UE.

In some examples of the method, apparatuses, and non-transitory computer-readable medium described herein, the scheduling request indicates an identifier of the remote UE, and where the indication of the second one or more resources may be transmitted based on the scheduling request indicating the identifier of the remote UE.

In some examples of the method, apparatuses, and non-transitory computer-readable medium described herein, the indication of the second one or more resources includes at least one radio link control protocol data unit including an identifier of the remote UE.

In some examples of the method, apparatuses, and non-transitory computer-readable medium described herein, the indication of the second one or more resources may be encoded according to a radio network temporary identifier of the remote UE.

In some examples of the method, apparatuses, and non-transitory computer-readable medium described herein, the indication of the one or more resources may be encoded according to a radio network temporary identifier of the relay UE.

In some examples of the method, apparatuses, and non-transitory computer-readable medium described herein, the radio network temporary identifier by which the indication of the second one or more resources may be encoded may be the same as the radio network temporary identifier by which the indication of the one or more resources may be encoded.

In some examples of the method, apparatuses, and non-transitory computer-readable medium described herein, the radio network temporary identifier by which the second one or more resources may be encoded may be distinct from the radio network temporary identifier by which the one or more resources may be encoded.

Some examples of the method, apparatuses, and non-transitory computer-readable medium described herein may further include operations, features, means, or instructions for transmitting or a processor and memory configured to transmit, over the relay communication link, an indication of third one or more resources configured by the base station for transmission of a second sidelink transmission from a UE distinct from the remote UE, where the indication of the third one or more resources may be encoded according to a radio network temporary identifier of the UE distinct from the remote UE.

In some examples of the method, apparatuses, and non-transitory computer-readable medium described herein, the radio network temporary identifier by which the indication of the third one or more resources may be encoded may be the same as the radio network temporary identifier by which the indication of the one or more resources may be encoded.

In some examples of the method, apparatuses, and non-transitory computer-readable medium described herein, the radio network temporary identifier by which the indication of the third one or more resources may be encoded may be distinct from the radio network temporary identifier by which the indication of the one or more resources may be encoded.

In some examples of the method, apparatuses, and non-transitory computer-readable medium described herein, the scheduling request may be received over a time location on the sidelink communication link, a frequency location on the sidelink communication link, or both that indicates that the scheduling request may be associated with the remote UE.

In some examples of the method, apparatuses, and non-transitory computer-readable medium described herein, the relay transmission includes a buffer status report.

In some examples of the method, apparatuses, and non-transitory computer-readable medium described herein, the buffer status report includes an aggregated buffer status of the remote UE and of a UE distinct from the remote UE.

In some examples of the method, apparatuses, and non-transitory computer-readable medium described herein, the buffer status report includes one or more buffer statuses associated with the remote UE and one or more buffer statuses associated with a UE distinct from the remote UE.

BRIEF DESCRIPTION OF THE DRAWINGS

FIGS. 4-8 illustrates examples of uplink scheduling procedures that support scheduling uplink transmission of a relay in accordance with one or more aspects of the present disclosure.

FIGS. 18 through 23 show flowcharts illustrating methods that support scheduling uplink transmission of a relay in accordance with one or more aspects of the present disclosure.

DETAILED DESCRIPTION

The described techniques relate to improved methods, systems, devices, and apparatuses that support scheduling uplink transmission of a relay. In some examples, a base station may communicate with a first wireless device (e.g., a user equipment (UE)) within a coverage area of the base station. For instance, the base station may receive a transmission (e.g., buffer status report (BSR)) from the first wireless device. However, in some examples, the base station may be incapable of receiving and/or successfully decoding a transmission (e.g., a BSR) from a second wireless device (e.g., another UE) that is outside of a coverage area of the base station.

To enable the base station to receive the transmission from the second wireless device, the second wireless device (e.g., a remote UE) may establish a communication link with a base station via the first wireless device (e.g., a relay UE). For instance, the first wireless device may establish a first communication link (e.g., a sidelink communication link) with the second wireless device and may establish a second communication link (e.g., a relay communication link) with the base station. Establishing the first and second communication links may enable the second wireless device to communicate with the base station. In some cases, the base station may schedule communications between the second wireless device and the base station that enable the base station to communicate with the second wireless device. For instance, the base station may schedule the first wireless device to transmit a first BSR that is generated using a second BSR received from the second wireless device by the first wireless device.

By communicating with the second wireless device via the first wireless device, the base station may have an increased range of communications. Additionally or alternatively, the base station may use a same beam to communicate with the first wireless device and the second wireless device instead of different beams in a scenario in which the first wireless device and the second wireless device convey transmissions to the base station separately.

Aspects of the disclosure are initially described in the context of wireless communications systems. Additional aspects of the disclosure in the context of an additional wireless communications system, communications models, uplink scheduling procedures, and a process flow. Aspects of the disclosure are further illustrated by and described with reference to apparatus diagrams, system diagrams, and flowcharts that relate to scheduling uplink transmission of a relay.

Figure 1:
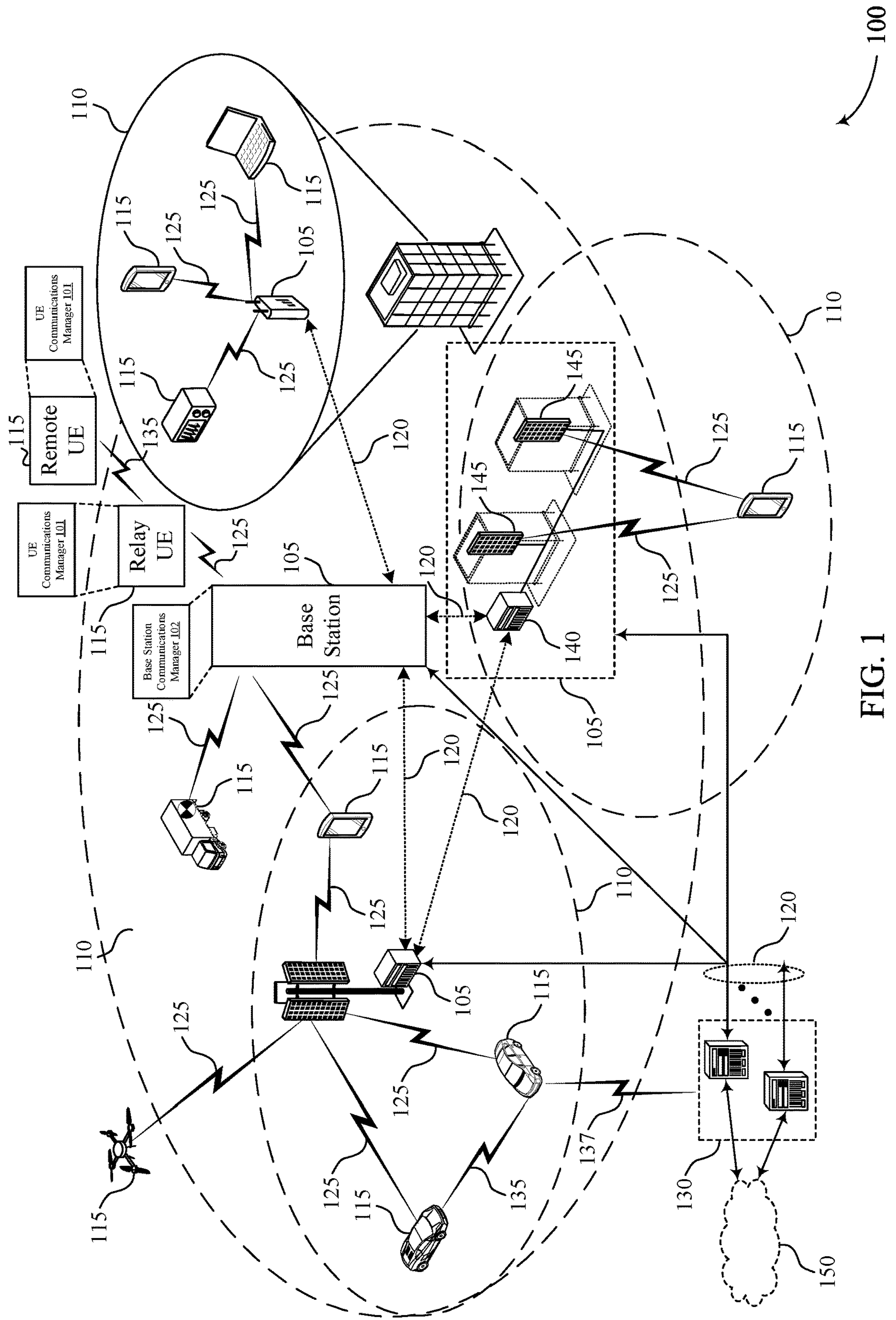
FIG. 1 illustrates an example of a wireless communications system that supports scheduling uplink transmission of a relay in accordance with one or more aspects of the present disclosure.

FIG. 1 illustrates an example of a wireless communications system 100 that supports scheduling uplink transmission of a relay in accordance with one or more aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links. A UE 115 may communicate with the core network 130 through communication link 137.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof.

For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, in some cases in the range of 300 megahertz (MHz) to 300 gigahertz (GHz). In some cases, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the medium access control (MAC) layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). A wireless network, for example a wireless local area network (WLAN), such as a Wi-Fi (i.e., Institute of Electrical and Electronics Engineers (IEEE) 802.11) network may include an access point (AP) that may communicate with one or more wireless or mobile devices. The AP may be coupled to a network, such as the Internet, and may enable a mobile device to communicate via the network (or communicate with other devices coupled to the access point). A wireless device may communicate with a network device bi-directionally. For example, in a WLAN, a device may communicate with an associated AP via downlink (e.g., the communication link from the AP to the device) and uplink (e.g., the communication link from the device to the AP). A wireless personal area network (PAN), which may include a Bluetooth connection, may provide for short range wireless connections between two or more paired wireless devices. For example, wireless devices such as cellular phones may utilize wireless PAN communications to exchange information such as audio signals with wireless headsets.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

In some cases, a relay UE 115 may be used to enable communications between a remote UE 115 and a base station 105. Data may be communicated between the remote UE 115 and the relay UE 115 by sidelink communication. In some cases, multiple remote UEs 115 may be supported by the same relay UE 115. An example of a relay UE 115 may be described in further detail with regards to FIG. 2.

In some cases, the relay UE 115 may use device to device (D2D) communications. A first mode of D2D that the relay UE 115 may use may involve a base station 105 allocating resources (e.g., dynamic or configured resources) for sidelink transmissions between the relay UE 115 and a remote UE 115. A second mode of D2D that the relay UE 115 may use may involve the relay UE 115 autonomously selecting sidelink resources for communication (e.g., the base station 105 may not be involved). The methods as described herein may be used when the first mode of D2D is being used.

The UE communications manager 101, which may be included in a relay UE 115, may establish a communication link between a remote UE 115 and a base station 105, where the communication link includes a sidelink communication link between the remote UE 115 and the relay UE 115 and a relay communication link between the relay UE 115 and the base station 105. UE communications manager 101 may receive, over the sidelink communication link, a first BSR corresponding to data stored at the remote UE 115. UE communications manager 101 may receive, over the relay communication link, an indication of one or more resources configured for transmission of a second BSR corresponding to the data stored at the remote UE 115. UE communications manager 101 may transmit, over the relay communication link, the second BSR over the one or more resources based on receiving the first BSR.

Additionally or alternatively, the UE communications manager 101 may receive, over a first communication link between a first device and a second device, a first transmission corresponding to data stored at the second device. The UE communications manager 101 may receive, over a second communication link between the first device and a base station, an indication of one or more resources configured for transmission of a second transmission corresponding to the data stored at the second device. The UE communications manager 101 may transmit, over the second communication link, the second transmission over the one or more resources based on receiving the first transmission.

The base station communications manager 102, which may be included in a base station 105, may establish a communication link with a remote UE 115, the communication link comprising a sidelink communication link between the remote UE 115 and a relay UE 115 and a relay communication link between the relay UE 115 and the base station 105. The base station communications manager 102 may transmit, over the relay communication link, an indication of one or more resources configured for transmission of a BSR corresponding to the data stored at the remote UE 115. The base station communications manager 102 may receive, over the relay communication link, the BSR over the one or more resources.

Additionally or alternatively, the base station communications manager 102 may transmit, over a first communication link between the base station and a first device, an indication of one or more resources configured for transmission of a first transmission corresponding to data stored at a second device. The base station communications manager 102 may receive, over the first communication link, the first transmission over the one or more resources.

Figure 2:
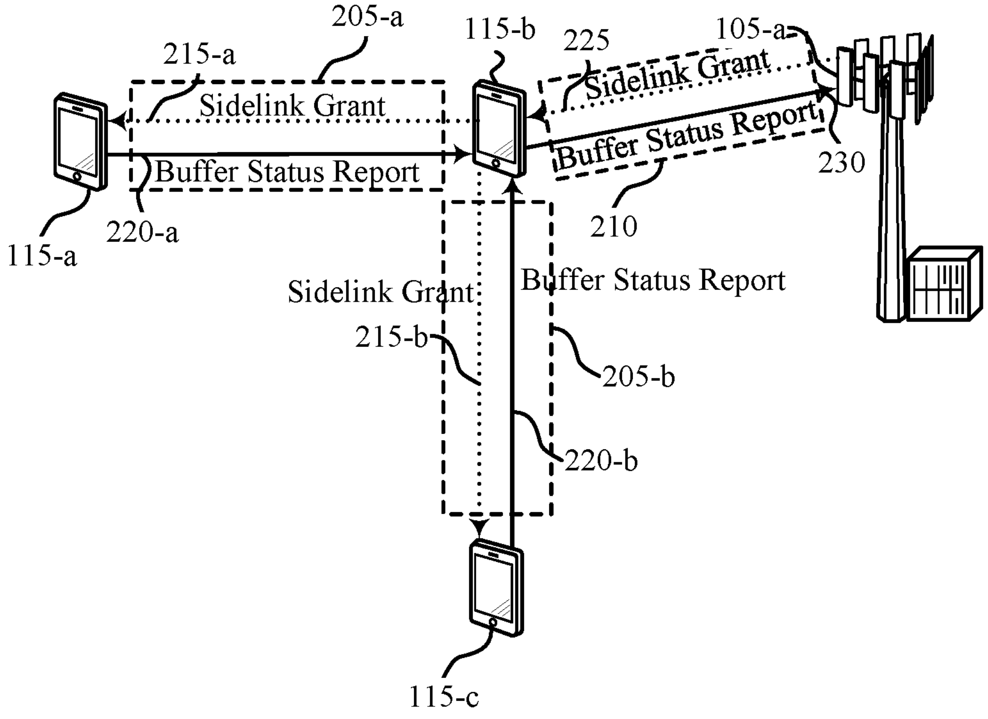
FIG. 2 illustrates an example of a wireless communications system that supports scheduling uplink transmission of a relay in accordance with one or more aspects of the present disclosure.

FIG. 2 illustrates an example of a wireless communications system 200 that supports scheduling uplink transmission of a relay in accordance with one or more aspects of the present disclosure. In some examples, wireless communications system 200 may implement aspects of wireless communications system 100. For instance, base station 105-*a* may be an example of a base station 105 as described with reference to FIG. 1 and UEs 115-*a* and 115-*b* may be examples of UEs 115 as described with reference to FIG. 1. UE 115-*a* may be an example of a remote UE 115 and UE 115-*b* may be an example of a relay UE 115. Relay UE 115-*b* may establish a sidelink communication link 205-*a* with remote UE 115-*a*; a sidelink communication link 205-*b* with UE 115-*c*; and a relay communication link 210 with base station 105-*a*. Although a relay UE 115 *b* is described herein, there may be examples where another device (e.g., a relay node or a relay base station 105) performs the functions of relay UE 115 *b*.

In some cases, a remote UE 115-*a* may transmit a BSR 220-*a* to a relay UE 115-*b*. Similarly, remote UE 115-*c* may transmit a BSR 220-*b* to the relay UE 115-*b*. Each BSR may indicate a buffer size of one or more buffers at the corresponding remote UE 115 (e.g., UE 115-*a* for BSR 220-*a* and UE 115-*c* for BSR 220-*b*), where each buffer may correspond to a different logical channel group (LCG).

The relay UE 115-*b*, after receiving BSRs 220-*a* and/or 220-*b*, may transmit a BSR 230 to base station 105-*a*. The BSR 230 may be generated based on BSR 220-*a* and/or 220-*b*. For instance, as described with reference to FIG. 3A, if UEs 115-*a* and 115-*c* share a common radio link control (RLC) and MAC entity and if UE 115-*a* and 115-*c* are configured with the same set of LCGs, the BSR 230 may report an aggregated buffer status for UEs 115-*a* and 115-*c*. Alternatively, the BSR 230 may report a buffer status for one of UEs 115-*a* and 115-*c* and may include an identifier (ID) indicating which UE 115 the BSR 230 corresponds to. Such a BSR 230 may be referred to as an enhanced BSR.

In some cases, the relay UE 115-*b* may transmit a sidelink grant 215-*a* to remote UE 115-*a* over the sidelink communication link 205-*a*. Similarly, relay UE 115-*b* may transmit a sidelink grant 215-*b* to remote UE 115-*c* over sidelink communication link 205-*b*. A sidelink grant 215 may indicate one or more resources configured for transmission of a BSR 220. Remote UE 115-*a* may transmit BSR 220-*a* to the relay UE 115-*b* over the one or more resources configured by sidelink grant 215-*a* and UE 115-*c* may transmit BSR 220-*b* to relay UE 115-*b* over the one or more resources configured by sidelink grant 215-*b*.

In some cases, relay UE 115-*b* may receive a sidelink grant 225. If UE 115-*a* and 115-*c* share a same common RLC and MAC entity, the sidelink grant 225 may indicate the one or more resources configured for transmitting BSR 220-*a* and the one or more resources configured for transmitting BSR 220-*b*. Alternatively, the sidelink grant 225 may indicate the one or more resources configured for transmitting one of the BSRs 220. In such cases, base station 105-*a* may transmit an additional sidelink grant 215 for the other BSR 220.

In some cases, UEs 115-*a* and/or 115-*c* may receive sidelink grants 215 based on transmitting a first SR to relay UE 115-*b*. In one example, relay UE 115-*b*, after receiving the first SR, may transmit a second SR to base station 105-*a*; may receive an uplink grant from base station 105-*a*; and may transmit a remote resource request to base station 105-*a* over resources indicated by the uplink grant, where the remote resource request may indicate the remote UE 115 that transmitted the first SR. Relay UE 115-*b* may, in turn, receive a sidelink grant 225 that configures the one or more resources for the remote UE 115 that transmitted the SR. Additional details about the remote resource request may be described with reference to FIG. 4. In another example, relay UE 115-*b* may transmit a second SR to base station 105-*a* that explicitly indicates the remote UE 115 that transmitted the first SR. In such cases, relay UE 115-*b* may receive the sidelink grant 225 that configures the one or more resources for the remote UE 115 that transmitted the first SR after transmitting the second SR (e.g., without first receiving an uplink grant and then transmitting a remote resource request). Additional details about second SRs that explicitly indicate the remote UE 115 may be described with reference to FIG. 5.

In other cases, UEs 115-*a* and/or 115-*c* may not transmit SRs. In such cases, UEs 115-*a* and 115-*c* may transmit corresponding BSRs 220 to relay UE 115-*b* over preconfigured resources. Relay UE 115-*b*, after receiving a BSR 220, may transmit an SR to base station 105-*a*. Base station 105-*a* may transmit an uplink grant to relay UE 115-*b* indicating one or more resources configured for relay UE 115-*b* to transmit a BSR 230 for the remote UE 115 that transmitted the BSR 220. Relay UE 115-*b* may transmit the BSR 220 to base station 105-*a*. Additional details about such techniques may be described with reference to FIG. 6.

In one or more aspects, the described techniques may support improvements in wireless communications. For instance, by scheduling transmissions via relay UE 115-*b*, base station 105-*a* may schedule transmissions for remote UEs 115 (e.g., 115-*a* and 115-*c*) that are outside of a coverage area 110 of base station 105-*a*. Additionally, the techniques as described herein may enable base station 105-*a* to receive BSRs for remote UEs 115.

Figures 3A, 3B:
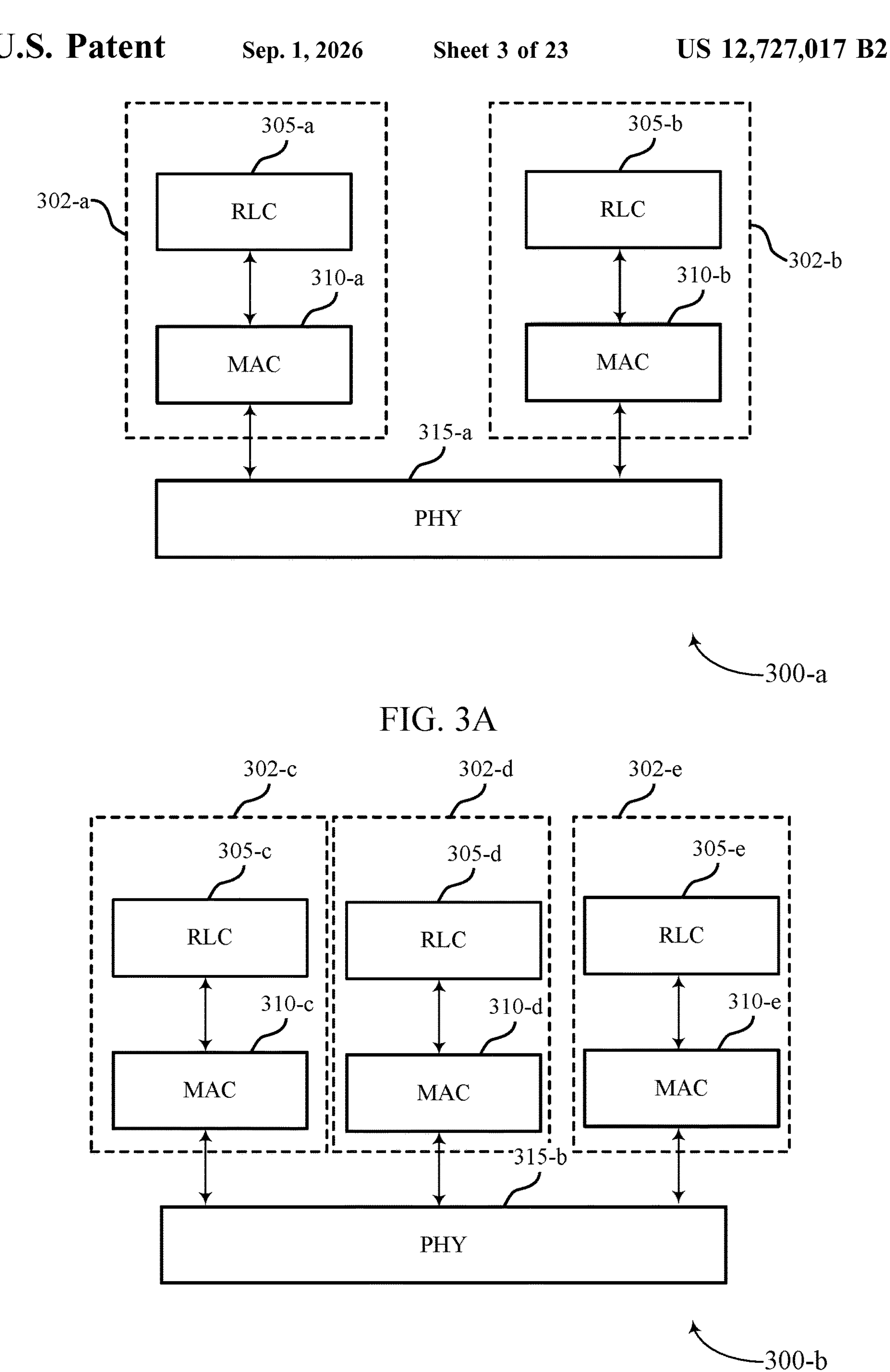
FIGS. 3A and 3B illustrate examples of communications models that support scheduling uplink transmission of a relay in accordance with one or more aspects of the present disclosure.

FIGS. 3A and 3B illustrate examples of communications models 300-*a* and 300-*b* that support scheduling uplink transmission of a relay in accordance with one or more aspects of the present disclosure. In some examples, communications models 300-*a* and 300-*b* may implement aspects of wireless communications system 100. Communications models 300-*a* and 300-*b* may depict models of MAC and RLC on a relay communication link 210.

Communications model 300-*a* may have UEs 115 organized into multiple groups 302 (or sets). For instance, communications model 300-*a* may have a first group 302-*a* of UEs 115 sharing a first RLC entity 305-*a* and a first MAC entity 310-*a* and a second group 302-*b* of UEs 115 sharing a second RLC entity 305-*b* and a second MAC entity 310-*b*. UEs 115 within a group 302 may share common instances of MAC and RLC procedures (e.g., their RLC protocol data units (PDU) may be multiplexed in the same MAC PDU). Additionally, the traffic between different groups 302 may not be mixed and may be scheduled separately (e.g., a single sidelink grant transmitted by a base station 105 may not schedule traffic for a UE 115 in the first group 302-*a* and a UE 115 in the second group 302-*b*). In some examples, each UE 115 (remote and relay UEs 115) may be mixed in a single group 302. In other examples, the relay UE 115 may be in a first group 302 and each remote UE 115 may be in a second group 302. Each group 302 may have an associated radio network temporary identifier (RNTI) (e.g., a first RNTI for group 302-*a* and a second RNTI for group 302-*b*). Communications model 300-*a* may be used for the implementations described with reference to FIGS. 4, 5, and 6.

In general, for communications model 300-*a*, RLC SDUs from UEs 115 in a same group 302 (which, as noted herein, may include a relay UE 115) may be multiplexed in the same MAC PDU. Each RLC PDU may contain a unique identifier to identify which UE 115 of a group 302 that RLC PDU is from or for. A single HARQ entity may handle MAC-layer transmissions for each group 302 between the relay UE 115 and a base station 105, which may be addressed to the cell-RNTI (C-RNTI) for that group 302.

When using communications model 300-*a*, a base station 105 may manage quality of service (QoS) through the relay UE 115. Data flow through the relay UE 115 may have different priorities. However, the relay UE 115 may merge received data (e.g., from remote UEs 115) with its own data of a same priority. To enable the relay UE 115 to perform the merging, the network (e.g., via the base station 105) may configure a mapping between a logical channel (LCH) and its priority at a remote UE 115 of the relay UE 115. The mapping may be signaled to the relay UE 115 via the remote UE 115 or may be carried in the BSR or each MAC SDU header transmitted by the remote UE 115. Explicit signaling by the remote UE 115 may support improvements in one or more ways. For instance, the mapping may not be dynamic. As such, indicating the mapping a single time may be sufficient for performing the merging.

In some cases, for communications model 300-*a*, a BSR may include an aggregated buffer status for all UEs 115 in the same group 302. Such a BSR may be referred to as an aggregated BSR. In cases where a relay UE 115 transmits an aggregated BSR, each UE in a group 302 may be configured with the same set of LCGs. The UEs 115 in a group 302 may be configured with the same set of LCGs to avoid UEs 115 in the group 302 having different LCG configurations (e.g., the relay UE 115 having one LCG and the remote UE 115 having 8) and/or having the same LCH but different priorities, each of which may prevent the relay UE 115 from being able to perform buffer status aggregation.

For cases where a relay UE 115 transmits an aggregated BSR, each group 302 may be configured with its own BSR prohibit timer. What a relay UE 115 reports for LCG g may be data from any remote UE 115 in the same group whose priority is equal to or lower than the priority of LCG g but higher than the priority of LCG g+1. The priority of an LCG may equal the highest priority of LCHs in that LCG. Additionally, LCGs may be sorted in decreasing order in their priority in BSR MAC CE.

Triggering conditions for BSR may include new data from any UE 115 in a group 302 arriving at the relay UE while this group 302 has no data buffered at the relay UE 115. Additionally or alternatively, a BSR may be triggered if the new data has a priority higher than any data in the group 302 currently buffered at the relay UE 115 when the new data arrives. Additionally or alternatively, a BSR may be triggered if sidelink BSR from a remote UE 115 in the group 302 is received by the relay UE 115, which may contain a non-empty LCG whose priority is higher than any data in the group 302 buffered at the relay UE 115. Additionally or alternatively, BSR may be triggered upon expiry of a periodic BSR timer configured at the relay UE 115.

In some cases, for communications model 300-*a*, a BSR may differentiate between buffer statuses for different remote UEs 115. For instance, a first section of the BSR may report buffer statuses for LCGs of a first remote UE 115 and a second section of the BSR may report buffer statuses for LCGs of a second remote UE 115. As such, buffer status for different remote UEs 115 may be reported separately. Such a BSR may be referred to as an enhanced BSR. Since the BSR may be directed to single remote UEs 115, UEs 115 within a group may be enabled to have different sets of LCGs. The triggering conditions for an enhanced BSR may be the same as those described for the aggregated BSR.

The enhanced BSR may include buffer statuses for the UE 115 whose new data triggered the enhanced BSR. However, the enhanced BSR may not include buffer statuses for UEs whose prohibit timers are running when the MAC PDU which includes the BSR MAC CE is assembled. The relay UE 115 may have a prohibit timer for each UE 115 in a group and, after sending an enhanced BSR, may start the prohibit timers for each UE 115 whose buffer statuses was reported in the enhanced BSR. By using prohibit timers to limit how often buffer statuses are reported, the amount of overhead associated with reporting buffer statuses may be decreased.

Communications model 300-*b* may have no mixing between UEs 115 (e.g., each group may contain one remote UE 115 or one relay UE 115). For instance, a first UE 115 in group 302-*c* (e.g., a remote UE 115) may use a first RLC entity 305-*c* and a first MAC entity 310-*c*, a second UE 115 in group 302-*d* (e.g., a remote UE 115) may use a second RLC entity 305-*d* and a second MAC entity 310-*d*, and a third UE 115 in group 302-*e* (e.g., another remote UE 115) may use a third RLC entity 305-*e* and a third MAC entity 310-*e*. Each group 302 may have an associated RNTI (e.g., a first RNTI for group 302-*c*, a second RNTI for group 302-*d*, and a third RNTI for group 302-*e*). Communications model 300-*b* may be used for the implementations described with reference to FIGS. 7 and 8.

As noted herein, for communications model 300-*b*, each remote UE 115 may have its own associated instance of MAC and RLC procedures at the relay UE 115. A separate HARQ entity and scheduling RNTI may be configured for each remote UE 115 and each remote UE 115 may have its own dedicated SR configuration at the relay UE 115. When an SR associated with a remote UE 115 is triggered at the relay UE 115, a base station may identify which remote UE 115 the SR is for based on the physical uplink control channel (PUCCH) transmission occasion of the transmission. Additional details about using the transmission occasion may be described with reference to FIGS. 7 and 8.

In some cases, for communications model 300-*b*, a BSR may be triggered by each remote UE 115 individually and may report buffer statuses for a single UE 115. For instance, when a relay UE 115 receives new data or a new sidelink BSR from a remote UE 115, the relay UE 115 may trigger a BSR to be sent to a base station if the remote UE 115 has no data buffered at the relay UE 115; has no data with a priority higher than that of the new data; the sidelink BSR contains a non-empty LCG whose priority is higher than that of any other buffered data at the remote UE; or a combination thereof. As such a BSR may be directed to a single UE, no ID of the remote UE 115 which triggered the BSR may be included in the BSR. Alternatively, for communications model 300-*b*, an enhanced BSR as described herein may be transmitted, which may include the same triggering conditions as described herein.

FIG. 4 illustrates an example of an uplink scheduling procedure 400 that supports scheduling uplink transmission of a relay in accordance with one or more aspects of the present disclosure. In some examples, uplink scheduling procedure 400 may implement aspects of wireless communications system 100. For instance, base station 105-*b* may be an example of a base station 105 as described with reference to FIG. 1 and UEs 115-*d* and 115-*e* may be examples of UEs 115 as described with reference to FIG. 1.

Initially, remote UE 115-*e* may transmit a first SR 405 to relay UE 115-*d*. Relay UE 115-*d*, after receiving the first SR 405, may transmit a second SR 410 to base station 105-*b* (e.g., first SR 405 may trigger second SR 410 on PUCCH). In some cases, the second SR 410 may be subject to a SR prohibit timer of relay UE 115-*d*. In such cases, relay UE 115-*d* may keep the second SR 410 pending if the prohibit timer associated with the PUCCH configuration whose priority is the same as the first SR 405 is running.

The base station 105-*b*, after receiving the second SR 410, may transmit an uplink grant 415-*a* addressed to relay UE 115-*d* which may indicate one or more resources configured for relay UE 115-*d* to transmit a remote resource request 420. Relay UE 115-*d* may transmit the remote resource request 420 to base station 105-*b* over the one or more resources configured by the uplink grant 415-*a*. In some cases, relay UE 115-*d* may transmit the remote resource request 420 to indicate which remote UE 115 the second SR is for. For instance, in the present example, the remote resource request 420 may indicate UE 115-*e*. The remote resource request may be signaled in a MAC CE, which may be referred to as a remote resource request MAC CE. The remote resource request 420 may indicate an RNTI of UE 115-*e*, a UE ID (UEID) of UE 115-*e*, or both.

After receiving the remote resource request, base station 105-*b* may transmit a sidelink grant 425 addressed to UE 115-*e* to relay UE 115-*d*. The sidelink grant 425 may indicate one or more resources configured for transmitting a BSR 435 from remote UE 115-*e* to relay UE 115-*d*. Relay UE 115-*d*, after receiving the sidelink grant 425, may transmit a sidelink grant 430 to remote UE 115-*e* indicating the one or more resource configured for transmitting the BSR 435. In cases where the remote resource request indicates relay UE 115-*d*, base station 105-*b* may transmit an uplink grant (e.g., a Uu uplink grant) instead of sidelink grant 425.

Remote UE 115-*e*, after receiving the sidelink grant 430, may transmit a BSR 435 over the one or more resources. Additionally, remote UE 115-*e* may transmit data corresponding to the BSR 435 (e.g., data whose buffer status the BSR 435 is reporting). Relay UE 115-*e*, after successfully receive and decoding the BSR 435, may transmit a HARQ ACK 440 to base station 105-*b* indicating that the relay UE 115-*e* successfully received and decoded the BSR 435.

At 445, relay UE 115-*e* may trigger a BSR 450. BSR 450 may be an aggregated BSR or an enhanced BSR, as described with reference to FIG. 2. After receiving the HARQ ACK 440, base station 105-*b* may transmit an uplink grant 415-*b* indicating one or more resources configured for transmitting the BSR 450 and/or the corresponding data. Relay UE 115-*d* may transmit the BSR 450 and/or the corresponding data over the one or more resources. In cases where relay UE 115-*d* and remote UE 115-*e* are in a same group 302 (e.g., MAC is shared among relay UE 115-*d* and remote UE 115-*e*), each uplink grant 415 may be addressed to the C-RNTI associated with the group. Each RLC PDU transmitted to base station 105-*b* may include an ID indicating from which UE 115 it is.

Figure 5:
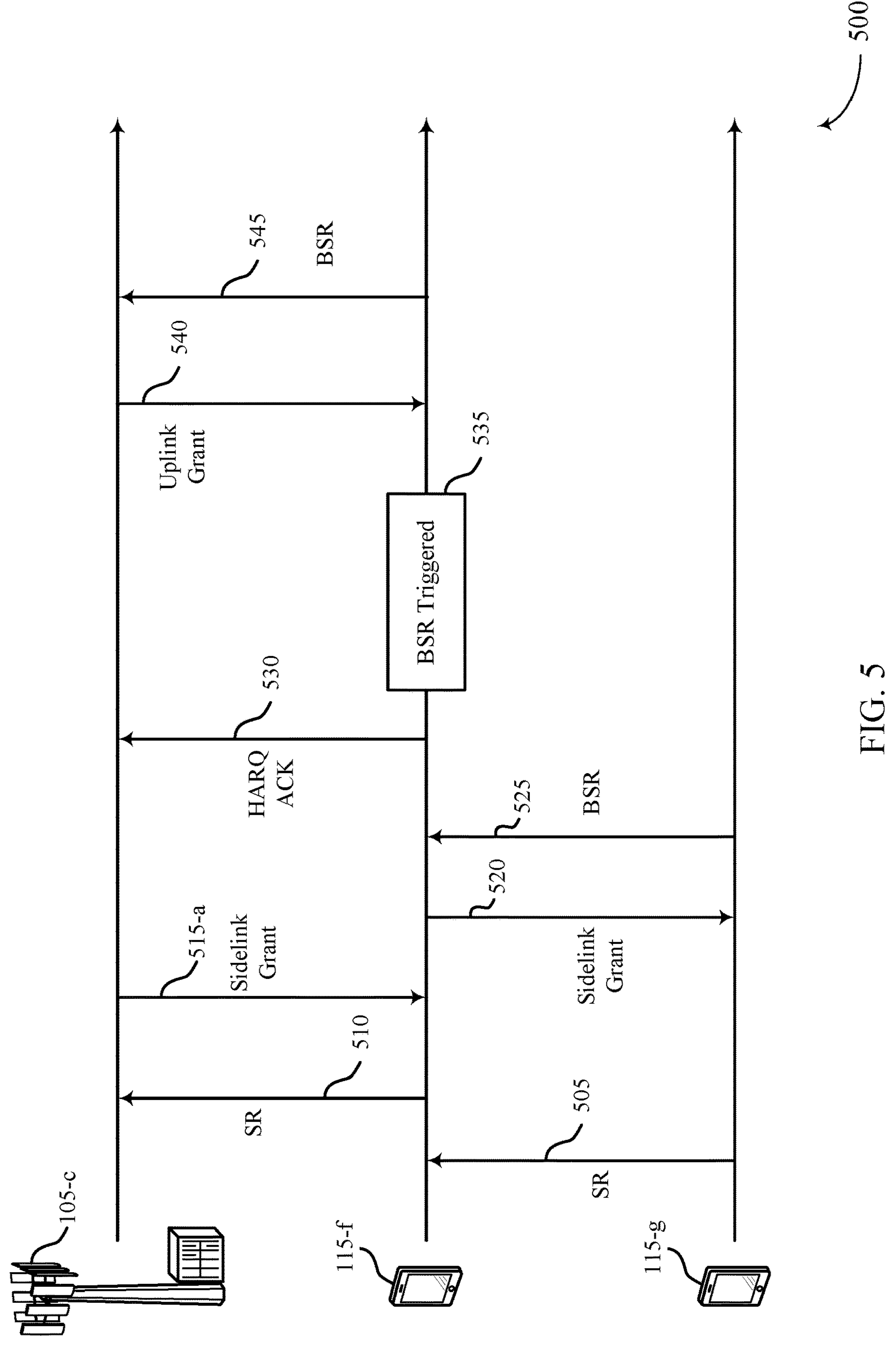

FIG. 5 illustrates an example of an uplink scheduling procedure 500 that supports scheduling uplink transmission of a relay in accordance with one or more aspects of the present disclosure. In some examples, uplink scheduling procedure 500 may implement aspects of wireless communications system 100. For instance, base station 105-*c* may be an example of a base station 105 as described with reference to FIG. 1 and UEs 115-*f* and 115-*g* may be examples of UEs 115 as described with reference to FIG. 1.

Initially, remote UE 115-*g* may transmit a first SR 505 to relay UE 115-*f* Relay UE 115-*f*, after receiving the first SR 505, may transmit a second SR 510 to base station 105-*c* (e.g., first SR 505 may trigger second SR 510 on PUCCH). In some cases, the second SR 510 may be subject to an SR prohibit timer of relay UE 115-*f* In such cases, relay UE 115-*f* may keep the second SR 510 pending if the prohibit timer associated with the PUCCH configuration whose priority is the same as the first SR 505 is running. The second SR 510 may be a multi-bit SR that may include an ID of remote UE 115-*g* (e.g., the remote UE 115 requesting an uplink grant).

After receiving the second SR 510, base station 105-*c* may transmit a sidelink grant 515 addressed to remote UE 115-*g* to relay UE 115-*f*. The sidelink grant 515 may indicate one or more resources configured for transmitting a BSR 525 from remote UE 115-*g* to relay UE 115-*f* Relay UE 115-*f*, after receiving the sidelink grant 515, may transmit a sidelink grant 520 to remote UE 115-*g* indicating the one or more resource configured for transmitting the BSR 525. In cases where the second SR 510 indicates relay UE 115-*f*, base station 105-*c* may transmit an uplink grant (e.g., a Uu uplink grant) instead of sidelink grant 515.

Remote UE 115-*g*, after receiving the sidelink grant 520, may transmit a BSR 525 over the one or more resources. Additionally, remote UE 115-*g* may transmit data corresponding to the BSR 525 (e.g., data whose buffer status the BSR 525 is reporting). Relay UE 115-*g*, after successfully receive and decoding the BSR 525, may transmit a HARQ ACK 530 to base station 105-*c* indicating that the relay UE 115-*g* successfully received and decoded the BSR 525.

At 535, relay UE 115-*g* may trigger a BSR 545. BSR 545 may be an aggregated BSR or an enhanced BSR, as described with reference to FIG. 2. After receiving the HARQ ACK 530, base station 105-*c* may transmit an uplink grant 540 indicating one or more resources configured for transmitting the BSR 545 and/or the corresponding data. Relay UE 115-*f* may transmit the BSR 525 and/or the corresponding data over the one or more resources. In cases where relay UE 115-*f* and remote UE 115-*g* are in a same group 302 (e.g., MAC is shared among relay UE 115-*f* and remote UE 115-*g*), each uplink grant 540 may be addressed to the C-RNTI associated with the group. Each RLC PDU transmitted to base station 105-*c* may include an ID indicating from which UE 115 it is.

Figure 6:
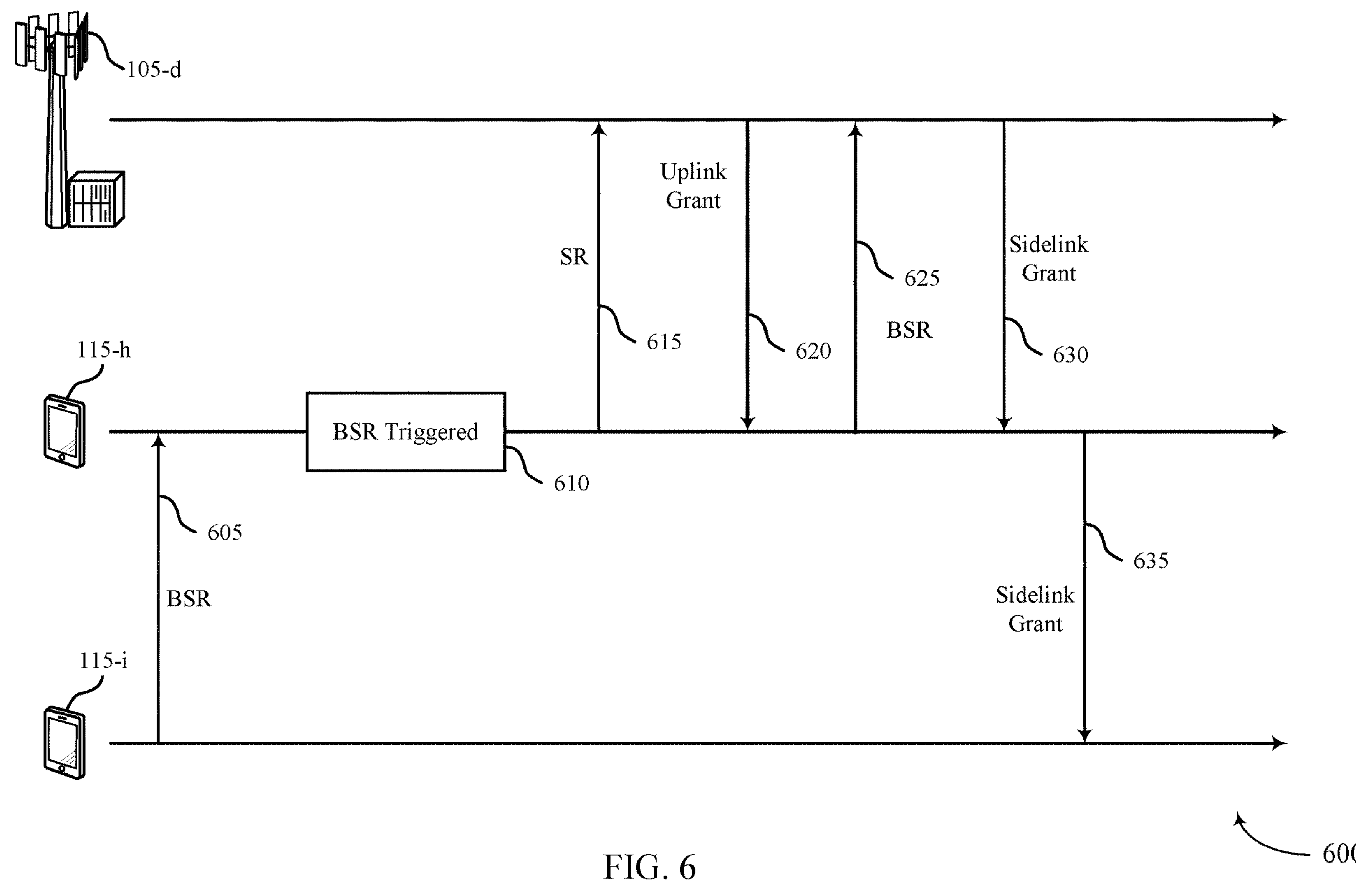

FIG. 6 illustrates an example of an uplink scheduling procedure 600 that supports scheduling uplink transmission of a relay in accordance with one or more aspects of the present disclosure. In some examples, uplink scheduling procedure 600 may implement aspects of wireless communications system 100. For instance, base station 105-*d* may be an example of a base station 105 as described with reference to FIG. 1 and UEs 115-*h* and 115-*i* may be examples of UEs 115 as described with reference to FIG. 1.

Initially, remote UE 115-*i* may transmit a BSR 605 to relay UE 115-*h*. At 610, after receiving the BSR 605, relay UE 115-*h* may trigger a BSR 625. BSR 625 may be an aggregated BSR or an enhanced BSR, as described with reference to FIG. 2. After triggering the BSR 625, relay UE 115-*h* may transmit a SR 615 to base station 105-*d* (e.g., BSR 605 may trigger SR 615 on PUCCH). In some cases, the SR 615 may be subject to a SR prohibit timer of relay UE 115-*h*. In such cases, relay UE 115-*h* may keep the SR 615 pending if the prohibit timer associated with the PUCCH configuration whose priority is the same as the received BSR 605 is running.

After receiving the SR 615, base station 105-*d* may transmit an uplink grant 620 addressed to relay UE 115-*i*. The uplink grant 620 may indicate one or more resources configured for transmitting a BSR 525 from relay UE 115-*h* to base station 105-*d*. Relay UE 115-*h* may transmit the BSR 625 and/or the corresponding data over the one or more resources.

Base station 105-*d* may transmit a sidelink grant 630 addressed to remote UE 115-*i* to relay UE 115-*h*. The sidelink grant 630 may indicate one or more resources configured for communications between remote UE 115-*i* to relay UE 115-*h* (e.g., transmitting a BSR 625). Relay UE 115-*h*, after receiving the sidelink grant 630, may transmit a sidelink grant 635 to remote UE 115-*i* indicating the one or more resource configured for communications between remote UE 115-*i* and relay UE 115-*h*. In cases where relay UE 115-*h* and remote UE 115-*i* are in a same group 302 (e.g., MAC is shared among relay UE 115-*h* and remote UE 115-*i*), each uplink grant 620 may be addressed to the C-RNTI associated with the group. Each RLC PDU transmitted to base station 105-*d* may include an ID indicating from which UE 115 it is.

Figure 7:
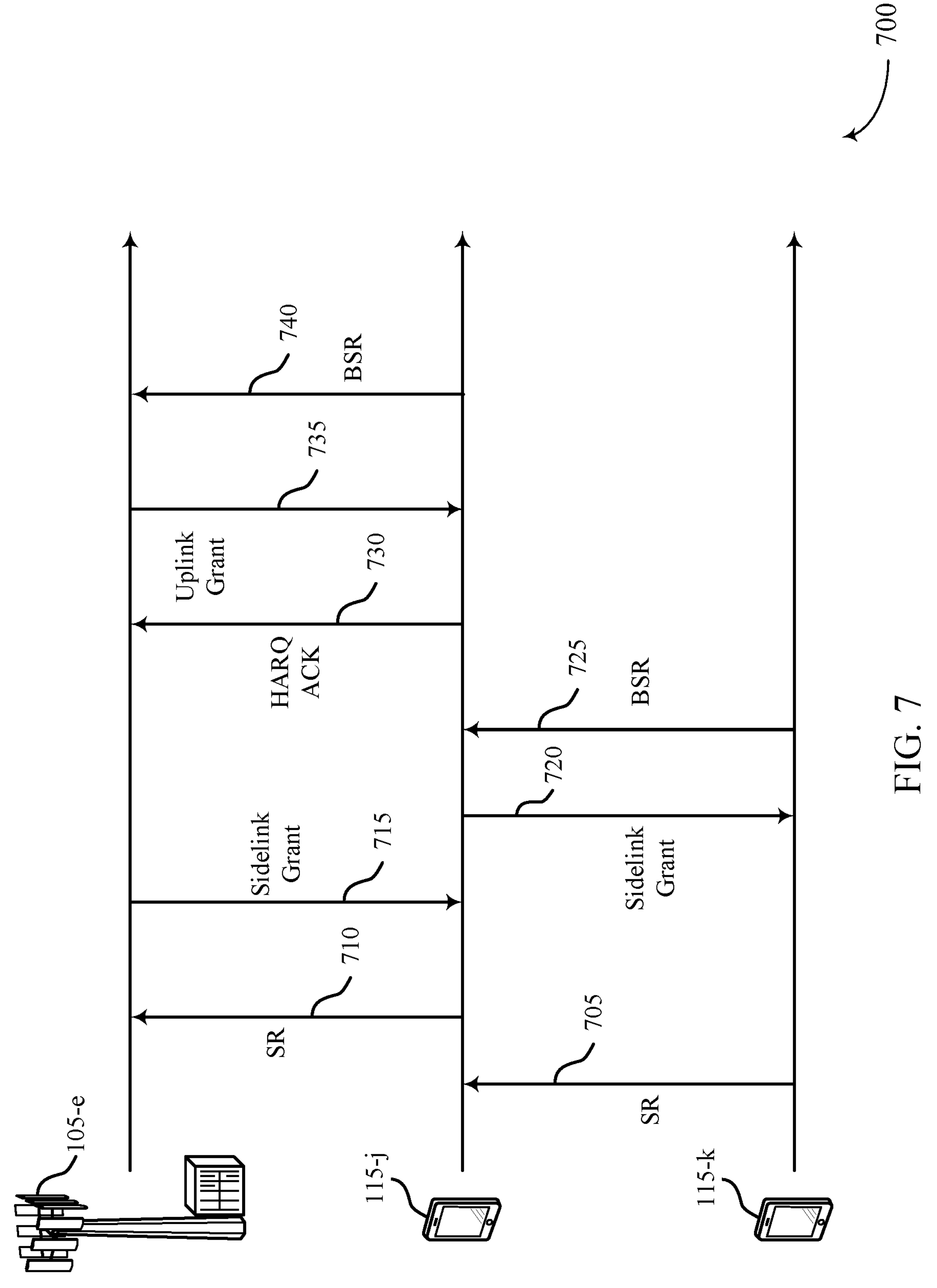

FIG. 7 illustrates an example of an uplink scheduling procedure 700 that supports scheduling uplink transmission of a relay in accordance with one or more aspects of the present disclosure. In some examples, uplink scheduling procedure 700 may implement aspects of wireless communications system 100. For instance, base station 105-*e* may be an example of a base station 105 as described with reference to FIG. 1 and UEs 115-*j* and 115-*k* may be examples of UEs 115 as described with reference to FIG. 1.

Initially, remote UE 115-*k* may transmit a first SR 705 to relay UE 115-*j*. Relay UE 115-*j*, after receiving the first SR 705, may transmit a second SR 710 to base station 105-*e* (e.g., first SR 705 may trigger second SR 710 on PUCCH). Each remote UE 115 (e.g., UE 115-*k*) may have a dedicated SR configuration at relay UE 115-*j*. For instance, second SR 710 may be transmitted over a PUCCH transmission occasion dedicated to UE 115-*k* such that, when base station 105-*e* receives the second SR 710, base station 105-*e* may identify the remote UE 115 requesting an uplink grant based on the PUCCH transmission occasion. Additionally, relay UE 115-*j* may maintain separate scheduling resource procedure parameters and timers (e.g., prohibit timer, maximum SR transmission counter) for each remote UE 115. In some cases, relay UE 115-*j* may trigger second SR 710 over PUCCH resources configured for remote UE 115-*k* when relay UE 115-*j* receives a sidelink SR from remote UE 115-*k* (e.g., SR 705) and/or when remote UE 115-*k* has a pending BSR 740 at relay UE 115-*j*. It should be noted that in cases where a physical uplink shared channel (PUSCH) resource is available at relay UE 115-*j* when relay UE 115-*j* triggers second SR 710, relay UE 115-*j* may cancel the second SR 710 and transmit the BSR 740 to base station 105-*e*.

The base station 105-*e*, after receiving the second SR 710, may transmit a sidelink grant 715 addressed to UE 115-*k* to relay UE 115-*j*. The sidelink grant 715 may indicate one or more resources configured for transmitting a BSR 725 from remote UE 115-*k* to relay UE 115-*j*. Relay UE 115-*j*, after receiving the sidelink grant 715, may transmit a sidelink grant 720 to remote UE 115-*k* indicating the one or more resource configured for transmitting the BSR 725.

Remote UE 115-*k*, after receiving the sidelink grant 720, may transmit a BSR 725 over the one or more resources. Additionally, remote UE 115-*k* may transmit data corresponding to the BSR 725 (e.g., data whose buffer status the BSR 725 is reporting). Relay UE 115-*k*, after successfully receive and decoding the BSR 725, may transmit a HARQ ACK 730 to base station 105-*e* indicating that the relay UE 115-*k* successfully received and decoded the BSR 725.

After receiving the HARQ ACK 730, base station 105-*b* may transmit an uplink grant 735 indicating one or more resources configured for transmitting the BSR 740 and/or the corresponding data. Relay UE 115-*j* may transmit the BSR 740 and/or the corresponding data over the one or more resources. For the methods as described with reference to FIG. 7, base station 105-*e* may perform scheduling per remote UE. For instance, uplink grant 735 may be addressed to the RNTI of UE 115-*k*. Additionally, relay UE 115-*j* may maintain independent HARQ entities for each remote UE 115 (e.g., remote UE 115-*k*).

Figure 8:
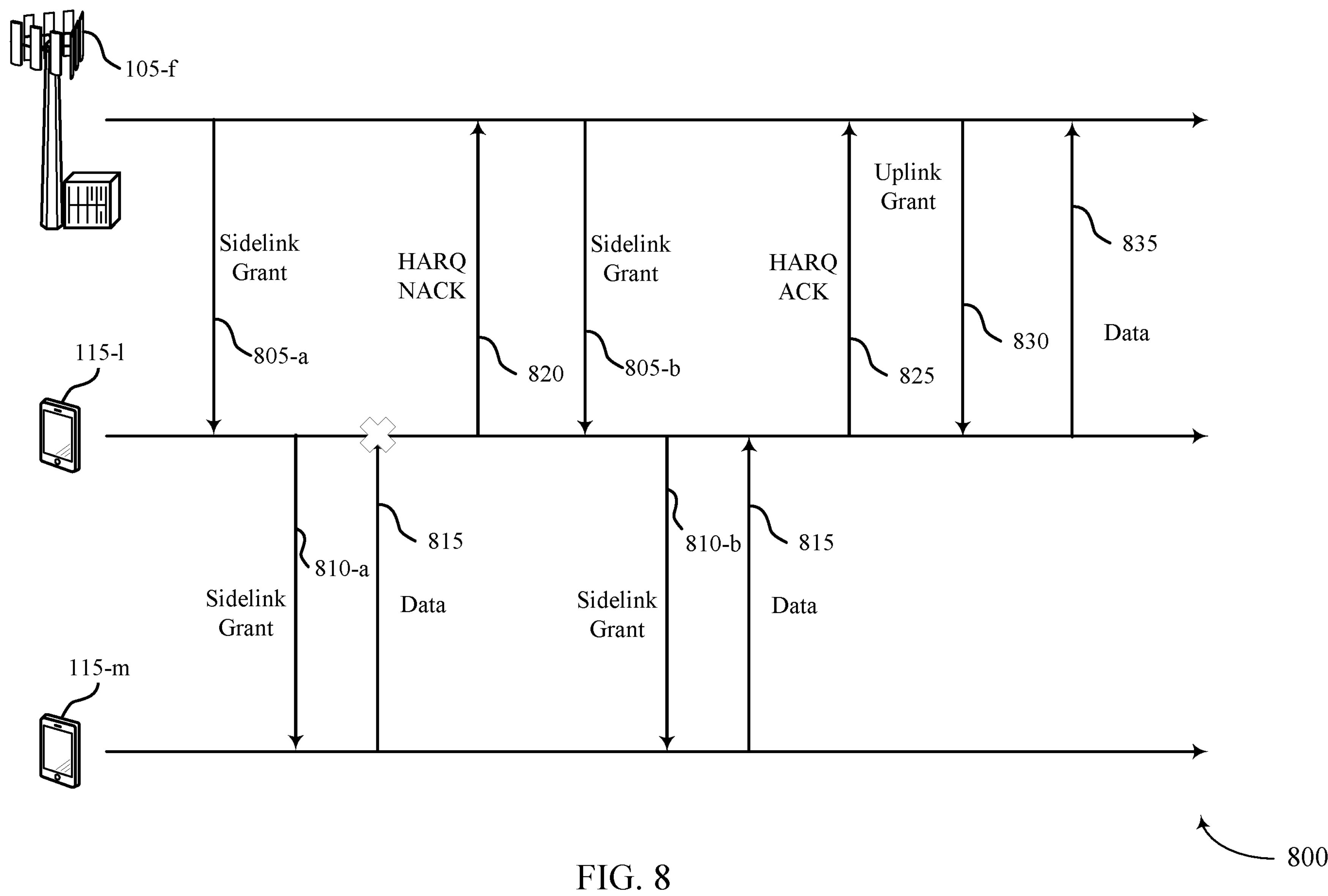

FIG. 8 illustrates an example of an uplink scheduling procedure 800 that supports scheduling uplink transmission of a relay in accordance with one or more aspects of the present disclosure. In some examples, uplink scheduling procedure 800 may implement aspects of wireless communications system 100. For instance, base station 105-*f* may be an example of a base station 105 as described with reference to FIG. 1 and UEs 115-1 and 115-*m* may be examples of UEs 115 as described with reference to FIG. 1.

Initially, base station 105-*f* may transmit a sidelink grant 805-*a* addressed to remote UE 115-*m* to relay UE 115-1. The sidelink grant 805-*a* may indicate one or more resources configured for transmitting data 815-*a* (and/or a BSR) from remote UE 115-*m* to relay UE 115-1. Relay UE 115-1, after receiving the sidelink grant 810-*a*, may transmit a sidelink grant 810-*a* to remote UE 115-*m* indicating the one or more resource configured for transmitting the data 815-*a* (and/or the BSR).

Remote UE 115-*m*, after receiving the sidelink grant 810-*a*, may transmit the data 815 (and/or BSR) over the one or more resources. Relay UE 115-*m* may fail to successfully receive and decode the data 815. Relay UE 115-*m*, after failing to successfully receive and decode the data 815 (and/or BSR), may transmit a HARQ NACK 820 to base station 105-*f* indicating that the relay UE 115-*m* failed to successfully receive and decode the data 815 (and/or BSR).

After receiving the HARQ NACK 820, base station 105-*f* may transmit a sidelink grant 805-*b* addressed to remote UE 115-*m* to relay UE 115-1. The sidelink grant 805-*b* may indicate one or more resources configured for retransmitting the data 815 (and/or a BSR) from remote UE 115-*m* to relay UE 115-1. Relay UE 115-1, after receiving the sidelink grant 810-*b*, may transmit a sidelink grant 810-*b* to remote UE 115-*m* indicating the one or more resource configured for retransmitting the data 815 (and/or the BSR).

Remote UE 115-*m*, after receiving the sidelink grant 810-*b*, may retransmit the data 815 (and/or BSR) over the one or more resources. Relay UE 115-*m* may successfully receive and decode the data 815-*a*. Relay UE 115-*m*, after successfully receiving and decoding the data 815 (and/or BSR), may transmit a HARQ ACK 825 to base station 105-*f* indicating that the relay UE 115-*m* successfully received and decoded the data 815 (and/or BSR).

After receiving the HARQ ACK 825, base station 105-*b* may transmit an uplink grant 830 indicating one or more resources configured for transmitting the data 835 (and/or a BSR). Relay UE 115-1 may transmit the data 835 and/or the corresponding data over the one or more resources.

Figure 9:
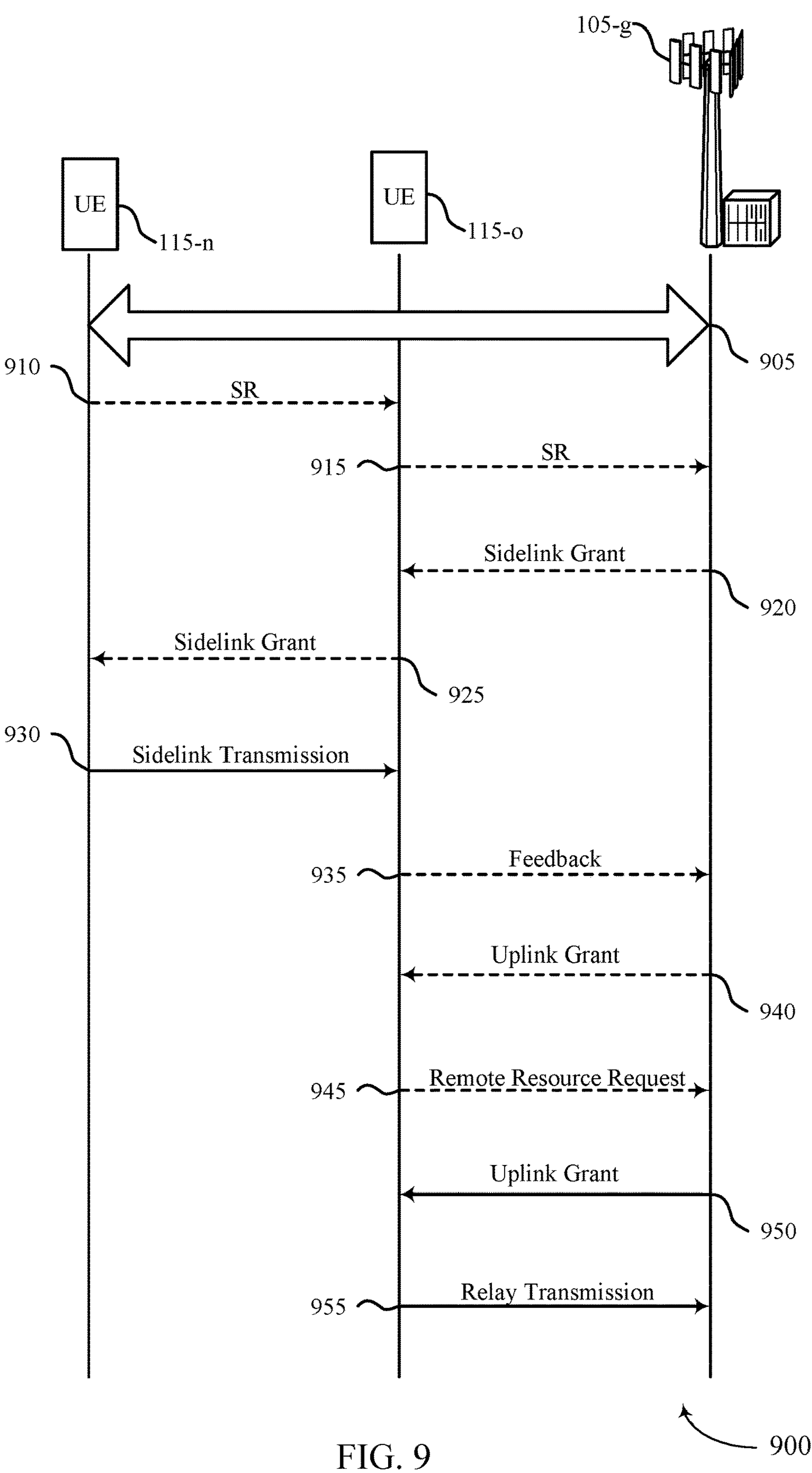
FIG. 9 illustrates an example of a process flow that supports scheduling uplink transmission of a relay in accordance with one or more aspects of the present disclosure.

FIG. 9 illustrates an example of a process flow 900 that supports scheduling uplink transmission of a relay in accordance with one or more aspects of the present disclosure. In some examples, process flow 900 may implement aspects of wireless communications system 100. For instance, base station 105-*g* may be an example of a base station 105 as described with reference to FIG. 1 and UEs 115-*n* and 115-*o* may be examples of UEs 115 as described with reference to FIG. 1.

At 905, relay UE 115-*o* may establish a communication link between remote UE 115-*n* and base station 105-*g*. The communication link may include a sidelink communication link between remote UE 115-*n* and relay UE 115-*o* and a relay communication link between relay UE 115-*o* and base station 105-*g*.

At 910, remote UE 115-*n* may transmit to relay UE 115-*o* (e.g., over the sidelink communication link) a first SR.

At 915, relay UE 115-*o* may transmit to base station 105-*g* (e.g., over the relay communication link) a second SR. Relay UE 115-*o* may transmit the second SR based on receiving the first SR at 910. The second SR may indicate remote UE 115-*n* according to a transmission occasion (e.g., a time location on the sidelink communication link, a frequency location on the sidelink communication link, or both) over which relay UE 115-*o* transmits the second SR. Additionally or alternatively, the second SR may indicate an ID of remote UE 115-*n*.

At 920, base station 105-*g* may transmit to relay UE 115-*o* (e.g., over the relay communication link) a first indication of one or more resources configured by base station 105-*g* for transmission of a sidelink transmission (e.g., a first BSR or data transmission) from remote UE 115-*n* to relay UE 115-*o*. Base station 105-*g* may transmit the first indication based on the transmission occasion over which the second SR is transmitted and/or an ID of remote UE 115-*n* indicated by the second SR. In some cases, the first indication of the one or more resources may include at least one RLC PDU including an ID of remote UE 115-*n*. In some cases, the first indication of the one or more resources may be encoded according to an RNTI of remote UE 115-*n*.

At 925, relay UE 115-*o* may transmit to remote UE 115-*n* (e.g., over the sidelink communication link) a second indication of the one or more resources configured by base station 105-*g* for transmission of the sidelink transmission from remote UE 115-*n* to relay UE 115-*o*. Relay UE 115-*o* may transmit the second indication of the one or more resources to remote UE 115-*n* based on the first indication being encoded according to an RNTI of remote UE 115-*n*.

At 930, remote UE 115-*n* may transmit to relay UE 115-*o* (e.g., over the sidelink communication link) the sidelink transmission, where the sidelink transmission may correspond to data stored at remote UE 115-*n*. The sidelink transmission may be transmitted over the one or more resources configured by base station 105-*g* for transmission of the sidelink transmission from remote UE 115-*n* to relay UE 115-*o*.

In some cases, remote UE 115-*n* may transmit an SR to relay UE 115-*o* based on receiving the sidelink transmission (e.g., after receiving the sidelink transmission). In such cases, remote UE 115-*n* may refrain from transmitting the first SR at 910. In such cases, 915, 920, and 925 may not occur.

In some cases, remote UE 115-*n* may transmit to relay UE 115-*o* (e.g., over the sidelink communication link) an indication of a mapping between a LCH of remote UE 115-*n* and a priority of the LCH. The indication may be provided by the sidelink transmission, a received MAC SDU header, or both.

At 935, relay UE 115-*o* may transmit to base station 105-*g* (e.g., over the relay communication link) an indication that the sidelink transmission was successfully received and decoded by relay UE 115-*n* (e.g., an ACK). The indication may include an identifier of remote UE 115-*n*.

At 940, base station 105-*g* may transmit to relay UE 115-*o* (e.g., over the relay communication link) an indication of one or more resources configured by base station 105-*g* for transmission of control signaling including a request for resources over the sidelink communication link (e.g., a remote resource request).

At 945, relay UE 115-*o* may transmit to base station 105-*g* (e.g., over the relay communication link) the control signaling including the request for resources over the sidelink communication over the one or more resources configured at 940. The control signaling may include a MAC-CE that includes the request for resources over the sidelink communication link.

At 950, base station 105-*g* may transmit to relay UE 115-*o* (e.g., over the relay communication link) an indication of one or more resources for transmission of a relay transmission (e.g., a second BSR or data transmission) from relay UE 115-*o* to base station 105-*g*. The relay transmission may correspond to the data stored at remote UE 115-*n* (e.g., may report a buffer status for the data or the data itself). In some cases, base station 105-*g* may transmit the indication based on transmitting the control signaling including the request for resources over the sidelink communication link. The indication of the one or more resources may be encoded according to an RNTI of relay UE 115-*o*. The RNTI by which the one or more resources may be encoded may be the same as or distinct from the RNTI by which the first indication of one or more resources configured by base station 105-*g* for transmission of the sidelink transmission is encoded.

In some cases, base station 105-*g* may transmit to relay UE 115-*o* (e.g., over the relay communication link) an indication of one or more resources configured by base station 105-*g* for transmission of a second sidelink transmission (e.g., another BSR or data transmission) from a UE 115 distinct from remote UE 115-*n* to relay UE 115-*o*. The indication of the one or more resources may include be encoded according to an RNTI of the distinct UE 115. The RNTI by which the one or more resources configured by base station 105-*g* for transmission of the additional BSR may be the same as or different from that by which the first indication of one or more resources configured by base station 105-*g* for transmission of the sidelink transmission is encoded.

At 955, relay UE 115-*o* may transmit to base station 105-*g* (e.g., over the relay communication link) the relay transmission over the one or more resources based on receiving the sidelink transmission. For instance, in cases where the sidelink transmission includes a first BSR and the relay transmission includes a second BSR, the one or more buffer statuses reported by the second BSR may be based on one or more buffer statuses reported by the first BSR. In cases where relay UE 115-*o* receives, from a UE 115 distinct from remote UE 115-*n*, a BSR corresponding to data stored at the UE 115 distinct from remote UE 115-*n*, the second BSR may include an aggregated buffer status of remote UE 115-*n* and the UE 115 distinct from remote UE 115-*n*. The BSR from the UE 115 distinct from remote UE 115-*n* may be received before the first BSR and the relay UE 115-*o* may initiate a prohibit timer for the UE 115 distinct from the remote UE 115-*o*. In such cases, if the prohibit is still running after the first BSR is received, the second BSR may exclude an ID of the UE 115 distinct from remote UE 115-*n*. Additionally or alternatively, the second BSR may include one or more buffer statuses associated with remote UE 115-*n* and one or more buffer statuses associated with the UE 115 distinct from remote UE 115-*n*.

In some cases, transmitting the second BSR may be based on relay UE 115-*o* having an empty buffer when receiving the first BSR, the data corresponding to the first BSR having a higher priority than additional data stored at relay UE 115-*o*, or both. Additionally or alternatively, transmitting the second BSR may be based on the first BSR including a non-empty LCG whose priority is higher than each LCG associated with additional data stored at relay UE 115-*o*. Additionally or alternatively, transmitting the second BSR may be based on expiry of a periodic BSR timer configured at relay UE 115-*o*. In some cases, the sidelink transmission may include a transmission of data and the relay transmission may include a buffer status report. In such cases, transmitting the buffer status report may be based on relay UE 115-*o* having an empty buffer when receiving the transmission of the data, the data having a higher priority than additional data stored at relay UE 115-*o*, or both.

Figure 10:
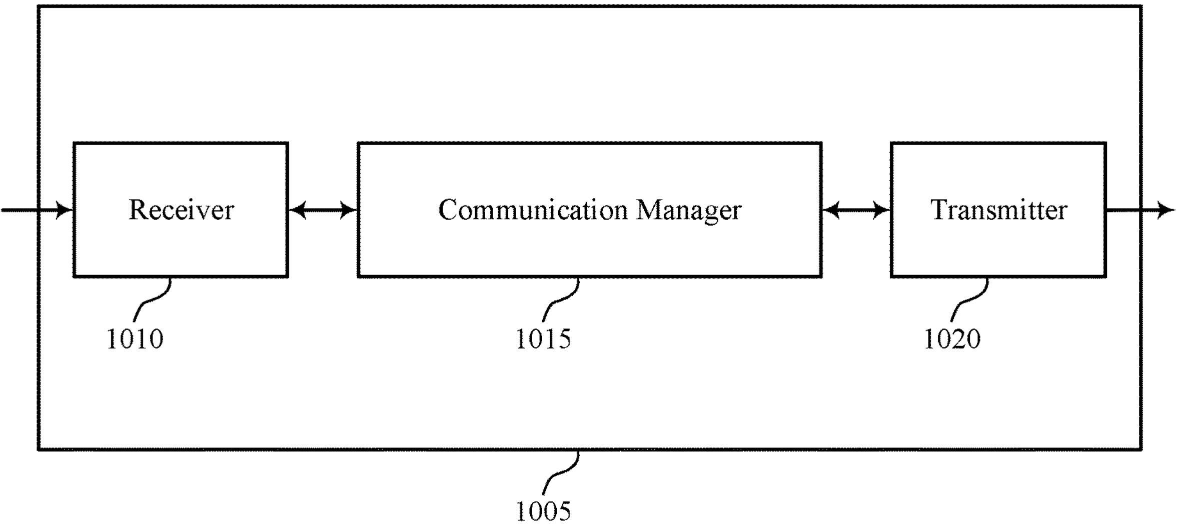
FIGS. 10 and 11 show block diagrams of devices that support scheduling uplink transmission of a relay in accordance with one or more aspects of the present disclosure.

FIG. 10 shows a block diagram 1000 of a device 1005 that supports scheduling uplink transmission of a relay in accordance with one or more aspects of the present disclosure. The device 1005 may be an example of aspects of a UE 115 as described herein. The device 1005 may include a receiver 1010, a communication manager 1015, and a transmitter 1020. The device 1005 may also include a processor. Each of these components may be in communication with one another (e.g., via one or more buses).

The receiver 1010 may receive information such as packets, user data, or control information associated with various information channels (e.g., control channels, data channels, and information related to scheduling uplink transmission of a relay, etc.). Information may be passed on to other components of the device 1005. The receiver 1010 may be an example of aspects of the transceiver 1315 described with reference to FIG. 13. The receiver 1010 may utilize a single antenna or a set of antennas.

The communication manager 1015 may establish a communication link between a remote UE and a base station, the communication link including a sidelink communication link between the remote UE and the relay UE and a relay communication link between the relay UE and the base station, receive, over the sidelink communication link, a sidelink transmission corresponding to data stored at the remote UE, receive, over the relay communication link, an indication of one or more resources configured for transmission of a relay transmission corresponding to the data stored at the remote UE, and transmit, over the relay communication link, the relay transmission over the one or more resources based on the receiving the sidelink transmission. The communication manager 1015 may be an example of aspects of the communication manager 1310 described herein.

In one or more aspects, the described techniques performed by the communication manager 1015 as described herein may support improvements in relayed sidelink communications. For example, communication manager 1015 performing the methods described herein may enable a base station to communicate with UEs that are outside of a coverage area of the base station. Accordingly, the range of the base station may be increased according to the methods described herein.

The communication manager 1015, or its sub-components, may be implemented in hardware, code (e.g., software or firmware) executed by a processor, or any combination thereof. If implemented in code executed by a processor, the functions of the communication manager 1015, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communication manager 1015, or its sub-components, may be physically located at various positions, including being distributed such that portions of functions are implemented at different physical locations by one or more physical components. In some examples, the communication manager 1015, or its sub-components, may be a separate and distinct component in accordance with various aspects of the present disclosure. In some examples, the communication manager 1015, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1020 may transmit signals generated by other components of the device 1005. In some examples, the transmitter 1020 may be collocated with a receiver 1010 in a transceiver module. For example, the transmitter 1020 may be an example of aspects of the transceiver 1315 described with reference to FIG. 13. The transmitter 1020 may utilize a single antenna or a set of antennas.

Figure 11:
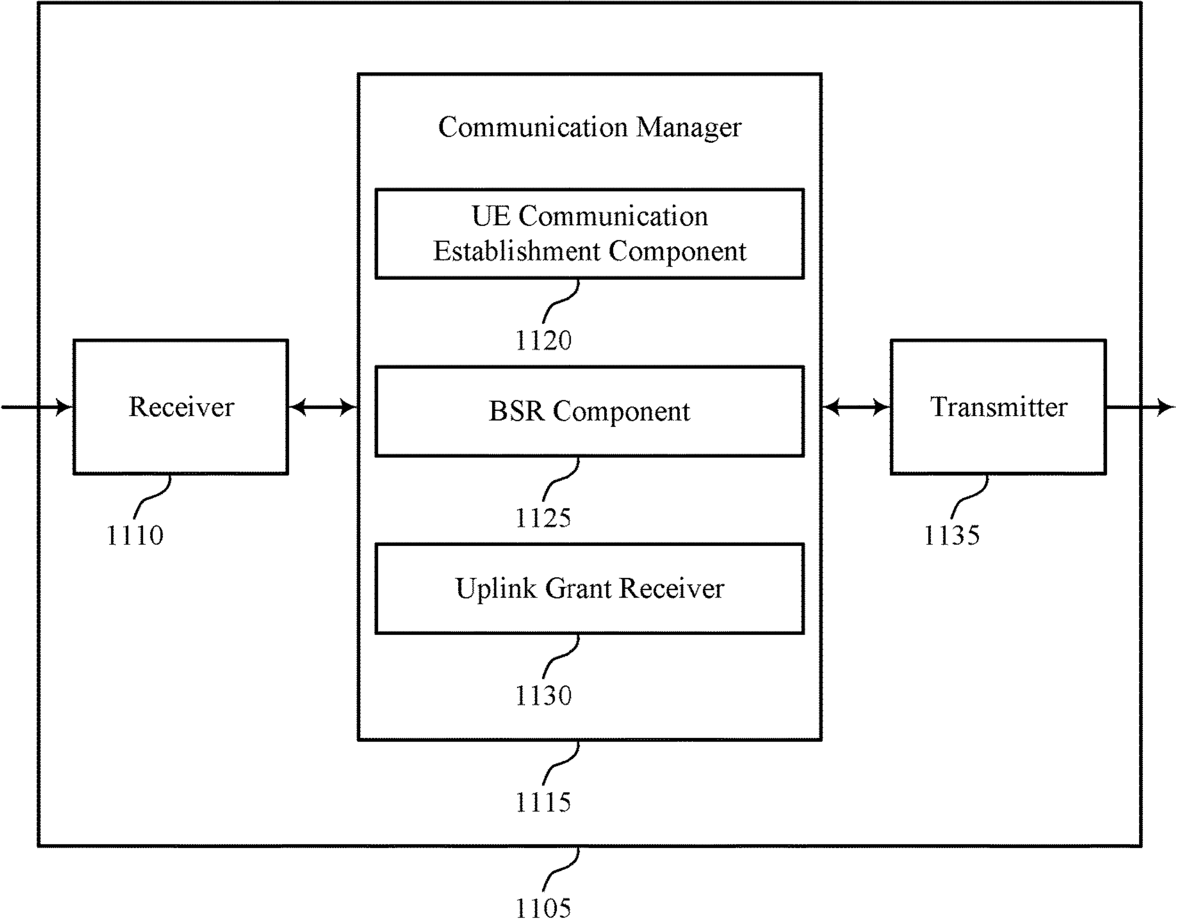

FIG. 11 shows a block diagram 1100 of a device 1105 that supports scheduling uplink transmission of a relay in accordance with one or more aspects of the present disclosure. The device 1105 may be an example of aspects of a device 1005, or a UE 115 as described herein. The device 1105 may include a receiver 1110, a communication manager 1115, and a transmitter 1135. The device 1105 may also include a processor. Each of these components may be in communication with one another (e.g., via one or more buses).

The receiver 1110 may receive information such as packets, user data, or control information associated with various information channels (e.g., control channels, data channels, and information related to scheduling uplink transmission of a relay, etc.). Information may be passed on to other components of the device 1105. The receiver 1110 may be an example of aspects of the transceiver 1315 described with reference to FIG. 13. The receiver 1110 may utilize a single antenna or a set of antennas.

The communication manager 1115 may be an example of aspects of the communication manager 1015 as described herein. The communication manager 1115 may include an UE communication establishment component 1120, a signaling component 1125, and an uplink grant receiver 1130.

The communication manager 1115 may be an example of aspects of the communication manager 1310 described herein.

The UE communication establishment component 1120 may establish a communication link between a remote UE and a base station, the communication link including a sidelink communication link between the remote UE and the relay UE and a relay communication link between the relay UE and the base station.

The signaling component 1125 may receive, over the sidelink communication link, a sidelink transmission corresponding to data stored at the remote UE. Additionally, the signaling component 1125 may transmit, over the relay communication link, the relay transmission over the one or more resources based on the receiving the sidelink transmission.

The uplink grant receiver 1130 may receive, over the relay communication link, an indication of one or more resources configured for transmission of a relay transmission corresponding to the data stored at the remote UE.

The transmitter 1135 may transmit signals generated by other components of the device 1105. In some examples, the transmitter 1135 may be collocated with a receiver 1110 in a transceiver module. For example, the transmitter 1135 may be an example of aspects of the transceiver 1315 described with reference to FIG. 13. The transmitter 1135 may utilize a single antenna or a set of antennas.

Figure 12:
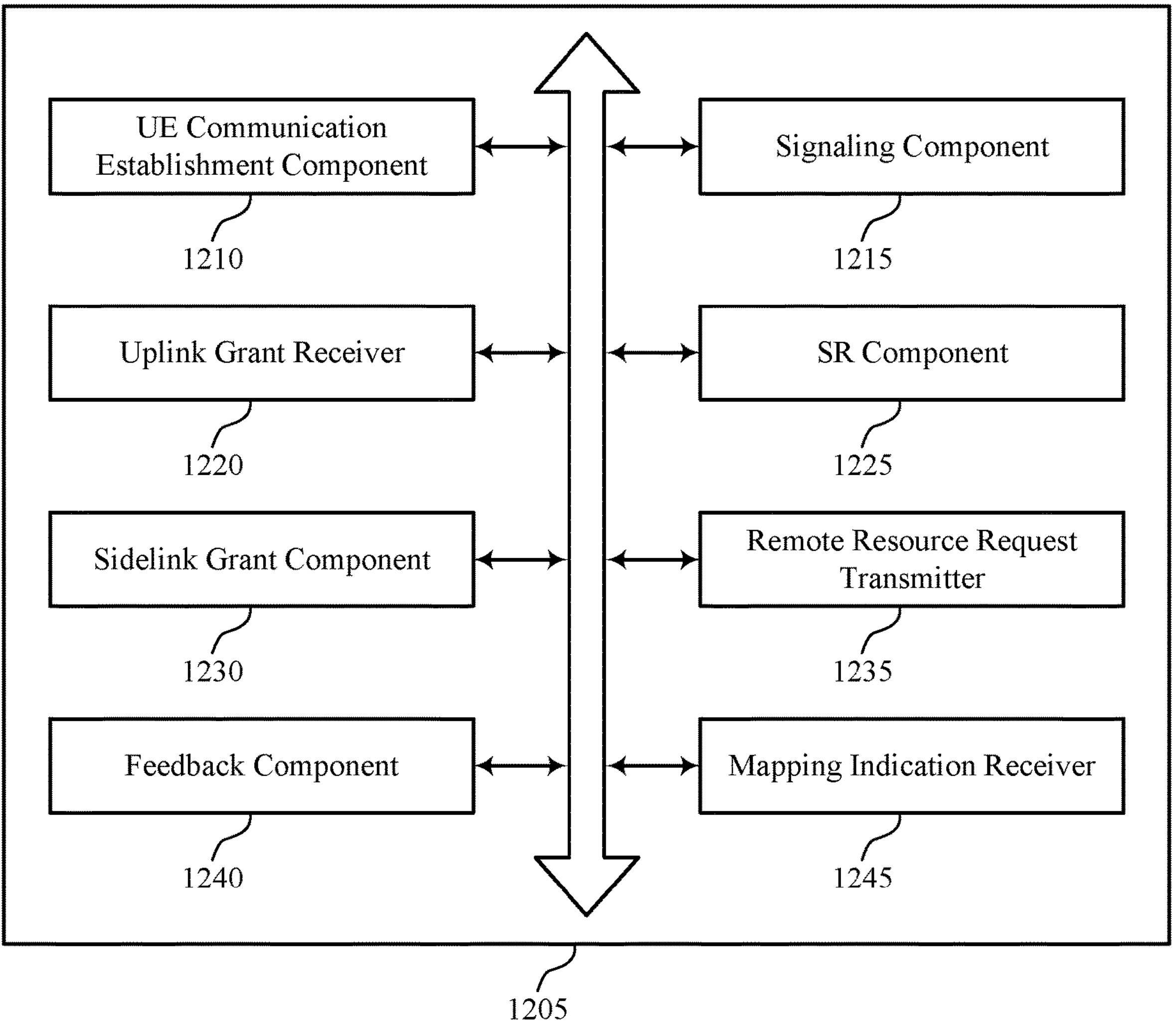
FIG. 12 shows a block diagram of a communication manager that supports scheduling uplink transmission of a relay in accordance with one or more aspects of the present disclosure.

FIG. 12 shows a block diagram 1200 of a communication manager 1205 that supports scheduling uplink transmission of a relay in accordance with one or more aspects of the present disclosure. The communication manager 1205 may be an example of aspects of a communication manager 1015, a communication manager 1115, or a communication manager 1310 described herein. The communication manager 1205 may include an UE communication establishment component 1210, a signaling component 1215, an uplink grant receiver 1220, a SR component 1225, a sidelink grant component 1230, a remote resource request transmitter 1235, a feedback component 1240, and a mapping indication receiver 1245. Each of these modules may communicate, directly or indirectly, with one another (e.g., via one or more buses).

The UE communication establishment component 1210 may establish a communication link between a remote UE and a base station, the communication link including a sidelink communication link between the remote UE and the relay UE and a relay communication link between the relay UE and the base station.

The signaling component 1215 may receive, over the sidelink communication link, a sidelink transmission corresponding to data stored at the remote UE. In some examples, the signaling component 1215 may transmit, over the relay communication link, a relay transmission over the one or more resources based on the receiving the sidelink transmission. In some examples, receiving, from a UE distinct from the remote UE, a third BSR corresponding to data stored at the UE distinct from the remote UE, where the second BSR includes an aggregated buffer status of the remote UE and of the UE distinct from the remote UE.

In some cases, the sidelink transmission may include a first BSR and the relay transmission may include a second BSR. In such cases, signaling component 1215 may receive, from a UE distinct from the remote UE, a third BSR corresponding to data stored at the UE distinct from the remote UE, where the second BSR includes an aggregated buffer status of the remote UE and of the UE distinct from the remote UE. The third BSR may be received before the first BSR, and signaling component 1215 may initiate a prohibit timer for the UE distinct from the remote UE, where the second BSR may exclude an identifier of the UE distinct from the UE based on the prohibit timer running when the first BSR is received. Additionally or alternatively, signaling component 1215 may receive, from a UE distinct from the remote UE, a third BSR corresponding to data stored at the UE distinct from the remote UE, where the second BSR includes one or more buffer statuses indicated by the first BSR and one or more buffer statuses indicated by the third BSR.

Transmitting the second BSR may be based on the relay UE having an empty buffer when receiving the first BSR, the data corresponding to the first BSR having a higher priority than additional data stored at the relay UE, or both. Additionally or alternatively, transmitting the second BSR may be based on the first BSR including a non-empty logical channel group whose priority is higher than each logical channel group associated with additional data stored at the relay UE. Additionally or alternatively, transmitting the second BSR may be based on expiry of a periodic BSR timer configured at the relay UE. In some cases, the sidelink transmission may include a transmission of data and the relay transmission may include a buffer status report, where transmitting the buffer status report may be based on the relay UE having an empty buffer when receiving the transmission of the data, the data having a higher priority than additional data stored at the relay UE, or both The uplink grant receiver 1220 may receive, over the relay communication link, an indication of one or more resources configured for transmission of a second BSR corresponding to the data stored at the remote UE. In some examples, the uplink grant receiver 1220 may receive, over the relay communication link, an indication of third one or more resources configured by the base station for transmission of control signaling including a request for resources on the sidelink communication link (e.g., a remote resource request).

The SR component 1225 may receive, over the sidelink communication link, a first SR. In some examples, the SR component 1225 may transmit, over the relay communication link, a second SR based on receiving the SR. In some examples, the SR component 1225 may transmit, over the relay communication link, an SR based on receiving the sidelink transmission, where receiving the indication of the one or more resources is based on transmitting the SR. In some cases, the second SR may be transmitted over a transmission occasion (e.g., a time location on the sidelink communication link, a frequency location on the sidelink communication link, or both) that indicates that the second SR is associated with the remote UE.

The sidelink grant component 1230 may receive, over the relay communication link, a first indication of second one or more resources configured by the base station for transmission of the sidelink transmission. In some examples, the sidelink grant component 1230 may transmit, over the sidelink communication link, a second indication of the second one or more resources, where the first BSR is received over the second one or more resources. In some examples, the sidelink grant component 1230 may receive, over the relay communication link, an indication of third one or more resources configured by the base station for transmission of a second sidelink transmission from a UE distinct from the remote UE, where the indication of the third one or more resources is encoded according to a radio network temporary identifier of the UE distinct from the remote UE. In some cases, the radio network temporary identifier by which the identifier of the third one or more resources is encoded may be the same as or distinct from the radio network temporary identifier by which the indication of the one or more resources is encoded.

In some cases, the first indication of the second one or more resources includes at least one radio link control protocol data unit including an identifier of the remote UE. In some cases, the first indication of the second one or more resources is encoded according to a radio network temporary identifier of the remote UE, where the second indication of the second one or more resources is transmitted over the sidelink communication link based on the first indication of the second one or more resources being encoded according to the radio network temporary identifier of the remote UE. In some cases, the indication of the one or more resources is also encoded according to a radio network temporary identifier of the relay UE. The radio network temporary identifier by which the first indication of the second one or more resources is encoded may be the same as or distinct from the radio network temporary identifier by which the indication of the one or more resources is encoded.

The remote resource request transmitter 1235 may transmit, over the relay communication link, the control signaling including the request for resources on the sidelink communication link, where receiving the first indication of the second one or more resources is based on transmitting the control signaling including the request for resources on the sidelink communication link. In some cases, the control signaling includes a MAC control element including the request for resources on the sidelink communication link.

The feedback component 1240 may transmit, over the relay communication link, an indication that the sidelink transmission was successfully received and decoded by the relay UE. In some cases, the indication includes an identifier of the remote UE.

The mapping indication receiver 1245 may receive, over the sidelink communication link, an indication of a mapping between an LCH of the remote UE and a priority of the LCH. The indication may be provided by the sidelink transmission (e.g., a BSR), a received MAC SDU header, or both.

Figure 13:
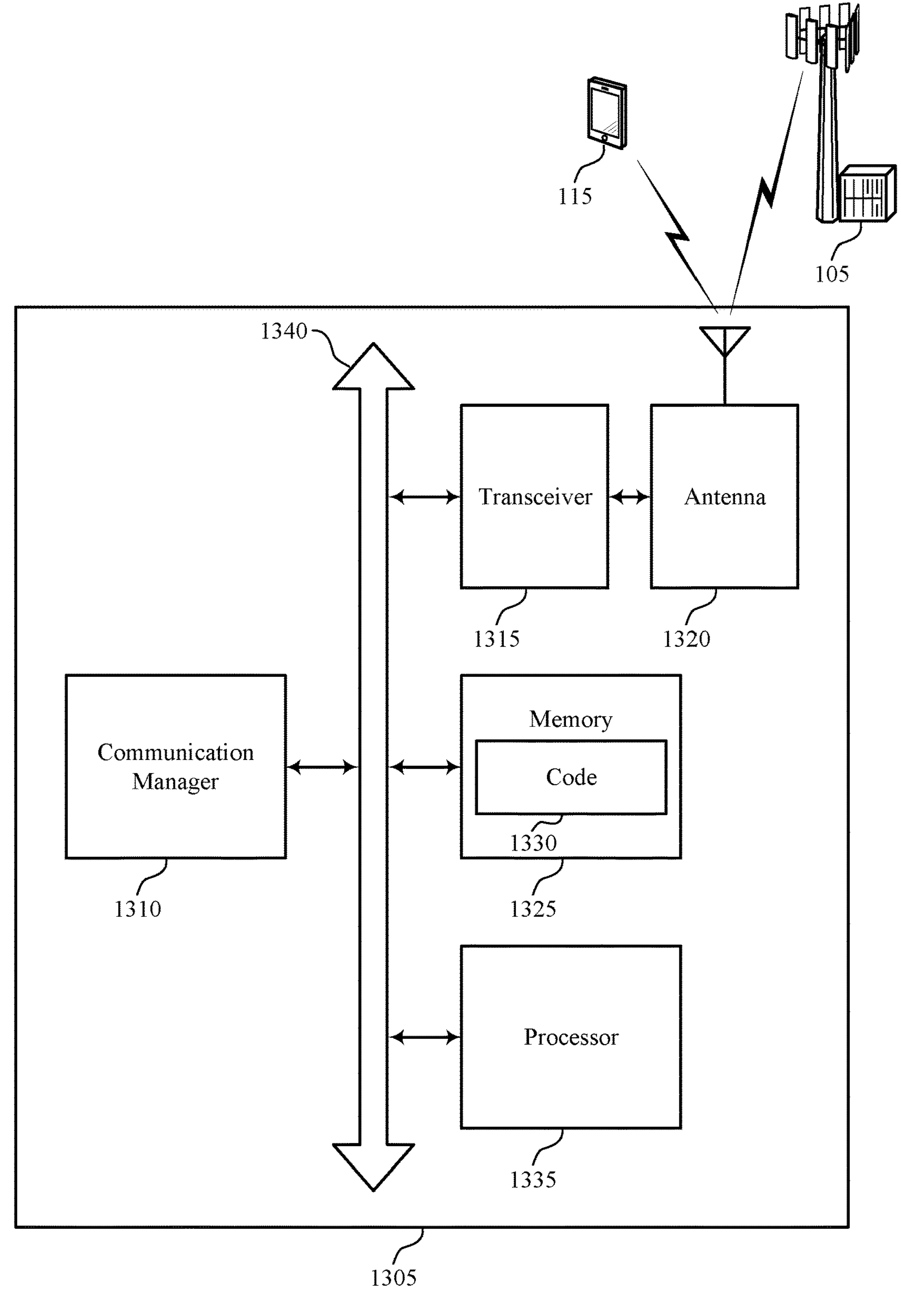
FIG. 13 shows a diagram of a system including a device that supports scheduling uplink transmission of a relay in accordance with one or more aspects of the present disclosure.

FIG. 13 shows a diagram of a system 1300 including a device 1305 that supports scheduling uplink transmission of a relay in accordance with one or more aspects of the present disclosure. The device 1305 may be an example of or include the components of device 1005, device 1105, or a UE 115 as described herein. The device 1305 may include components for bi-directional voice and data communications including components for transmitting and receiving communications, including a communication manager 1310, a transceiver 1315, an antenna 1320, memory 1325, and a processor 1335. These components may be in electronic communication via one or more buses (e.g., bus 1340).

The communication manager 1310 may establish a communication link between a remote UE and a base station, the communication link including a sidelink communication link between the remote UE and the relay UE and a relay communication link between the relay UE and the base station, receive, over the sidelink communication link, a sidelink transmission corresponding to data stored at the remote UE, receive, over the relay communication link, an indication of one or more resources configured for transmission of a relay transmission corresponding to the data stored at the remote UE, and transmit, over the relay communication link, the relay transmission over the one or more resources based on the receiving the sidelink transmission.

The transceiver 1315 may communicate bi-directionally, via one or more antennas, wired, or wireless links as described above. For example, the transceiver 1315 may represent a wireless transceiver and may communicate bi-directionally with another wireless transceiver. The transceiver 1315 may also include a modem to modulate the packets and provide the modulated packets to the antennas for transmission, and to demodulate packets received from the antennas.

In some cases, the wireless device may include a single antenna 1320. However, in some cases the device may have more than one antenna 1320, which may be capable of concurrently transmitting or receiving multiple wireless transmissions.

The memory 1325 may include random-access memory (RAM) and read-only memory (ROM). The memory 1325 may store computer-readable, computer-executable code 1330 including instructions that, when executed, cause the processor to perform various functions described herein. In some cases, the memory 1325 may contain, among other things, a basic input/output system (BIOS) which may control basic hardware or software operation such as the interaction with peripheral components or devices.

The code 1330 may include instructions to implement aspects of the present disclosure, including instructions to support scheduling uplink transmissions of a relay. The code 1330 may be stored in a non-transitory computer-readable medium such as system memory or other type of memory. In some cases, the code 1330 may not be directly executable by the processor 1335 but may cause a computer (e.g., when compiled and executed) to perform functions described herein.

The processor 1335 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1335 may be configured to operate a memory array using a memory controller. In other cases, a memory controller may be integrated into the processor 1335. The processor 1335 may be configured to execute computer-readable instructions stored in a memory (e.g., the memory 1325) to cause the device 1305 to perform various functions (e.g., functions or tasks supporting scheduling uplink transmission of a relay).

In one or more aspects, the described techniques performed by the communication manager 1310 as described herein may support improvements in relayed sidelink communications. For example, communication manager 1310 performing the methods described herein may enable a base station to communicate with UEs that are outside of a coverage area of the base station. Accordingly, the range of the base station may be increased according to the methods described herein.

Figure 14:
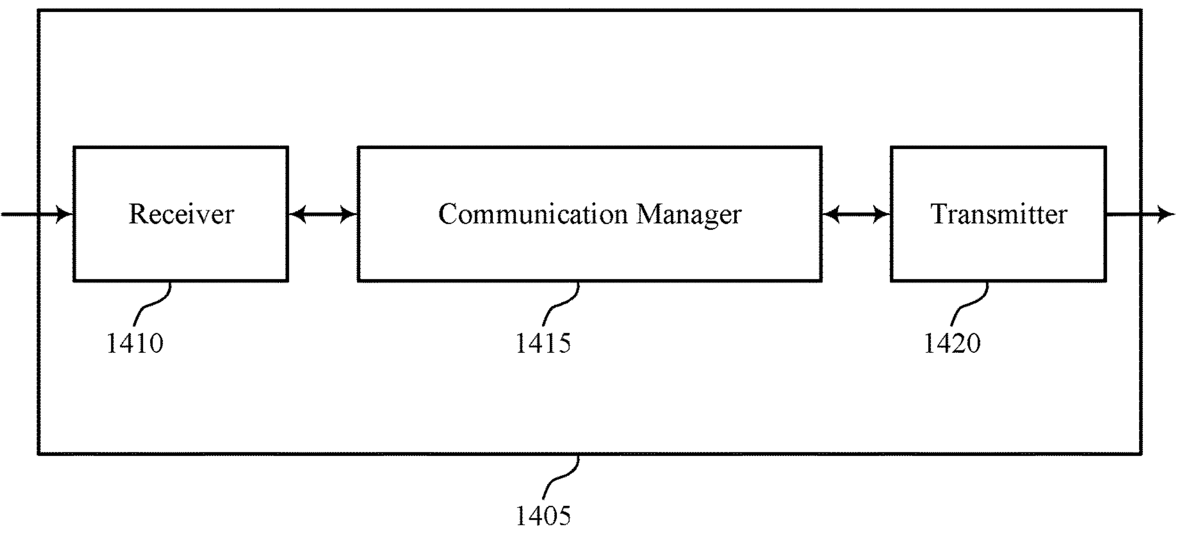
FIGS. 14 and 15 show block diagrams of devices that support scheduling uplink transmission of a relay in accordance with one or more aspects of the present disclosure.

FIG. 14 shows a block diagram 1400 of a device 1405 that supports scheduling uplink transmission of a relay in accordance with one or more aspects of the present disclosure. The device 1405 may be an example of aspects of a base station 105 as described herein. The device 1405 may include a receiver 1410, a communication manager 1415, and a transmitter 1420. The device 1405 may also include a processor. Each of these components may be in communication with one another (e.g., via one or more buses).

The receiver 1410 may receive information such as packets, user data, or control information associated with various information channels (e.g., control channels, data channels, and information related to scheduling uplink transmission of a relay, etc.). Information may be passed on to other components of the device 1405. The receiver 1410 may be an example of aspects of the transceiver 1720 described with reference to FIG. 17. The receiver 1410 may utilize a single antenna or a set of antennas.

The communication manager 1415 may establish a communication link with a remote UE, the communication link including a sidelink communication link between the remote UE and a relay UE and a relay communication link between the relay UE and the base station, transmit, over the relay communication link, an indication of one or more resources configured for transmission of a relay transmission corresponding to the data stored at the remote UE, and receive, over the relay communication link, the relay transmission over the one or more resources. The communication manager 1415 may be an example of aspects of the communication manager 1710 described herein.

In one or more aspects, the described techniques performed by the communication manager 1415 as described herein may support improvements in relayed sidelink communications. For example, communication manager 1415 performing the methods described herein may enable a base station to communicate with UEs that are outside of a coverage area of the base station. Accordingly, the range of the base station may be increased according to the methods described herein.

The communication manager 1415, or its sub-components, may be implemented in hardware, code (e.g., software or firmware) executed by a processor, or any combination thereof. If implemented in code executed by a processor, the functions of the communication manager 1415, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communication manager 1415, or its sub-components, may be physically located at various positions, including being distributed such that portions of functions are implemented at different physical locations by one or more physical components. In some examples, the communication manager 1415, or its sub-components, may be a separate and distinct component in accordance with various aspects of the present disclosure. In some examples, the communication manager 1415, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1420 may transmit signals generated by other components of the device 1405. In some examples, the transmitter 1420 may be collocated with a receiver 1410 in a transceiver module. For example, the transmitter 1420 may be an example of aspects of the transceiver 1720 described with reference to FIG. 17. The transmitter 1420 may utilize a single antenna or a set of antennas.

Figure 15:
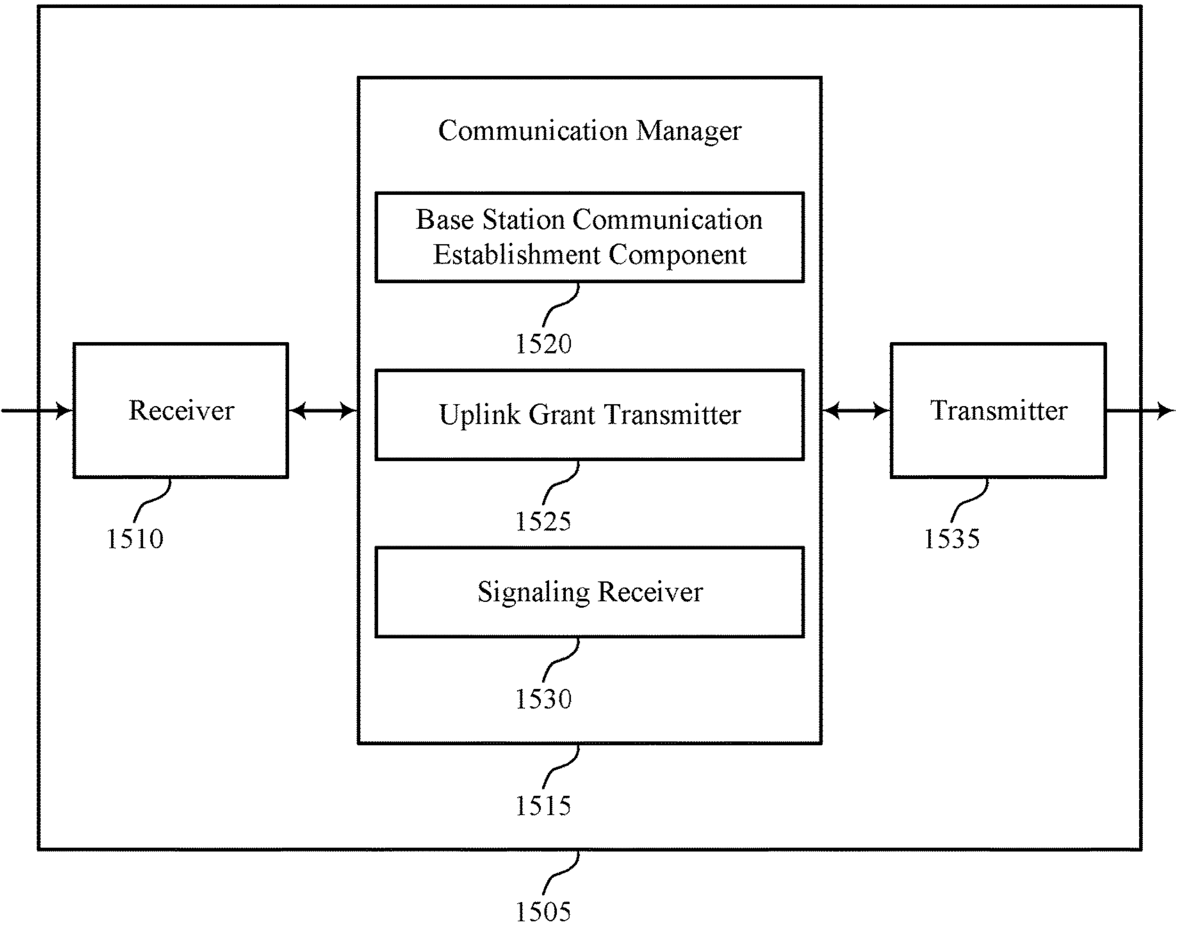

FIG. 15 shows a block diagram 1500 of a device 1505 that supports scheduling uplink transmission of a relay in accordance with one or more aspects of the present disclosure. The device 1505 may be an example of aspects of a device 1405, or a base station 105 as described herein. The device 1505 may include a receiver 1510, a communication manager 1515, and a transmitter 1535. The device 1505 may also include a processor. Each of these components may be in communication with one another (e.g., via one or more buses).

The receiver 1510 may receive information such as packets, user data, or control information associated with various information channels (e.g., control channels, data channels, and information related to scheduling uplink transmission of a relay, etc.). Information may be passed on to other components of the device 1505. The receiver 1510 may be an example of aspects of the transceiver 1720 described with reference to FIG. 17. The receiver 1510 may utilize a single antenna or a set of antennas.

The communication manager 1515 may be an example of aspects of the communication manager 1415 as described herein. The communication manager 1515 may include a base station communication establishment component 1520, an uplink grant transmitter 1525, and a signaling receiver 1530. The communication manager 1515 may be an example of aspects of the communication manager 1710 described herein.

The base station communication establishment component 1520 may establish a communication link with a remote UE, the communication link including a sidelink communication link between the remote UE and a relay UE and a relay communication link between the relay UE and the base station.

The uplink grant transmitter 1525 may transmit, over the relay communication link, an indication of one or more resources configured for transmission of a relay transmission corresponding to the data stored at the remote UE.

The signaling receiver 1530 may receive, over the relay communication link, the relay transmission over the one or more resources.

The transmitter 1535 may transmit signals generated by other components of the device 1505. In some examples, the transmitter 1535 may be collocated with a receiver 1510 in a transceiver module. For example, the transmitter 1535 may be an example of aspects of the transceiver 1720 described with reference to FIG. 17. The transmitter 1535 may utilize a single antenna or a set of antennas.

Figure 16:
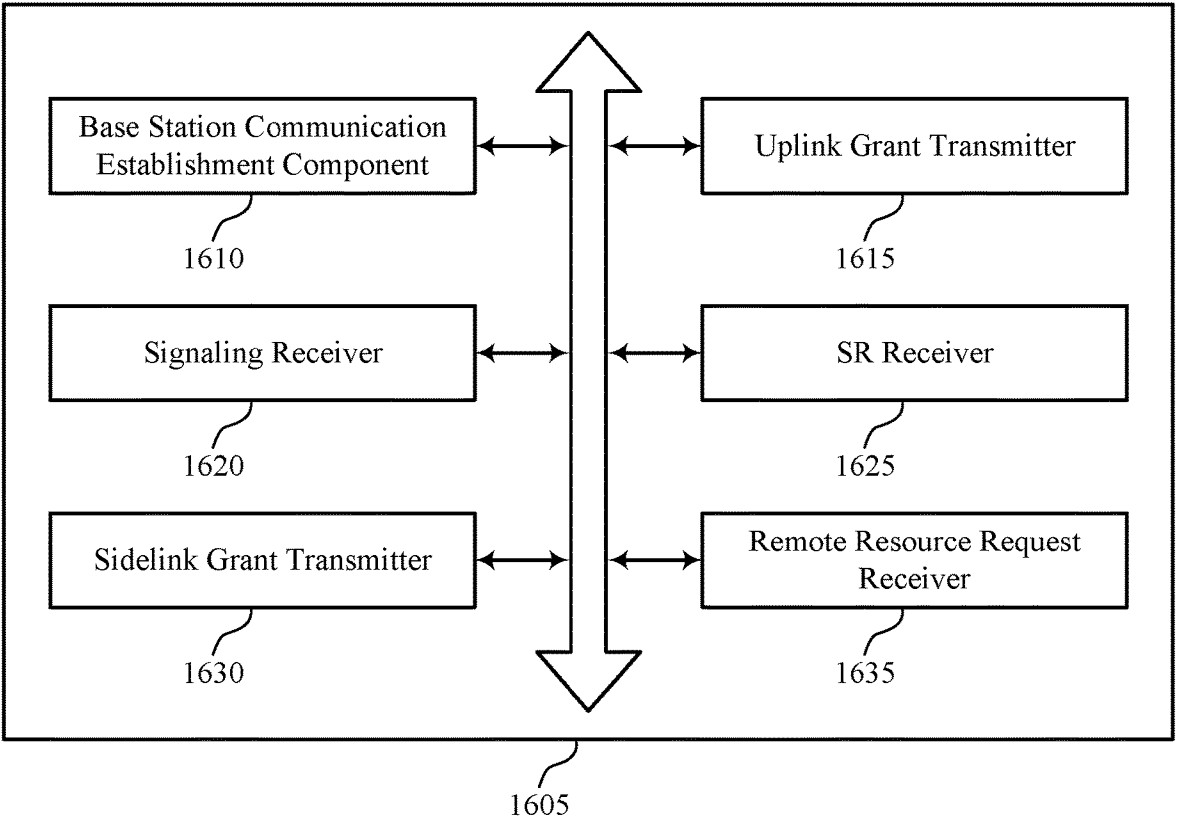
FIG. 16 shows a block diagram of a communication manager that supports scheduling uplink transmission of a relay in accordance with one or more aspects of the present disclosure.

FIG. 16 shows a block diagram 1600 of a communication manager 1605 that supports scheduling uplink transmission of a relay in accordance with one or more aspects of the present disclosure. The communication manager 1605 may be an example of aspects of a communication manager 1415, a communication manager 1515, or a communication manager 1710 described herein. The communication manager 1605 may include a base station communication establishment component 1610, an uplink grant transmitter 1615, a signaling receiver 1620, a SR receiver 1625, a sidelink grant transmitter 1630, and a remote resource request receiver 1635. Each of these modules may communicate, directly or indirectly, with one another (e.g., via one or more buses).

The base station communication establishment component 1610 may establish a communication link with a remote UE, the communication link including a sidelink communication link between the remote UE and a relay UE and a relay communication link between the relay UE and the base station.

The uplink grant transmitter 1615 may transmit, over the relay communication link, an indication of one or more resources configured for transmission of a relay transmission corresponding to the data stored at the remote UE. In some examples, the uplink grant transmitter 1615 may transmit, over the relay communication link, an indication of third one or more resources configured by the base station for transmission of control signaling including a request for resources on the sidelink communication link.

The signaling receiver 1620 may receive, over the relay communication link, the relay transmission over the one or more resources. In some examples, receiving, over the relay communication link, an indication that the relay transmission was successfully received and decoded by the relay UE, where the indication includes an identifier of the remote UE. In some cases, the relay transmission may be a BSR. In such cases, the BSR may include an aggregated buffer status of the remote UE and of a UE distinct from the remote UE. Additionally or alternatively, the BSR includes one or more buffer statuses associated with the remote UE and one or more buffer statuses associated with the UE distinct from the remote UE.

The SR receiver 1625 may receive, over the relay communication link, an SR. The SR receiver 1625 may receive the SR over a transmission occasion (e.g., a time location on the sidelink communication link, a frequency location on the sidelink communication link, or both that indicates that the SR is associated with the remote UE. The SR may indicate an identifier of the remote UE, where the indication of the second one or more resources may be transmitted based on the SR indicating the identifier of the remote UE.

The sidelink grant transmitter 1630 may transmit, over the relay communication link, an indication of second one or more resources configured by the base station for transmission of a sidelink transmission from the remote UE to the relay UE, where the relay transmission is received based on transmitting the indication of the second one or more resources. In some examples, the sidelink grant transmitter 1630 may transmit, over the relay communication link, an indication of third one or more resources configured by the base station for transmission of a second sidelink transmission from a UE distinct from the remote UE, where the indication of the third one or more resources may be encoded according to a radio network temporary identifier of the UE distinct from the remote UE. The radio network temporary identifier by which the indication of the third one or more resources is encoded may be the same as or distinct from the radio network temporary identifier by which the indication of the one or more resources is encoded.

In some cases, the indication of the second one or more resources includes at least one radio link control protocol data unit including an identifier of the remote UE. In some cases, the indication of the second one or more resources is encoded according to a radio network temporary identifier of the remote UE. In some cases, the indication of the one or more resources is encoded according to a radio network temporary identifier of the relay UE. The radio network temporary identifier by which the indication of the second one or more resources is encoded may be the same as or distinct from the radio network temporary identifier by which the indication of the one or more resources is encoded. In some cases, sidelink grant transmitter 1630 may receive, over the relay communication link, an indication that the sidelink transmission was successfully received and decoded by the relay UE. The indication may include an identifier of the remote UE.

The remote resource request receiver 1635 may receive, over the relay communication link, the control signaling including the request for resources on the sidelink communication link, where transmitting the indication of the second one or more resources is based on receiving the request for resources on the sidelink communication link. In some cases, the control signaling includes a MAC control element including the request for resources on the sidelink communication link.

Figure 17:
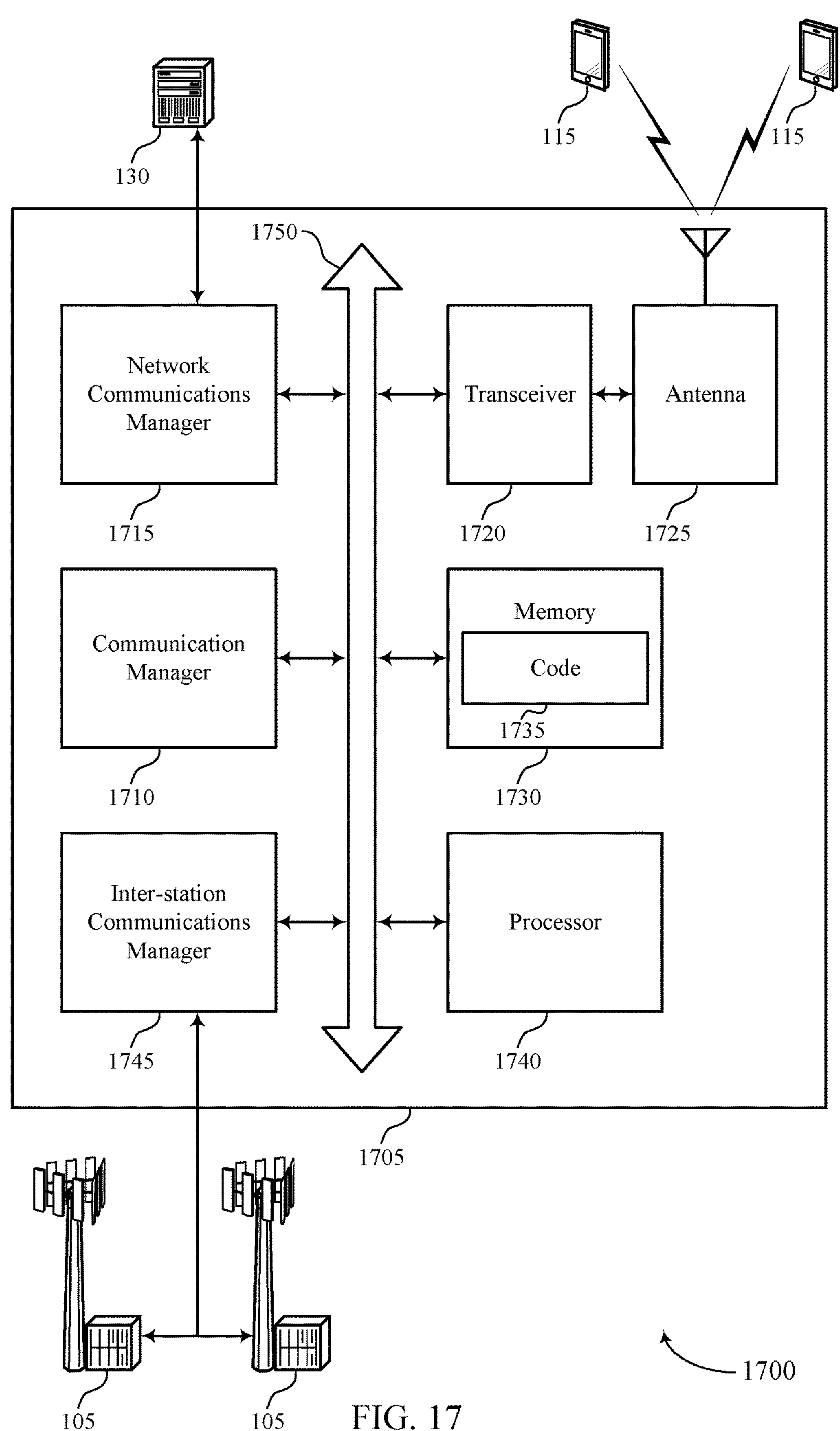
FIG. 17 shows a diagram of a system including a device that supports scheduling uplink transmission of a relay in accordance with one or more aspects of the present disclosure.

FIG. 17 shows a diagram of a system 1700 including a device 1705 that supports scheduling uplink transmission of a relay in accordance with one or more aspects of the present disclosure. The device 1705 may be an example of or include the components of device 1405, device 1505, or a base station 105 as described herein. The device 1705 may include components for bi-directional voice and data communications including components for transmitting and receiving communications, including a communication manager 1710, a network communications manager 1715, a transceiver 1720, an antenna 1725, memory 1730, a processor 1740, and an inter-station communications manager 1745. These components may be in electronic communication via one or more buses (e.g., bus 1750).

The communication manager 1710 may establish a communication link with a remote UE, the communication link including a sidelink communication link between the remote UE and a relay UE and a relay communication link between the relay UE and the base station, transmit, over the relay communication link, an indication of one or more resources configured for transmission of a relay transmission corresponding to the data stored at the remote UE, and receive, over the relay communication link, the relay transmission over the one or more resources.

The network communications manager 1715 may manage communications with the core network (e.g., via one or more wired backhaul links). For example, the network communications manager 1715 may manage the transfer of data communications for client devices, such as one or more UEs 115.

The transceiver 1720 may communicate bi-directionally, via one or more antennas, wired, or wireless links as described above. For example, the transceiver 1720 may represent a wireless transceiver and may communicate bi-directionally with another wireless transceiver. The transceiver 1720 may also include a modem to modulate the packets and provide the modulated packets to the antennas for transmission, and to demodulate packets received from the antennas.

In some cases, the wireless device may include a single antenna 1725. However, in some cases the device may have more than one antenna 1725, which may be capable of concurrently transmitting or receiving multiple wireless transmissions.

The memory 1730 may include RAM and ROM. The memory 1730 may store computer-readable, computer-executable code 1735 including instructions that, when executed, cause the processor to perform various functions described herein. In some cases, the memory 1730 may contain, among other things, a BIOS which may control basic hardware or software operation such as the interaction with peripheral components or devices.

The code 1735 may include instructions to implement aspects of the present disclosure, including instructions to support scheduling uplink transmissions of a relay. The code 1735 may be stored in a non-transitory computer-readable medium such as system memory or other type of memory. In some cases, the code 1735 may not be directly executable by the processor 1740 but may cause a computer (e.g., when compiled and executed) to perform functions described herein.

The processor 1740 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1740 may be configured to operate a memory array using a memory controller. In other cases, a memory controller may be integrated into the processor 1740. The processor 1740 may be configured to execute computer-readable instructions stored in a memory (e.g., the memory 1730) to cause the device 1705 to perform various functions (e.g., functions or tasks supporting scheduling uplink transmission of a relay).

The inter-station communications manager 1745 may manage communications with other base station 105, and may include a controller or scheduler for controlling communications with UEs 115 in cooperation with other base stations 105. For example, the inter-station communications manager 1745 may coordinate scheduling for transmissions to UEs 115 for various interference mitigation techniques such as beamforming or joint transmission. In some examples, the inter-station communications manager 1745 may provide an X2 interface within an LTE/LTE-A wireless communication network technology to provide communication between base stations 105.

In one or more aspects, the described techniques performed by the communication manager 1710 as described herein may support improvements in relayed sidelink communications. For example, communication manager 1710 performing the methods described herein may enable a base station to communicate with UEs that are outside of a coverage area of the base station. Accordingly, the range of the base station may be increased according to the methods described herein.

Figure 18:
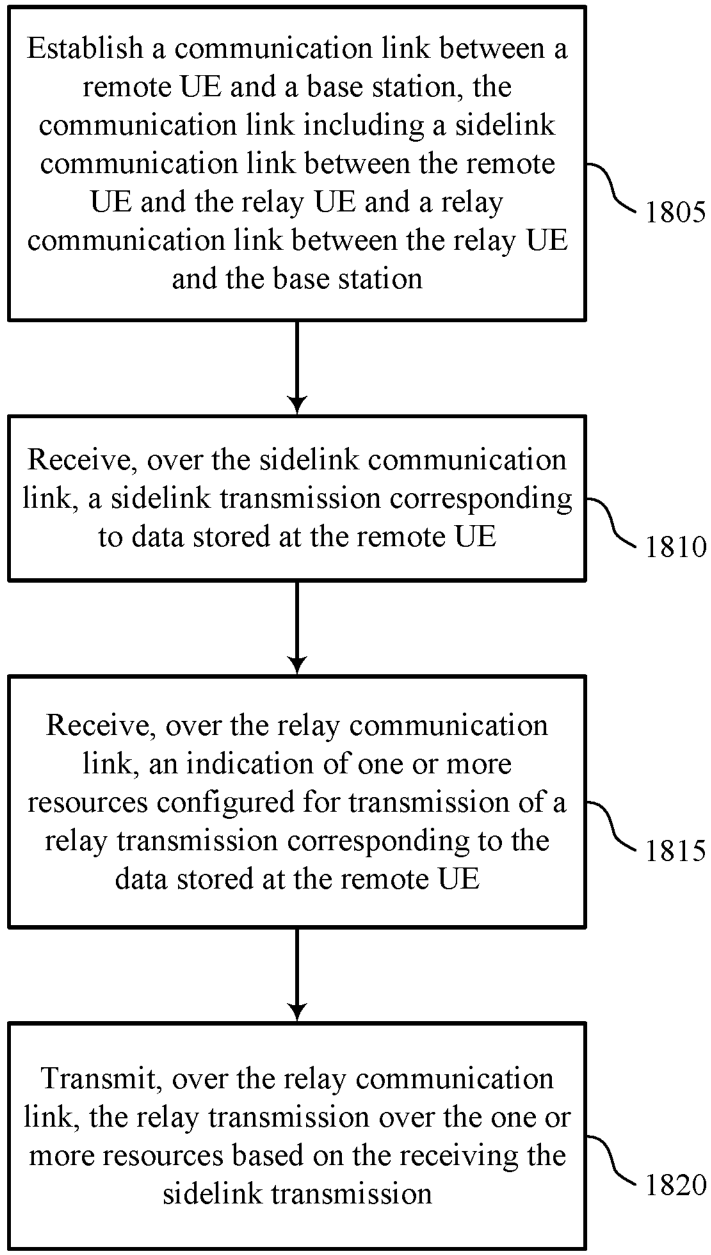

FIG. 18 shows a flowchart illustrating a method 1800 that supports scheduling uplink transmission of a relay in accordance with one or more aspects of the present disclosure. The operations of method 1800 may be implemented by a UE 115 or its components as described herein. For example, the operations of method 1800 may be performed by a communication manager as described with reference to FIGS. 10 through 13. In some examples, a UE may execute a set of instructions to control the functional elements of the UE to perform the described functions. Additionally or alternatively, a UE may perform aspects of the described functions using special-purpose hardware.

At 1805, the UE may establish a communication link between a remote UE and a base station, the communication link including a sidelink communication link between the remote UE and the relay UE and a relay communication link between the relay UE and the base station. The operations of 1805 may be performed according to the methods described herein. In some examples, aspects of the operations of 1805 may be performed by an UE communication establishment component as described with reference to FIGS. 10 through 13.

At 1810, the UE may receive, over the sidelink communication link, a sidelink transmission corresponding to data stored at the remote UE. The operations of 1810 may be performed according to the methods described herein. In some examples, aspects of the operations of 1810 may be performed by a signaling component as described with reference to FIGS. 10 through 13.

At 1815, the UE may receive, over the relay communication link, an indication of one or more resources configured for transmission of a relay transmission corresponding to the data stored at the remote UE. The operations of 1815 may be performed according to the methods described herein. In some examples, aspects of the operations of 1815 may be performed by an uplink grant receiver as described with reference to FIGS. 10 through 13.

At 1820, the UE may transmit, over the relay communication link, the relay transmission over the one or more resources based on the receiving the sidelink transmission. The operations of 1820 may be performed according to the methods described herein. In some examples, aspects of the operations of 1820 may be performed by a signaling component as described with reference to FIGS. 10 through 13.

Figure 19:
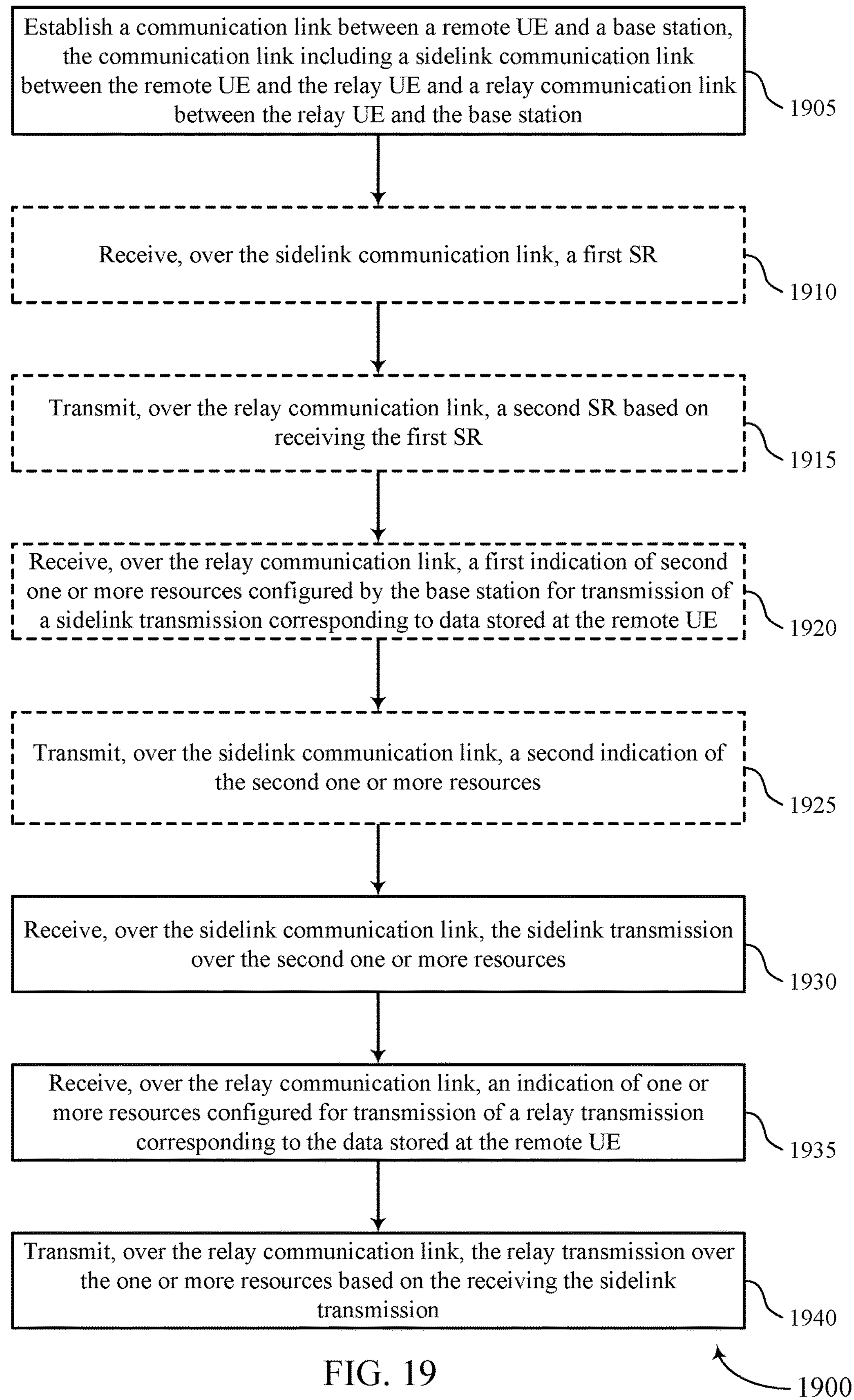

FIG. 19 shows a flowchart illustrating a method 1900 that supports scheduling uplink transmission of a relay in accordance with one or more aspects of the present disclosure. The operations of method 1900 may be implemented by a UE 115 or its components as described herein. For example, the operations of method 1900 may be performed by a communication manager as described with reference to FIGS. 10 through 13. In some examples, a UE may execute a set of instructions to control the functional elements of the UE to perform the described functions. Additionally or alternatively, a UE may perform aspects of the described functions using special-purpose hardware.

At 1905, the UE may establish a communication link between a remote UE and a base station, the communication link including a sidelink communication link between the remote UE and the relay UE and a relay communication link between the relay UE and the base station. The operations of 1905 may be performed according to the methods described herein. In some examples, aspects of the operations of 1905 may be performed by an UE communication establishment component as described with reference to FIGS. 10 through 13.

At 1910, the UE may receive, over the sidelink communication link, a first SR. The operations of 1910 may be performed according to the methods described herein. In some examples, aspects of the operations of 1910 may be performed by a SR component as described with reference to FIGS. 10 through 13.

At 1915, the UE may transmit, over the relay communication link, a second SR based on receiving the SR. The operations of 1915 may be performed according to the methods described herein. In some examples, aspects of the operations of 1915 may be performed by a SR component as described with reference to FIGS. 10 through 13.

At 1920, the UE may receive, over the relay communication link, a first indication of second one or more resources configured by the base station for transmission of a sidelink transmission corresponding to data stored at the remote UE. The operations of 1920 may be performed according to the methods described herein. In some examples, aspects of the operations of 1920 may be performed by a sidelink grant component as described with reference to FIGS. 10 through 13.

At 1925, the UE may transmit, over the sidelink communication link, a second indication of the second one or more resources. The operations of 1925 may be performed according to the methods described herein. In some examples, aspects of the operations of 1925 may be performed by a sidelink grant component as described with reference to FIGS. 10 through 13.

At 1930, the UE may receive, over the sidelink communication link, the sidelink transmission over the second one or more resources. The operations of 1930 may be performed according to the methods described herein. In some examples, aspects of the operations of 1930 may be performed by a signaling component as described with reference to FIGS. 10 through 13.

At 1935, the UE may receive, over the relay communication link, an indication of one or more resources configured for transmission of a relay transmission corresponding to the data stored at the remote UE. The operations of 1935 may be performed according to the methods described herein. In some examples, aspects of the operations of 1935 may be performed by an uplink grant receiver as described with reference to FIGS. 10 through 13.

At 1940, the UE may transmit, over the relay communication link, the relay transmission over the one or more resources based on the receiving the sidelink transmission. The operations of 1940 may be performed according to the methods described herein. In some examples, aspects of the operations of 1940 may be performed by a signaling component as described with reference to FIGS. 10 through 13.

Figure 20:
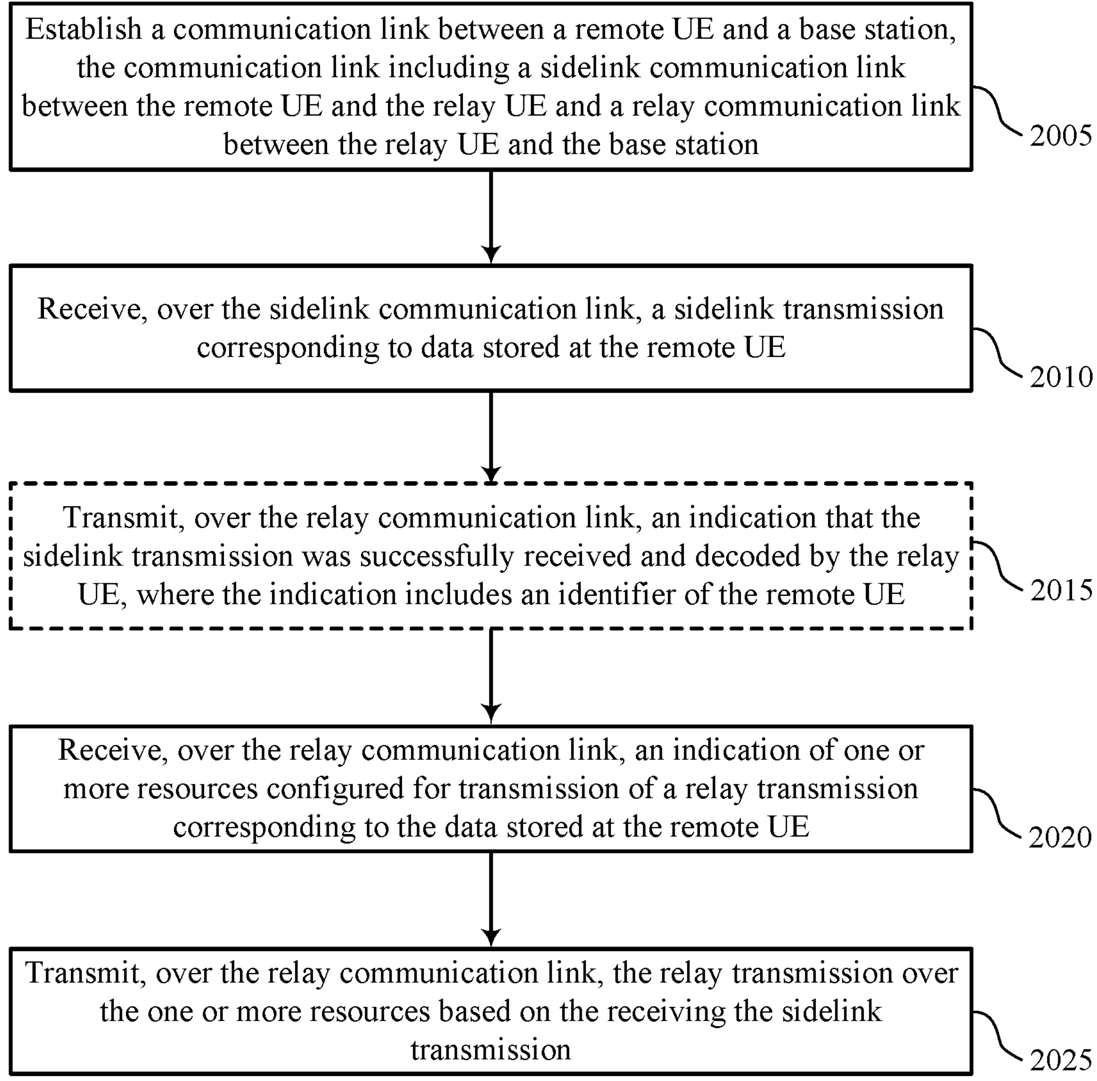

FIG. 20 shows a flowchart illustrating a method 2000 that supports scheduling uplink transmission of a relay in accordance with one or more aspects of the present disclosure. The operations of method 2000 may be implemented by a UE 115 or its components as described herein. For example, the operations of method 2000 may be performed by a communication manager as described with reference to FIGS. 10 through 13. In some examples, a UE may execute a set of instructions to control the functional elements of the UE to perform the described functions. Additionally or alternatively, a UE may perform aspects of the described functions using special-purpose hardware.

At 2005, the UE may establish a communication link between a remote UE and a base station, the communication link including a sidelink communication link between the remote UE and the relay UE and a relay communication link between the relay UE and the base station. The operations of 2005 may be performed according to the methods described herein. In some examples, aspects of the operations of 2005 may be performed by an UE communication establishment component as described with reference to FIGS. 10 through 13.

At 2010, the UE may receive, over the sidelink communication link, a sidelink transmission corresponding to data stored at the remote UE. The operations of 2010 may be performed according to the methods described herein. In some examples, aspects of the operations of 2010 may be performed by a signaling component as described with reference to FIGS. 10 through 13.

At 2015, the UE may transmit, over the relay communication link, an indication that the sidelink transmission was successfully received and decoded by the relay UE, where the indication includes an identifier of the remote UE. The operations of 2015 may be performed according to the methods described herein. In some examples, aspects of the operations of 2015 may be performed by a feedback component as described with reference to FIGS. 10 through 13.

At 2020, the UE may receive, over the relay communication link, an indication of one or more resources configured for transmission of a relay transmission corresponding to the data stored at the remote UE. The operations of 2020 may be performed according to the methods described herein. In some examples, aspects of the operations of 2020 may be performed by an uplink grant receiver as described with reference to FIGS. 10 through 13.

At 2025, the UE may transmit, over the relay communication link, the relay transmission over the one or more resources based on the receiving the sidelink transmission. The operations of 2025 may be performed according to the methods described herein. In some examples, aspects of the operations of 2025 may be performed by a signaling component as described with reference to FIGS. 10 through 13.

Figure 21:
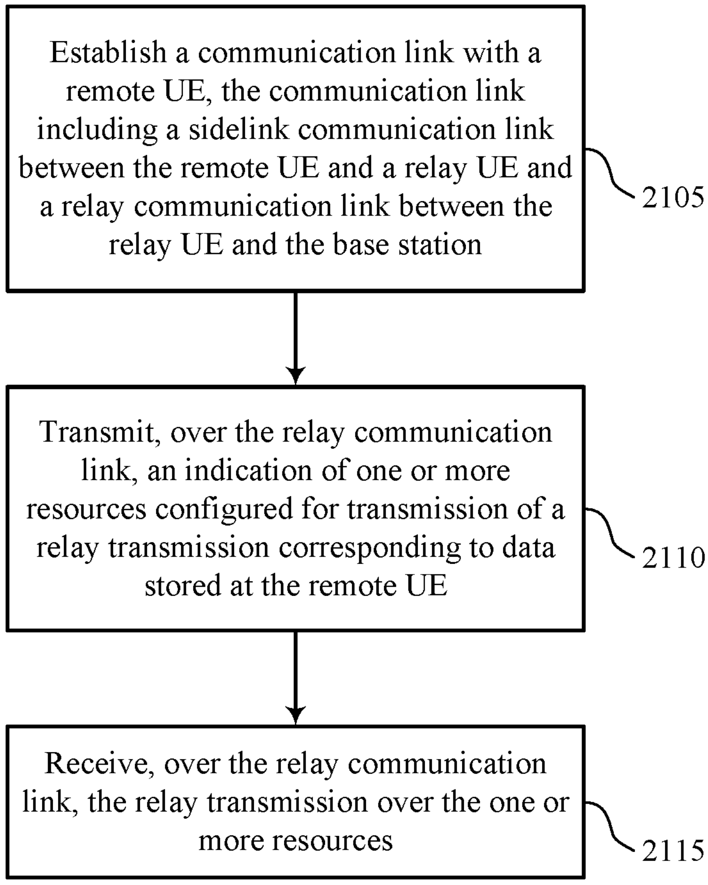

FIG. 21 shows a flowchart illustrating a method 2100 that supports scheduling uplink transmission of a relay in accordance with one or more aspects of the present disclosure. The operations of method 2100 may be implemented by a base station 105 or its components as described herein. For example, the operations of method 2100 may be performed by a communication manager as described with reference to FIGS. 14 through 17. In some examples, a base station may execute a set of instructions to control the functional elements of the base station to perform the described functions. Additionally or alternatively, a base station may perform aspects of the described functions using special-purpose hardware.

At 2105, the base station may establish a communication link with a remote UE, the communication link including a sidelink communication link between the remote UE and a relay UE and a relay communication link between the relay UE and the base station. The operations of 2105 may be performed according to the methods described herein. In some examples, aspects of the operations of 2105 may be performed by a base station communication establishment component as described with reference to FIGS. 14 through 17.

At 2110, the base station may transmit, over the relay communication link, an indication of one or more resources configured for transmission of a relay transmission corresponding to data stored at the remote UE. The operations of 2110 may be performed according to the methods described herein. In some examples, aspects of the operations of 2110 may be performed by an uplink grant transmitter as described with reference to FIGS. 14 through 17.

At 2115, the base station may receive, over the relay communication link, the relay transmission over the one or more resources. The operations of 2115 may be performed according to the methods described herein. In some examples, aspects of the operations of 2115 may be performed by a signaling receiver as described with reference to FIGS. 14 through 17.

Figure 22:
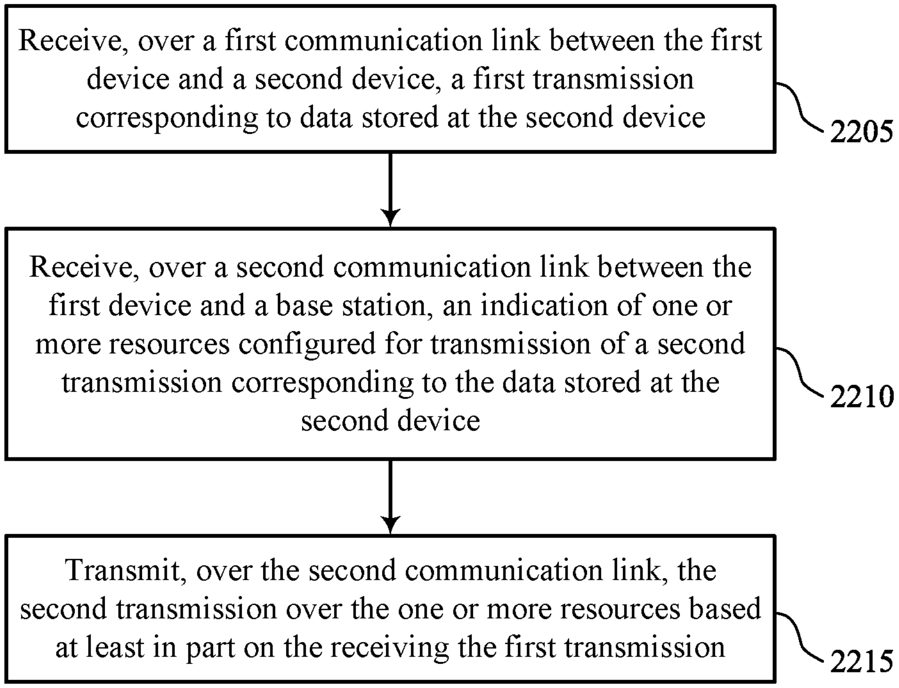

FIG. 22 shows a flowchart illustrating a method 2200 that supports scheduling uplink transmission of a relay in accordance with one or more aspects of the present disclosure. The operations of method 2200 may be implemented by a UE 115 or its components as described herein. For example, the operations of method 2200 may be performed by a communication manager as described with reference to FIGS. 10 through 13. In some examples, a UE may execute a set of instructions to control the functional elements of the UE to perform the described functions. Additionally or alternatively, a UE may perform aspects of the described functions using special-purpose hardware.

At 2205, the UE may receive, over a first communication link between the first device and a second device, a first transmission corresponding to data stored at the second device.

At 2210, the UE may receive, over a second communication link between the first device and a base station, an indication of one or more resources configured for transmission of a second transmission corresponding to the data stored at the second device.

At 2215, the UE may transmit, over the second communication link, the second transmission over the one or more resources based at least in part on the receiving the first transmission.

FIG. 23 shows a flowchart illustrating a method 2300 that supports scheduling uplink transmission of a relay in accordance with one or more aspects of the present disclosure. The operations of method 2300 may be implemented by a base station 105 or its components as described herein. For example, the operations of method 2300 may be performed by a communication manager as described with reference to FIGS. 14 through 17. In some examples, a base station may execute a set of instructions to control the functional elements of the base station to perform the described functions. Additionally or alternatively, a base station may perform aspects of the described functions using special-purpose hardware.

At 2305, the base station may transmit, over a first communication link between the base station and a first device, an indication of one or more resources configured for transmission of a first transmission corresponding to data stored at a second device.

At 2310, the base station may receive, over the first communication link, the first transmission over the one or more resources.

It should be noted that the methods described herein describe possible implementations, and that the operations may be rearranged or otherwise modified and that other implementations are possible. Further, aspects from two or more of the methods may be combined.

The following aspects may be combined with any of the previous examples or aspects described herein.

Aspect 1: A method for wireless communication at a first device, comprising: receiving, over a first communication link between the first device and a second device, a first transmission corresponding to data stored at the second device; receiving, over a second communication link between the first device and a base station, an indication of one or more resources configured for transmission of a second transmission corresponding to the data stored at the second device; and transmitting, over the second communication link, the second transmission over the one or more resources based at least in part on the receiving the first transmission.

Aspect 2: The method of aspect 1, further comprising: receiving, over the first communication link, a first scheduling request; transmitting, over the second communication link, a second scheduling request based at least in part on receiving the first scheduling request; receiving, over the second communication link, a first indication of second one or more resources configured by the base station for transmission of the first transmission; and transmitting, over the first communication link, a second indication of the second one or more resources, wherein the first transmission is received over the second one or more resources.

Aspect 3: The method of aspect 2, further comprising: receiving, over the second communication link, an indication of third one or more resources configured by the base station for transmission of control signaling comprising a request for resources on the first communication link; and transmitting, over the second communication link, the control signaling comprising the request for resources on the first communication link, wherein receiving the first indication of the second one or more resources is based at least in part on transmitting the control signaling comprising the request for resources on the first communication link.

Aspect 4: The method of aspect 3, wherein the control signaling comprises a medium access control (MAC) control element comprising the request for resources on the first communication link.

Aspect 5: The method of any of aspects 2 through 4, wherein the second scheduling request is transmitted over a time location on the first communication link, a frequency location on the first communication link, or both that indicates that the second scheduling request is associated with the second device.

Aspect 6: The method of any of aspects 2 through 5, further comprising: transmitting, over the second communication link, an indication that the first transmission was successfully received and decoded by the first device.

Aspect 7: The method of aspect 6, wherein the indication comprises an identifier of the second device.

Aspect 8: The method of any of aspects 2 through 7, wherein the second scheduling request indicates an identifier of the second device, and the first indication of the second one or more resources is received based at least in part on the second scheduling request indicating the identifier of the second device.

Aspect 9: The method of any of aspects 2 through 8, wherein the first indication of the second one or more resources comprises at least one radio link control protocol data unit comprising an identifier of the second device.

Aspect 10: The method of any of aspects 2 through 9, wherein the first indication of the second one or more resources is encoded according to a radio network temporary identifier of the second device, and the second indication of the second one or more resources is transmitted over the first communication link based at least in part on the first indication of the second one or more resources being encoded according to the radio network temporary identifier of the second device.

Aspect 11: The method of aspect 10, wherein the indication of the one or more resources is encoded according to a radio network temporary identifier of the first device.

Aspect 12: The method of aspect 11, wherein the radio network temporary identifier by which the first indication of the second one or more resources is encoded is the same as the radio network temporary identifier by which the indication of the one or more resources is encoded.

Aspect 13: The method of any of aspects 11 through 12, wherein the radio network temporary identifier by which the first indication of the second one or more resources is encoded is distinct from the radio network temporary identifier by which the indication of the one or more resources is encoded.

Aspect 14: The method of any of aspects 10 through 13, further comprising: receiving, over the second communication link, an indication of third one or more resources configured by the base station for transmission of a third transmission from a third device distinct from the second device, wherein the indication of the third one or more resources is encoded according to a radio network temporary identifier of the third device distinct from the second device.

Aspect 15: The method of aspect 14, wherein the radio network temporary identifier by which the indication of the third one or more resources is encoded is the same as the radio network temporary identifier by which the indication of the one or more resources is encoded.

Aspect 16: The method of any of aspects 14 through 15, wherein the radio network temporary identifier by which the indication of the third one or more resources is encoded is distinct from the radio network temporary identifier of the second device by which the indication of the one or more resources is encoded.

Aspect 17: The method of any of aspects 1 through 16, wherein the first transmission comprises a first buffer status report and the second transmission comprises a second buffer status report.

Aspect 18: The method of aspect 17, further comprising: receiving, from a third device distinct from the second device, a third buffer status report corresponding to data stored at the third device distinct from the second device, wherein the second buffer status report comprises an aggregated buffer status of the second device and of the third device distinct from the second device.

Aspect 19: The method of aspect 18, wherein the third buffer status report is received before the first buffer status report, and further comprising: initiating a prohibit timer for the third device distinct from the second device, wherein the second buffer status report excludes an identifier of the third device distinct from the second device based at least in part on the prohibit timer running when the first buffer status report is received.

Aspect 20: The method of any of aspects 17 through 19, further comprising: receiving, from a third device distinct from the second device, a third buffer status report corresponding to data stored at the third device distinct from the second device, wherein the second buffer status report comprises one or more first buffer statuses indicated by the first buffer status report and one or more second buffer statuses indicated by the third buffer status report.

Aspect 21: The method of any of aspects 17 through 20, wherein transmitting the second buffer status report is based at least in part on the first buffer status report comprising a non-empty logical channel group whose priority is higher than each logical channel group associated with additional data stored at the first device.

Aspect 22: The method of any of aspects 17 through 21, wherein transmitting the second buffer status report is based at least in part on expiry of a periodic buffer status report timer configured at the first device.

Aspect 23: The method of any of aspects 1 through 22, further comprising: transmitting, over the second communication link, a scheduling request based at least in part on receiving the first transmission, wherein receiving the indication of the one or more resources is based at least in part on transmitting the scheduling request.

Aspect 24: The method of any of aspects 1 through 23, wherein the first transmission comprises a transmission of data and the second transmission comprises a buffer status report, and transmitting the buffer status report is based at least in part on the first device having an empty buffer when receiving the first transmission of the data, the data having a higher priority than additional data stored at the first device, or both.

Aspect 25: A method for wireless communications at a base station, comprising: transmitting, over a first communication link between the base station and a first device, an indication of one or more resources configured for transmission of a first transmission corresponding to data stored at a second device; and receiving, over the first communication link, the first transmission over the one or more resources.

Aspect 26: The method of aspect 25, further comprising: receiving, over the first communication link, a scheduling request; and transmitting, over the first communication link, an indication of second one or more resources configured by the base station for transmission of a second transmission corresponding to the data stored at the second device from the second device to the first device, wherein the first transmission is received based at least in part on transmitting the indication of the second one or more resources.

Aspect 27: The method of aspect 26, further comprising: transmitting, over the first communication link, an indication of third one or more resources configured by the base station for transmission of control signaling comprising a request for resources on a second communication link between the first device and the second device; and receiving, over the first communication link, the control signaling comprising the request for resources on the second communication link, wherein transmitting the indication of the second one or more resources is based at least in part on receiving the request for resources on the second communication link.

Aspect 28: The method of aspect 27, wherein the control signaling comprises a medium access control (MAC) control element comprising the request for resources on the second communication link.

Aspect 29: An apparatus for wireless communications comprising a processor and memory coupled to the processor, the processor and the memory configured to cause the apparatus to perform a method of any of aspects 1 through 24.

Aspect 30: An apparatus for wireless communication at a first device, comprising at least one means for performing a method of any of aspects 1 through 24.

Aspect 31: A non-transitory computer-readable medium storing code for wireless communication at a first device, the code comprising instructions executable by a processor to perform a method of any of aspects 1 through 24.

Aspect 32: An apparatus for wireless communications comprising a processor and memory coupled to the processor, the processor and the memory configured to perform a method of any of aspects 25 through 28.

Aspect 33: An apparatus for wireless communications at a base station, comprising at least one means for performing a method of any of aspects 25 through 28.

Aspect 34: A non-transitory computer-readable medium storing code for wireless communications at a base station, the code comprising instructions executable by a processor to perform a method of any of aspects 25 through 28.

Aspect 35: A method for wireless communication at a relay UE, comprising: establishing a communication link between a remote UE and a base station, the communication link comprising a sidelink communication link between the remote UE and the relay UE and a relay communication link between the relay UE and the base station; receiving, over the sidelink communication link, a sidelink transmission corresponding to data stored at the remote UE; receiving, over the relay communication link, an indication of one or more resources configured for transmission of a relay transmission corresponding to the data stored at the remote UE; and transmitting, over the relay communication link, the relay transmission over the one or more resources based at least in part on the receiving the sidelink transmission.

Aspect 36: The method of aspect 35, further comprising: receiving, over the sidelink communication link, a first scheduling request; transmitting, over the relay communication link, a second scheduling request based at least in part on receiving the first scheduling request; receiving, over the relay communication link, a first indication of second one or more resources configured by the base station for transmission of the sidelink transmission; and transmitting, over the sidelink communication link, a second indication of the second one or more resources, wherein the sidelink transmission is received over the second one or more resources.

Aspect 37: The method of any of aspects 35 or 36, further comprising: receiving, over the relay communication link, an indication of third one or more resources configured by the base station for transmission of control signaling comprising a request for resources on the sidelink communication link; and transmitting, over the relay communication link, the control signaling comprising the request for resources on the sidelink communication link, wherein receiving the first indication of the second one or more resources is based at least in part on transmitting the control signaling comprising the request for resources on the sidelink communication link.

Aspect 38: The method of any of aspects 35 to 37, wherein the control signaling comprises a medium access control (MAC) control element comprising the request for resources on the sidelink communication link.

Aspect 39: The method of any of aspects 35 to 38, wherein the second scheduling request is transmitted over a time location on the sidelink communication link, a frequency location on the sidelink communication link, or both that indicates that the second scheduling request is associated with the remote UE.

Aspect 40: The method of any of aspects 35 to 39, further comprising: transmitting, over the relay communication link, an indication that the sidelink transmission was successfully received and decoded by the relay UE.

Aspect 41: The method of any of aspects 35 to 40, wherein the indication comprises an identifier of the remote UE.

Aspect 42: The method of any of aspects 35 to 41, wherein the second scheduling request indicates an identifier of the remote UE, and wherein the first indication of the second one or more resources is received based at least in part on the second scheduling request indicating the identifier of the remote UE.

Aspect 43: The method of any of aspects 35 to 42, wherein the first indication of the second one or more resources comprises at least one radio link control protocol data unit comprising an identifier of the remote UE.

Aspect 44: The method of any of aspects 35 to 43, wherein the first indication of the second one or more resources is encoded according to a radio network temporary identifier of the remote UE, and wherein the second indication of the second one or more resources is transmitted over the sidelink communication link based at least in part on the first indication of the second one or more resources being encoded according to the radio network temporary identifier of the remote UE.

Aspect 45: The method of any of aspects 35 to 44, wherein the indication of the one or more resources is encoded according to a radio network temporary identifier of the relay UE.

Aspect 46: The method of any of aspects 35 to 45, wherein the radio network temporary identifier by which the first indication of the second one or more resources is encoded is the same as the radio network temporary identifier by which the indication of the one or more resources is encoded.

Aspect 47: The method of any of aspects 35 to 45, wherein the radio network temporary identifier by which the first indication of the second one or more resources is encoded is distinct from the radio network temporary identifier by which the indication of the one or more resources is encoded.

Aspect 48: The method of any of aspects 35 to 47, further comprising: receiving, over the relay communication link, an indication of third one or more resources configured by the base station for transmission of a second sidelink transmission from a UE distinct from the remote UE, wherein the indication of the third one or more resources is encoded according to a radio network temporary identifier of the UE distinct from the remote UE.

Aspect 49: The method of any of aspects 35 to 48, wherein the radio network temporary identifier by which the indication of the third one or more resources is encoded is the same as the radio network temporary identifier by which the indication of the one or more resources is encoded.

Aspect 50: The method of any of aspects 35 to 48, wherein the radio network temporary identifier by which the indication of the third one or more resources is encoded is distinct from the radio network temporary identifier of the UE by which the indication of the one or more resources is encoded.

Aspect 51: The method of any of aspects 35 to 50, further comprising: transmitting, over the relay communication link, a scheduling request based at least in part on receiving the sidelink transmission, wherein receiving the indication of the one or more resources is based at least in part on transmitting the scheduling request.

Aspect 52: The method of any of aspects 35 to 51, further comprising: receiving, over the sidelink communication link, an indication of a mapping between a logical channel of the remote UE and a priority of the logical channel.

Aspect 53: The method of any of aspects 35 to 52, wherein the indication is provided by the sidelink transmission, a received medium access control service data unit header, or both.

Aspect 54: The method of any of aspects 35 to 53, wherein the sidelink transmission comprises a first buffer status report and the relay transmission comprises a second buffer status report.

Aspect 55: The method of any of aspects 35 to 54, further comprising: receiving, from a UE distinct from the remote UE, a third buffer status report corresponding to data stored at the UE distinct from the remote UE, wherein the second buffer status report comprises an aggregated buffer status of the remote UE and of the UE distinct from the remote UE.

Aspect 56: The method of any of aspects 35 to 55, wherein the third buffer status report is received before the first buffer status report, and further comprising: initiating a prohibit timer for the UE distinct from the remote UE, wherein the second buffer status report excludes an identifier of the UE distinct from the remote UE based at least in part on the prohibit timer running when the first buffer status report is received.

Aspect 57: The method of any of aspects 35 to 56, further comprising: receiving, from a UE distinct from the remote UE, a third buffer status report corresponding to data stored at the UE distinct from the remote UE, wherein the second buffer status report comprises one or more buffer statuses indicated by the first buffer status report and one or more buffer statuses indicated by the third buffer status report.

Aspect 58: The method of any of aspects 35 to 57, wherein transmitting the second buffer status report is based at least in part on the first buffer status report comprising a non-empty logical channel group whose priority is higher than each logical channel group associated with additional data stored at the relay UE.

Aspect 59: The method of any of aspects 35 to 58, wherein transmitting the second buffer status report is based at least in part on expiry of a periodic buffer status report timer configured at the relay UE.

Aspect 60: The method of any of aspects 35 to 59, wherein the sidelink transmission comprises a transmission of data and the relay transmission comprises a buffer status report, and wherein transmitting the buffer status report is based at least in part on the relay UE having an empty buffer when receiving the transmission of the data, the data having a higher priority than additional data stored at the relay UE, or both.

Aspect 61: An apparatus comprising at least one means for performing a method of any of aspects 35 to 60.

Aspect 62: An apparatus for wireless communications comprising a processor and memory coupled to the processor, the processor and the memory configured to perform a method of any of aspects 35 to 60.

Aspect 63: A non-transitory computer-readable medium storing code for wireless communications, the code comprising instructions executable by a processor to perform a method of any of aspects 35 to 60.

Aspect 64: A method for wireless communications at a base station, comprising: establishing a communication link with a remote user equipment (UE), the communication link comprising a sidelink communication link between the remote UE and a relay UE and a relay communication link between the relay UE and the base station; transmitting, over the relay communication link, an indication of one or more resources configured for transmission of a relay transmission corresponding to data stored at the remote UE; and receiving, over the relay communication link, the relay transmission over the one or more resources.

Aspect 65: The method of aspect 64, further comprising: receiving, over the relay communication link, a scheduling request; and transmitting, over the relay communication link, an indication of second one or more resources configured by the base station for transmission of a sidelink transmission corresponding to the data stored at the remote UE from the remote UE to the relay UE, wherein the relay transmission is received based at least in part on transmitting the indication of the second one or more resources.

Aspect 66: The method of any of aspects 64 or 65, further comprising: transmitting, over the relay communication link, an indication of third one or more resources configured by the base station for transmission of control signaling comprising a request for resources on the sidelink communication link; and receiving, over the relay communication link, the control signaling comprising the request for resources on the sidelink communication link, wherein transmitting the indication of the second one or more resources is based at least in part on receiving the request for resources on the sidelink communication link.

Aspect 67: The method of any of aspects 64 to 66, wherein the control signaling comprises a medium access control (MAC) control element comprising the request for resources on the sidelink communication link.

Aspect 68: The method of any of aspects 64 to 67, further comprising: receiving, over the relay communication link, an indication that the sidelink transmission was successfully received and decoded by the relay UE.

Aspect 69: The method of any of aspects 64 to 68, wherein the indication comprises an identifier of the remote UE.

Aspect 70: The method of any of aspects 64 to 69, wherein the scheduling request indicates an identifier of the remote UE, and wherein the indication of the second one or more resources is transmitted based at least in part on the scheduling request indicating the identifier of the remote UE.

Aspect 71: The method of any of aspects 64 to 70, wherein the indication of the second one or more resources comprises at least one radio link control protocol data unit comprising an identifier of the remote UE.

Aspect 72: The method of any of aspects 64 to 71, wherein the indication of the second one or more resources is encoded according to a radio network temporary identifier of the remote UE.

Aspect 73: The method of any of aspects 64 to 72, wherein the indication of the one or more resources is encoded according to a radio network temporary identifier of the relay UE.

Aspect 74: The method of any of aspects 64 to 73, wherein the radio network temporary identifier by which the indication of the second one or more resources is encoded is the same as the radio network temporary identifier by which the indication of the one or more resources is encoded.

Aspect 75: The method of any of aspects 64 to 74, wherein the radio network temporary identifier by which the second one or more resources is encoded is distinct from the radio network temporary identifier by which the one or more resources is encoded.

Aspect 76: The method of any of aspects 64 to 75, further comprising: transmitting, over the relay communication link, an indication of third one or more resources configured by the base station for transmission of a second sidelink transmission from a UE distinct from the remote UE, wherein the indication of the third one or more resources is encoded according to a radio network temporary identifier of the UE distinct from the remote UE.

Aspect 77: The method of any of aspects 64 to 76, wherein the radio network temporary identifier by which the indication of the third one or more resources is encoded is the same as the radio network temporary identifier by which the indication of the one or more resources is encoded.

Aspect 78: The method of any of aspects 64 to 77, wherein the radio network temporary identifier by which the indication of the third one or more resources is encoded is distinct from the radio network temporary identifier by which the indication of the one or more resources is encoded.

Aspect 79: The method of any of aspects 64 to 78, wherein the scheduling request is received over a time location on the sidelink communication link, a frequency location on the sidelink communication link, or both that indicates that the scheduling request is associated with the remote UE.

Aspect 80: The method of any of aspects 64 to 79, wherein the relay transmission comprises a buffer status report.

Aspect 81: The method of any of aspects 64 to 80, wherein the buffer status report comprises an aggregated buffer status of the remote UE and of a UE distinct from the remote UE.

Aspect 82: The method of any of aspects 64 to 81, wherein the buffer status report comprises one or more buffer statuses associated with the remote UE and one or more buffer statuses associated with a UE distinct from the remote UE.

Aspect 83: An apparatus comprising at least one means for performing a method of any of aspects 64 to 82.

Aspect 84: An apparatus for wireless communications comprising a processor and memory coupled to the processor, the processor and the memory configured to perform a method of any of aspects 64 to 82.

Aspect 85: A non-transitory computer-readable medium storing code for wireless communications, the code comprising instructions executable by a processor to perform a method of any of aspects 64 to 82.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example operation that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a first device, comprising:

receiving, over a first communication link between the first device and a second device, first data associated with the second device;

receiving, over a second communication link between the first device and a network entity, an indication of one or more uplink resources to transmit a first transmission comprising a buffer status report;

transmitting, over the second communication link, the first transmission comprising the buffer status report over the one or more uplink resources, the buffer status report based at least in part on the first data associated with the second device, wherein the first transmission is associated with a first radio link control (RLC) entity and with a first logical channel group; and transmitting, over the second communication link, a second transmission corresponding to second data associated with the first device, wherein the second transmission is associated with a second RLC entity and with a second logical channel group based at least in part on the second data associated with the first device, and wherein the second RLC entity is distinct from the first RLC entity and the first logical channel group is distinct from the second logical channel group.

2. The method of claim 1, further comprising:

receiving, over the first communication link, a first scheduling request;

transmitting, over the second communication link, a second scheduling request based at least in part on receiving the first scheduling request;

receiving, over the second communication link, a first indication of one or more sidelink resources configured by the network entity for transmission of the first transmission; and transmitting, over the first communication link, a second indication of the one or more sidelink resources, wherein the first transmission is received over the one or more sidelink resources.

3. The method of claim 2, further comprising:

receiving, over the second communication link, an indication of second one or more uplink resources configured by the network entity for transmission of control signaling comprising a request for resources on the first communication link; and transmitting, over the second communication link, the control signaling comprising the request for resources on the first communication link, wherein receiving the first indication of the one or more sidelink resources is based at least in part on transmitting the control signaling comprising the request for resources on the first communication link.

4. The method of claim 3, wherein the control signaling comprises a medium access control (MAC) control element comprising the request for resources on the first communication link.

5. The method of claim 2, wherein the second scheduling request is transmitted over a time location on the first communication link, a frequency location on the first communication link, or both, and wherein a value of the time location, a value of the frequency location, or both indicate that the second scheduling request is associated with the second device.

6. The method of claim 2, further comprising:

transmitting, over the second communication link, an indication that the first data was successfully received and decoded by the first device.

7. The method of claim 6, wherein the indication comprises an identifier of the second device.

8. The method of claim 2, wherein the second scheduling request indicates an identifier of the second device, and wherein the first indication of the one or more sidelink resources is received based at least in part on the second scheduling request indicating the identifier of the second device.

9. The method of claim 2, wherein the first indication of the one or more sidelink resources comprises at least one radio link control protocol data unit comprising an identifier of the second device.

10. The method of claim 2, wherein the first indication of the one or more sidelink resources is encoded according to a radio network temporary identifier of the second device, and wherein the second indication of the one or more sidelink resources is transmitted over the first communication link based at least in part on the first indication of the one or more sidelink resources being encoded according to the radio network temporary identifier of the second device.

11. The method of claim 10, wherein the indication of the one or more uplink resources is encoded according to a radio network temporary identifier of the first device.

12. The method of claim 11, wherein the radio network temporary identifier by which the first indication of the one or more sidelink resources is encoded is the same as the radio network temporary identifier by which the indication of the one or more uplink resources is encoded.

13. The method of claim 11, wherein the radio network temporary identifier by which the first indication of the one or more sidelink resources is encoded is distinct from the radio network temporary identifier by which the indication of the one or more uplink resources is encoded.

14. The method of claim 10, further comprising:

receiving, over the second communication link, an indication of second one or more sidelink resources configured by the network entity for transmission of a fourth transmission from a third device distinct from the second device, wherein the indication of the second one or more sidelink resources is encoded according to a radio network temporary identifier of the third device distinct from the second device.

15. The method of claim 14, wherein the radio network temporary identifier by which the indication of the second one or more sidelink resources is encoded is the same as the radio network temporary identifier by which the indication of the one or more uplink resources is encoded.

16. The method of claim 14, wherein the radio network temporary identifier by which the indication of the second one or more sidelink resources is encoded is distinct from the radio network temporary identifier of the second device by which the indication of the one or more uplink resources is encoded.

17. The method of claim 1, further comprising:

receiving, from a third device distinct from the second device, a fourth transmission comprising third data associated with the third device distinct from the second device, wherein the first transmission comprises an aggregated buffer status of the second device and of the third device distinct from the second device based at least in part on receiving the third data associated with the third device.

18. The method of claim 17, further comprising:

initiating a prohibit timer for the third device distinct from the second device, wherein the first transmission excludes an identifier of the third device distinct from the second device based at least in part on the prohibit timer.

19. The method of claim 1, further comprising:

transmitting, over the second communication link, a scheduling request based at least in part on receiving the first data, wherein receiving the indication of the one or more uplink resources is based at least in part on transmitting the scheduling request.

20. The method of claim 1, wherein transmitting the buffer status report is based at least in part on the first device having an empty buffer when receiving the first transmission corresponding to the first data associated with the second device, the first data associated with the second device having a higher priority than the second data associated with the first device, or both.

21. The method of claim 1, further comprising:

receiving, from a third device, a fourth transmission comprising third data associated with the third device, wherein the first transmission corresponds to the first data associated with the second device and the third data associated with the third device.

22. The method of claim 21, wherein the first data associated with the second device and the third data associated with the third device are associated with a same logical channel group, and wherein the buffer status report comprises an indication of an aggregated size of the first data associated with the second device and the third data associated with the third device.

23. The method of claim 1, further comprising:

receiving a configuration of the second logical channel group specific to the first device.

24. The method of claim 1, further comprising:

receiving, from a third device distinct from the second device, a fourth transmission corresponding to third data associated with the third device, wherein the buffer status report comprises a first buffer status of the second device and a second buffer status of the third device, and wherein the second device and the third device are associated with the first logical channel group.

25. A method for wireless communications at a network entity, comprising:

outputting an indication of one or more uplink resources to transmit a first transmission, the first transmission comprising a buffer status report associated with a first device and corresponding to first data associated with a second device;

obtaining the first transmission over the one or more uplink resources, wherein the first transmission is associated with a first radio link control (RLC) and with a first logical channel group; and obtaining a second transmission corresponding to second data associated with the first device, wherein the second transmission is associated with a second RLC entity and with a second logical channel group based at least in part on the second data associated with the first device, and wherein the second RLC entity is distinct from the first RLC entity and the first logical channel group is distinct from the second logical channel group.

26. The method of claim 25, further comprising:

obtaining a scheduling request; and outputting an indication of one or more sidelink resources configured by the network entity for transmission of a third transmission from the second device corresponding to the first data associated with the second device, wherein the first data is obtained based at least in part on outputting the indication of the one or more sidelink resources.

27. The method of claim 26, further comprising:

outputting an indication of second one or more uplink resources configured by the network entity for transmission of control signaling comprising a request for resources on a second communication link between the first device and the second device; and obtaining the control signaling comprising the request for resources, wherein outputting the indication of the one or more sidelink resources is based at least in part on obtaining the request for resources.

28. The method of claim 27, wherein the control signaling comprises a medium access control (MAC) control element comprising the request for resources.

29. The method of claim 25, wherein the first transmission comprises an aggregated buffer status of the second device and of a third device distinct from the second device.

30. The method of claim 25, wherein the first transmission corresponds to the first data associated with the second device and third data associated with a third device.

31. The method of claim 30, wherein the first data associated with the second device and the third data associated with the third device are associated with a same logical channel group, and wherein the buffer status report comprises an indication of an aggregated size of the first data associated with the second device and the third data associated with the third device.

32. The method of claim 25, further comprising:

outputting a configuration of the second logical channel group specific to the first device.

33. The method of claim 25, wherein the buffer status report comprises a first buffer status of the second device and a second buffer status of a third device distinct from the second device, and wherein the second device and the third device are associated with the first logical channel group.

34. An apparatus for wireless communication at a first device, comprising:

one or more memories, and one or more processors coupled to the one or more memories, the one or more processors configured to cause the first device to:

receive, over a first communication link between the first device and a second device, first data associated with the second device;

receive, over a second communication link between the first device and a network entity, an indication of one or more uplink resources to transmit a first transmission that comprises a buffer status report;

transmit, over the second communication link, the first transmission that comprises the buffer status report over the one or more uplink resources, the buffer status report based at least in part on the first data associated with the second device, wherein the first transmission is associated with a first radio link control (RLC) entity and with a first logical channel group; and transmit, over the second communication link, a second transmission that corresponds to second data associated with the first device, wherein the second transmission is associated with a second RLC entity and with a second logical channel group based at least in part on the second data associated with the first device, and wherein the second RLC entity is distinct from the first RLC entity and the first logical channel group is distinct from the second logical channel group.

35. The apparatus of claim 34, wherein the one or more processors are further configured to cause the first device to:

receive, from a third device distinct from the second device, a fourth transmission that comprises third data associated with the third device distinct from the second device, wherein the first transmission comprises an aggregated buffer status of the second device and of the third device distinct from the second device based at least in part on the third data associated with the third device.

36. The apparatus of claim 34, wherein the one or more processors are further configured to cause the first device to:

receive, from a third device, a fourth transmission that comprises third data associated with the third device, wherein the first transmission corresponds to the first data associated with the second device and the third data associated with the third device.

37. The apparatus of claim 36, wherein the first data associated with the second device and the third data associated with the third device are associated with a same logical channel group, and wherein the buffer status report comprises an indication of an aggregated size of the first data associated with the second device and the third data associated with the third device.

38. The apparatus of claim 34, wherein the one or more processors are further configured to cause the first device to:

receive a configuration of the second logical channel group specific to the first device.

39. The apparatus of claim 34, wherein the one or more processors are further configured to cause the first device to:

receive, from a third device distinct from the second device, a fourth transmission that corresponds to third data associated with the third device, wherein the buffer status report comprises a first buffer status of the second device and a second buffer status of the third device, and wherein the second device and the third device are associated with the first logical channel group.

40. An apparatus for wireless communication at a network entity, comprising:

one or more memories, and one or more processors coupled to the one or more memories, the one or more processors configured to cause the network entity to:

output an indication of one or more uplink resources to transmit a first transmission, wherein the first transmission comprises a buffer status report associated with a first device and corresponds to first data associated with a second device;

obtain the first transmission over the one or more uplink resources, wherein the first transmission is associated with a first radio link control (RLC) entity and with a first logical channel group; and obtain a second transmission that corresponds to second data associated with the first device, wherein the second transmission is associated with a second RLC entity and with a second logical channel group based at least in part on the second data associated with the first device, and wherein the second RLC entity is distinct from the first RLC entity and the first logical channel group is distinct from the second logical channel group.

41. The apparatus of claim 40, wherein the first transmission comprises an aggregated buffer status of the second device and of a third device distinct from the second device.

42. The apparatus of claim 41, wherein the first data associated with the second device and third data associated with the third device are associated with a same logical channel group, and wherein the buffer status report comprises an indication of an aggregated size of the first data associated with the second device and the third data associated with the third device.

43. The apparatus of claim 40, wherein the one or more processors are further configured to cause the network entity to:

output a configuration of the second logical channel group specific to the first device.

44. The apparatus of claim 40, wherein the buffer status report comprises a first buffer status of the second device and a second buffer status of a third device distinct from the second device, and wherein the second device and the third device are associated with the first logical channel group.

45. A non-transitory computer-readable medium storing code for wireless communication at a first device, the code comprising instructions executable by one or more processors to cause the first device to:

receive, over a first communication link between the first device and a second device, first data associated with the second device;

receive, over a second communication link between the first device and a network entity, an indication of one or more uplink resources to transmit a first transmission that comprises a buffer status report;

transmit, over the second communication link, the first transmission that comprises the buffer status report over the one or more uplink resources, the buffer status report based at least in part on the first data associated with the second device, wherein the second first transmission is associated with a first radio link control (RLC) entity and with a first logical channel group; and transmit, over the second communication link, a second transmission that corresponds to second data associated with the first device, wherein the second transmission is associated with a second RLC entity and with a second logical channel group based at least in part on the second data associated with the first device, and wherein the second RLC entity is distinct from the first RLC entity and the first logical channel group is distinct from the second logical channel group.

46. The non-transitory computer-readable medium of claim 45, wherein the instructions are further executable by the one or more processors to cause the first device to:

receive, from a third device, a fourth transmission that comprises third data associated with the third device, wherein the first transmission corresponds to the first data associated with the second device and the third data associated with the third device.

47. The non-transitory computer-readable medium of claim 46, wherein the first data associated with the second device and the third data associated with the third device are associated with a same logical channel group, and wherein the buffer status report comprises an indication of an aggregated size of the first data associated with the second device and the third data associated with the third device.

48. The non-transitory computer-readable medium of claim 45, wherein the instructions are further executable by the one or more processors to cause the first device to:

receive a configuration of the second logical channel group specific to the first device.

49. The non-transitory computer-readable medium of claim 45, wherein the instructions are further executable by the one or more processors to cause the network entity to:

receive, from a third device distinct from the second device, a fourth transmission that corresponds to third data associated with the third device, wherein the buffer status report comprises a first buffer status of the second device and a second buffer status of the third device, and wherein the second device and the third device are associated with the first logical channel group.

50. A non-transitory computer-readable medium storing code for wireless communication at a network entity, the code comprising instructions executable by one or more processors to cause the network entity to:

output an indication of one or more uplink resources to transmit a first transmission, wherein the first transmission comprises a buffer status report associated with a first device and corresponds to first data associated with a second device;

obtain the first transmission over the one or more uplink resources, wherein the first transmission is associated with a first radio link control (RLC) entity and with a first logical channel group; and obtain a second transmission that corresponds to second data associated with the first device, wherein the second transmission is associated with a second RLC entity and with a second logical channel group based at least in part on the second data associated with the first device, and wherein the second RLC entity is distinct from the first RLC entity and the first logical channel group is distinct from the second logical channel group.

51. The non-transitory computer-readable medium of claim 50, wherein the first transmission corresponds to the first data associated with the second device and third data associated with a third device.

52. The non-transitory computer-readable medium of claim 51, wherein the first data associated with the second device and the third data associated with the third device are associated with a same logical channel group, and wherein the buffer status report comprises an indication of an aggregated size of the first data associated with the second device and the third data associated with the third device.

53. The non-transitory computer-readable medium of claim 50, wherein the instructions are further executable by the one or more processors to cause the network entity to:

output a configuration of the second logical channel group specific to the first device.

54. The non-transitory computer-readable medium of claim 50, wherein the buffer status report comprises a first buffer status of the second device and a second buffer status of a third device distinct from the second device, and wherein the second device and the third device are associated with the first logical channel group.

55. An apparatus for wireless communication at a first device, comprising:

means for receiving, over a first communication link between the first device and a second device, first data associated with the second device;

means for receiving, over a second communication link between the first device and a network entity, an indication of one or more uplink resources to transmit a first transmission comprising a buffer status report;

means for transmitting, over the second communication link, the first transmission comprising the buffer status report over the one or more uplink resources, the buffer status report based at least in part on the first data associated with the second device, wherein the first transmission is associated with a first radio link control (RLC) entity and with a first logical channel group; and means for transmitting, over the second communication link, a second transmission corresponding to second data associated with the first device, wherein the second transmission is associated with a second RLC entity and with a second logical channel group based at least in part on the second data associated with the first device, and wherein the second RLC entity is distinct from the first RLC entity and the first logical channel group is distinct from the second logical channel group.

56. The apparatus of claim 55, further comprising:

means for receiving a configuration of the second logical channel group specific to the first device.

57. An apparatus for wireless communication at a network entity, comprising:

means for outputting an indication of one or more uplink resources to transmit a first transmission, the first transmission comprising a buffer status report associated with a first device and corresponding to first data associated with a second device;

means for obtaining the first transmission over the one or more uplink resources, wherein the first transmission is associated with a first radio link control (RLC) and with a first logical channel group; and means for obtaining a second transmission corresponding to second data associated with the first device, wherein the second transmission is associated with a second RLC entity and with a second logical channel group based at least in part on the second data associated with the first device, and wherein the second RLC entity is distinct from the first RLC entity and the first logical channel group is distinct from the second logical channel group.

58. The apparatus of claim 57, further comprising:

means for outputting a configuration of the second logical channel group specific to the first device.

* * * * *